(12) United States Patent
Kim

(10) Patent No.: US 12,165,548 B2
(45) Date of Patent: Dec. 10, 2024

(54) DISPLAY DEVICE

(71) Applicant: LG ELECTRONICS INC., Seoul (KR)

(72) Inventor: Hoyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 233 days.

(21) Appl. No.: 17/918,765

(22) PCT Filed: Apr. 13, 2020

(86) PCT No.: PCT/KR2020/004951
§ 371 (c)(1),
(2) Date: Oct. 13, 2022

(87) PCT Pub. No.: WO2021/210692
PCT Pub. Date: Oct. 21, 2021

(65) Prior Publication Data
US 2023/0132282 A1 Apr. 27, 2023

(51) Int. Cl.
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
CPC ................................ G06F 1/1652; G09F 9/301
USPC ......................................................... 248/917
See application file for complete search history.

(56) References Cited

U.S. PATENT DOCUMENTS

| | | | | |
|---|---|---|---|---|
| 8,174,628 B2* | 5/2012 | Matsushita | ........... | G06F 1/1647 348/836 |
| 8,711,566 B2* | 4/2014 | O'Brien | ................ | G06F 1/1652 361/724 |
| 9,019,313 B2* | 4/2015 | Kwack | .................. | G06F 1/1652 359/461 |
| 9,258,396 B2* | 2/2016 | Hwang | ................. | G06F 1/1652 |
| 9,743,542 B2* | 8/2017 | Heo | ....................... | H05K 1/028 |
| 10,410,549 B1* | 9/2019 | Kim | ....................... | G09F 9/301 |

(Continued)

FOREIGN PATENT DOCUMENTS

| | | |
|---|---|---|
| KR | 1020170126061 | 11/2017 |
| KR | 1020190092980 | 8/2019 |
| KR | 1020200013549 | 2/2020 |

OTHER PUBLICATIONS

PCT International Application No. PCT/KR2020/004951, Search Report dated Jan. 8, 2021, 3 pages.

*Primary Examiner* — Adrian S Wilson
(74) *Attorney, Agent, or Firm* — LEE, HONG, DEGERMAN, KANG & WAIMEY

(57) ABSTRACT

Disclosed is a display device. A display device according to the present disclosure comprises: a housing having an opening; a roller extending longitudinally and located inside the housing; a display panel that is wound on or unwound from the roller and partitions a certain space into a first space and a second space when located outside the housing after passing through the opening; a sensor that is adjacent to a sensing area formed in at least one among the first space and the second space, and senses whether or not there are objects that have entered the sensing area; and a control unit that, on the basis of the information acquired by the sensor, controls whether to perform an operation for winding or unwinding the display panel on or from the roller.

15 Claims, 89 Drawing Sheets

(56) References Cited

U.S. PATENT DOCUMENTS

| | | | |
|---|---|---|---|
| 10,420,227 B2* | 9/2019 | Lee | H05K 5/0221 |
| 10,652,376 B2* | 5/2020 | Yu | H04M 1/0216 |
| 10,748,456 B2* | 8/2020 | Pyo | G09F 15/0062 |
| 10,769,971 B2* | 9/2020 | Kim | H10K 77/111 |
| 11,531,375 B2* | 12/2022 | Cho | H04M 1/0268 |
| 2010/0033435 A1* | 2/2010 | Huitema | G09F 9/301 |
| | | | 345/173 |
| 2010/0053081 A1* | 3/2010 | Jee | G06F 1/1686 |
| | | | 345/157 |
| 2013/0127917 A1* | 5/2013 | Kwack | G06F 1/1652 |
| | | | 345/660 |
| 2014/0194165 A1* | 7/2014 | Hwang | G06F 3/147 |
| | | | 455/566 |
| 2016/0139633 A1* | 5/2016 | Lee | G06F 1/1652 |
| | | | 345/33 |
| 2017/0023978 A1* | 1/2017 | Cho | G06F 1/1652 |
| 2017/0140504 A1* | 5/2017 | Jeong | G06F 1/1677 |
| 2017/0196102 A1* | 7/2017 | Shin | G06F 1/1605 |
| 2017/0318693 A1 | 11/2017 | Kim et al. | |
| 2018/0014415 A1 | 1/2018 | Choi et al. | |
| 2018/0376603 A1* | 12/2018 | Lee | H05K 5/0217 |
| 2019/0155476 A1* | 5/2019 | Kim | G09G 3/2092 |
| 2019/0227599 A1* | 7/2019 | Kwak | G09G 5/003 |
| 2019/0364676 A1* | 11/2019 | Lee | H05K 5/0221 |
| 2019/0369670 A1* | 12/2019 | Cho | G06F 1/1656 |
| 2020/0035133 A1* | 1/2020 | Pyo | F16M 13/02 |

* cited by examiner

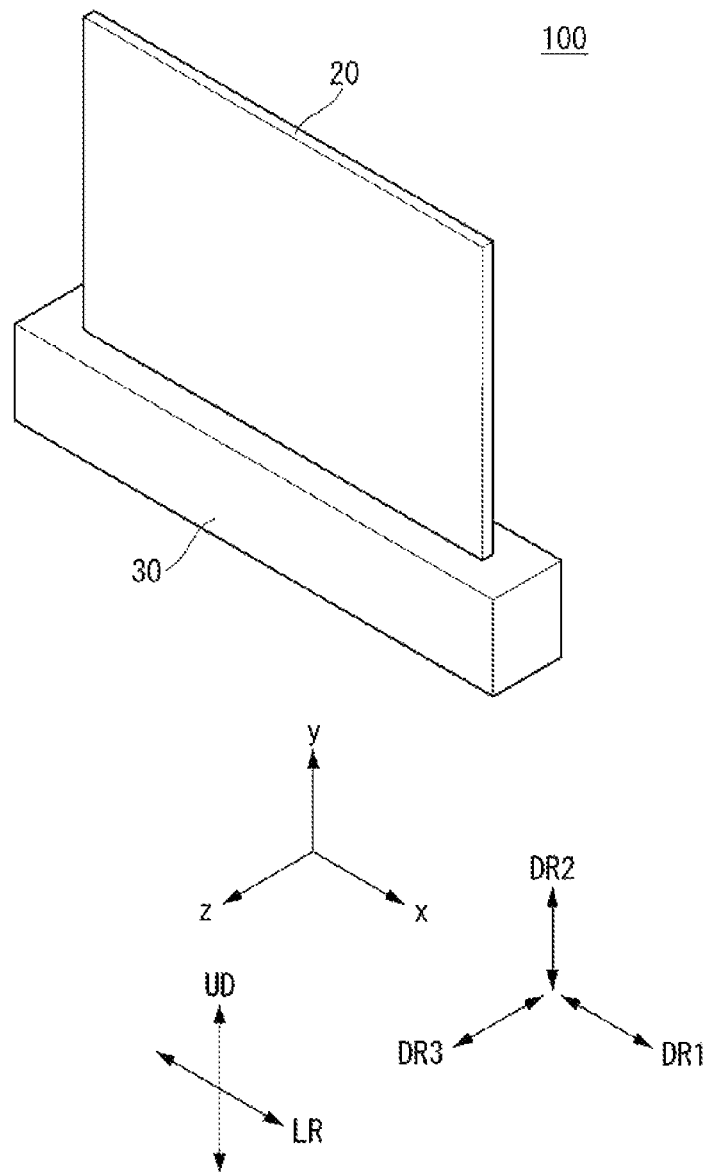
[FIG. 1]

[FIG. 2]
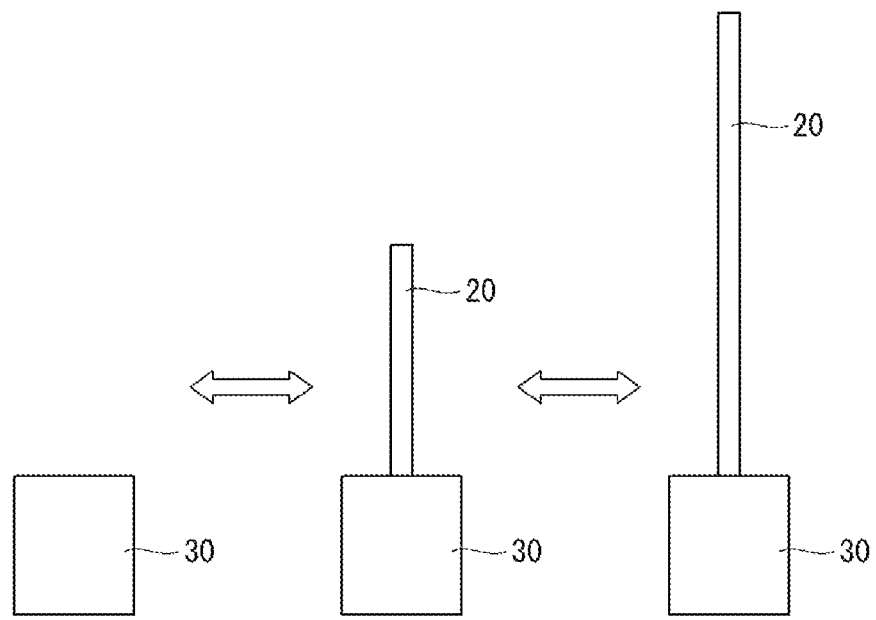

[FIG. 3]
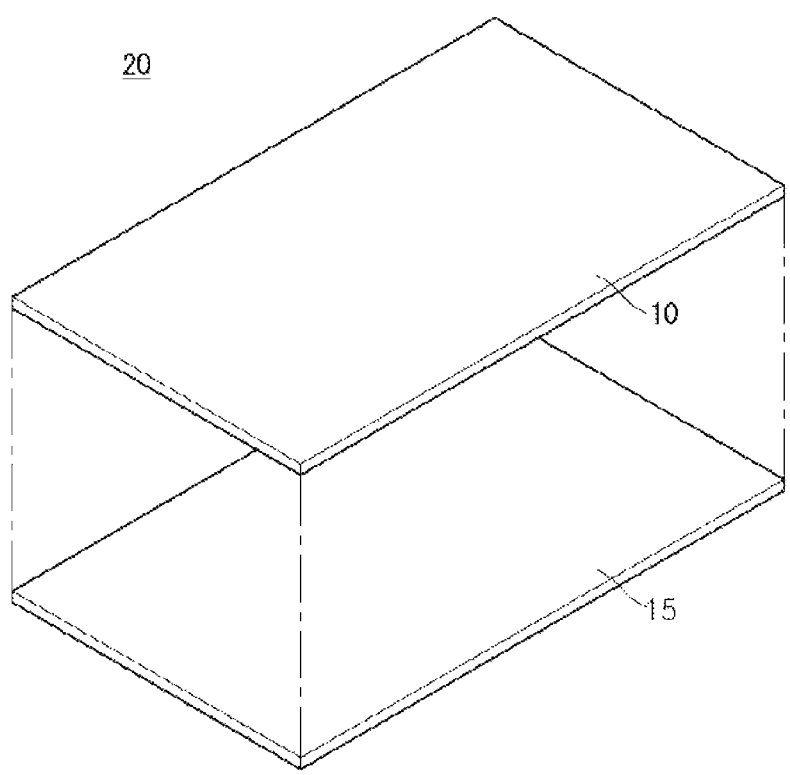

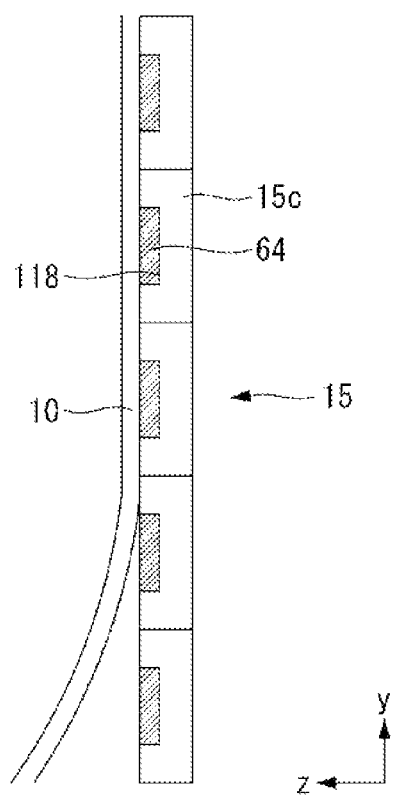
[FIG. 4]

[FIG. 5]
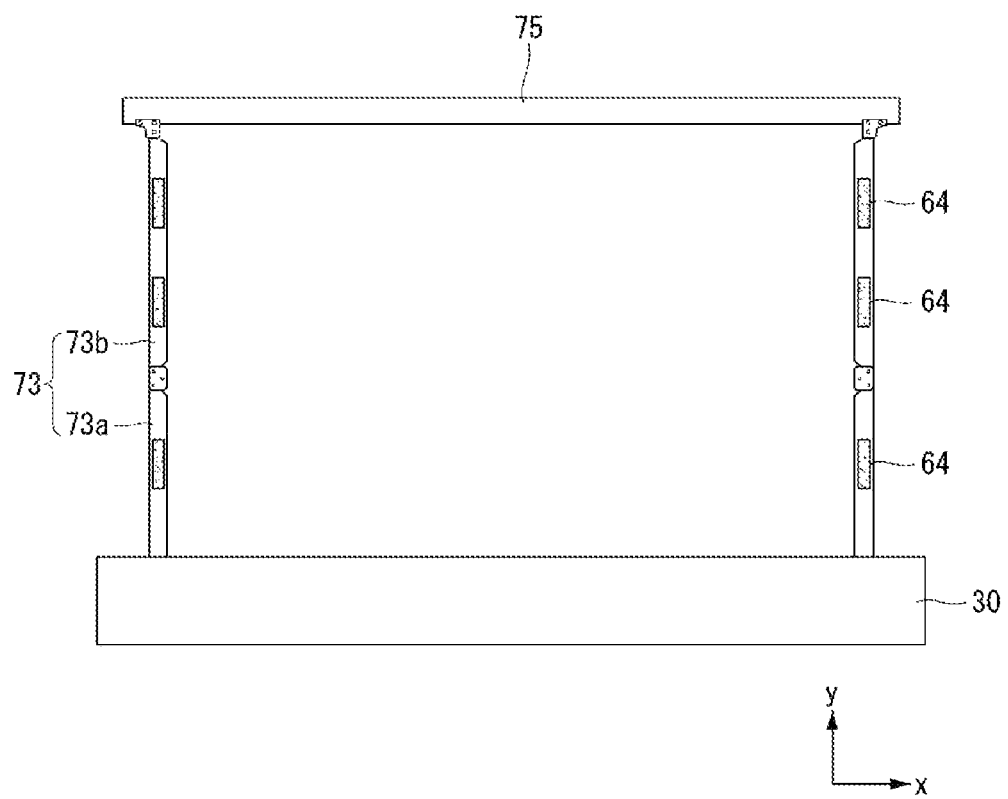

[FIG. 6]
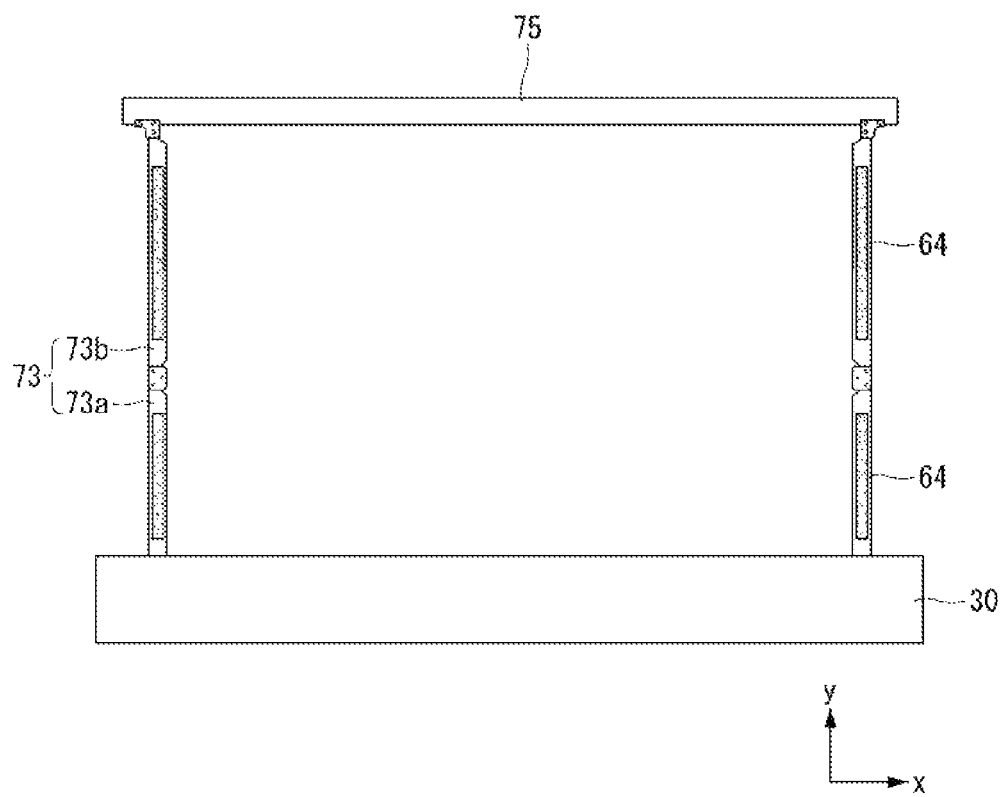

[FIG. 7]
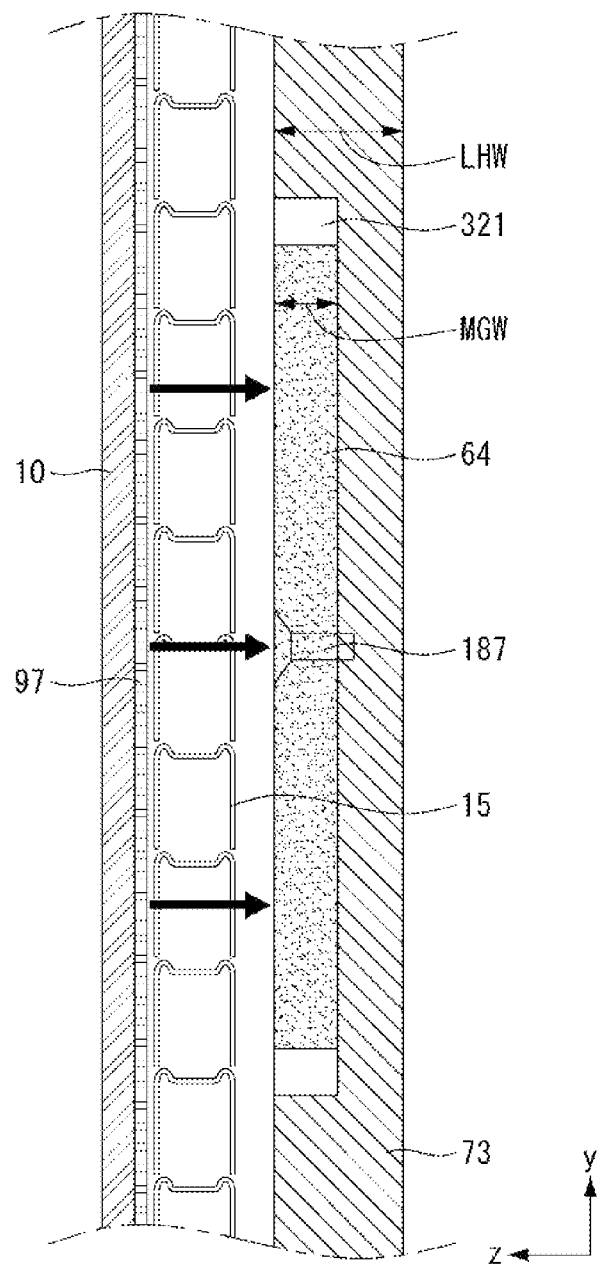

[FIG. 8]
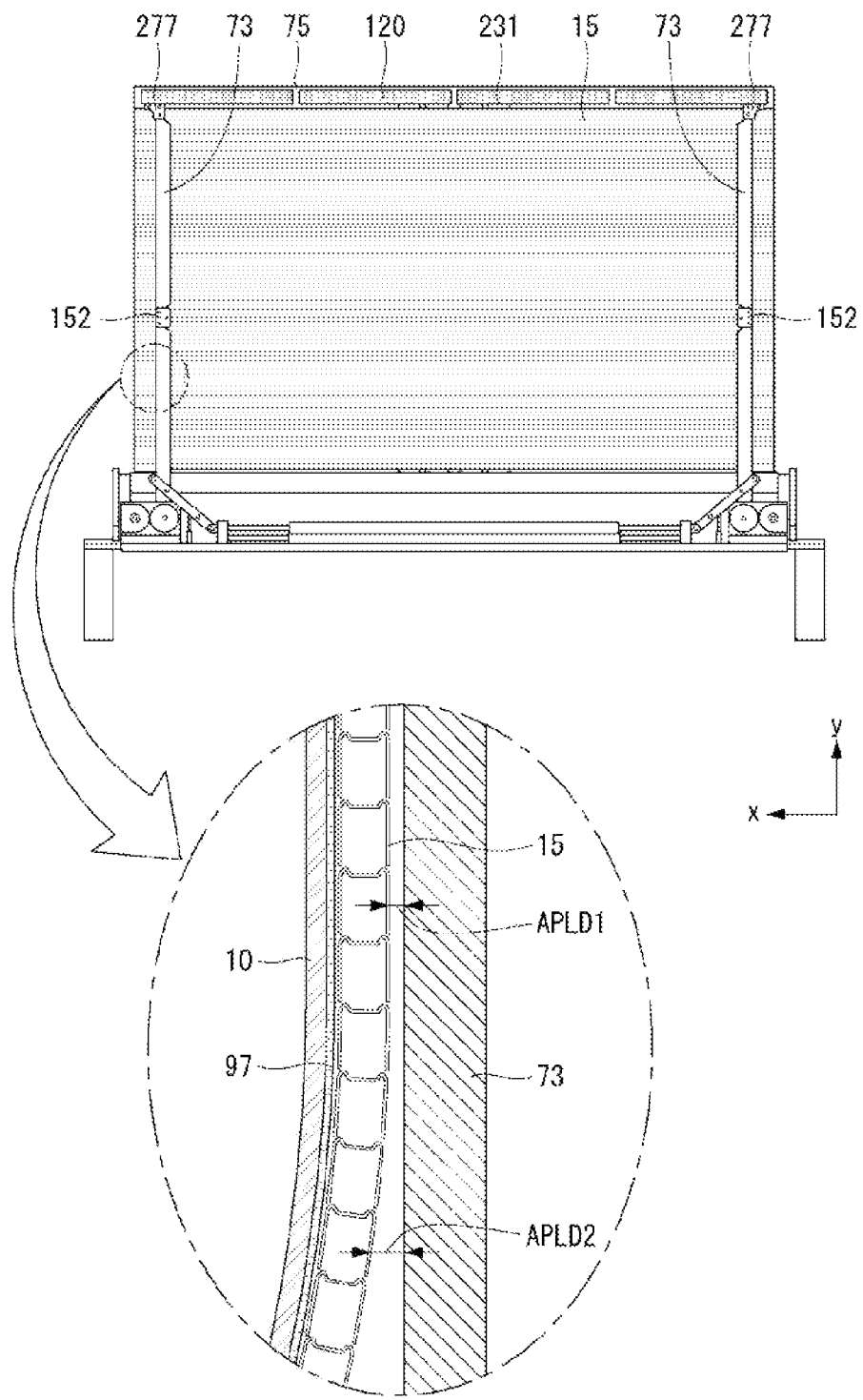

[FIG. 9]
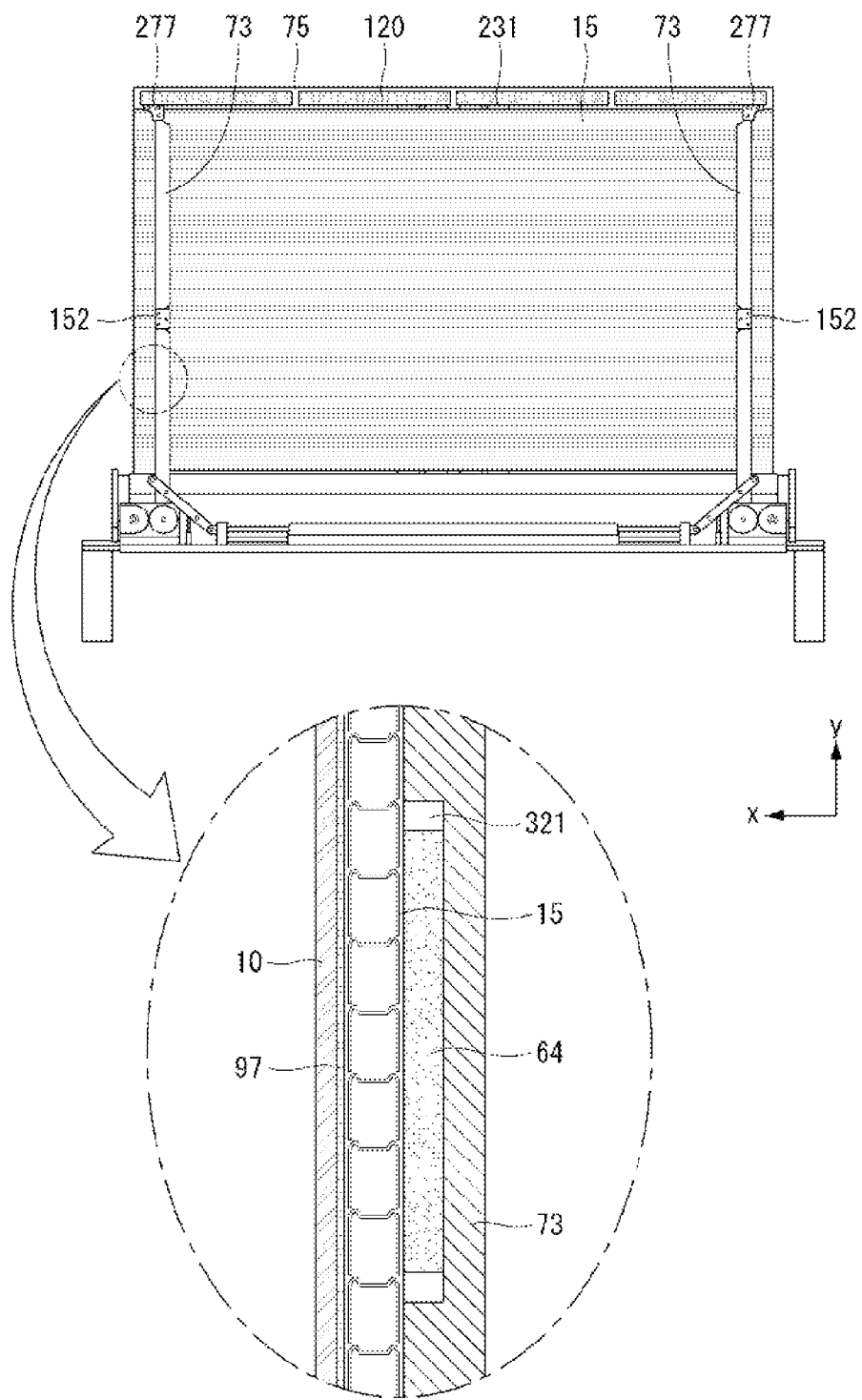

[FIG. 10]
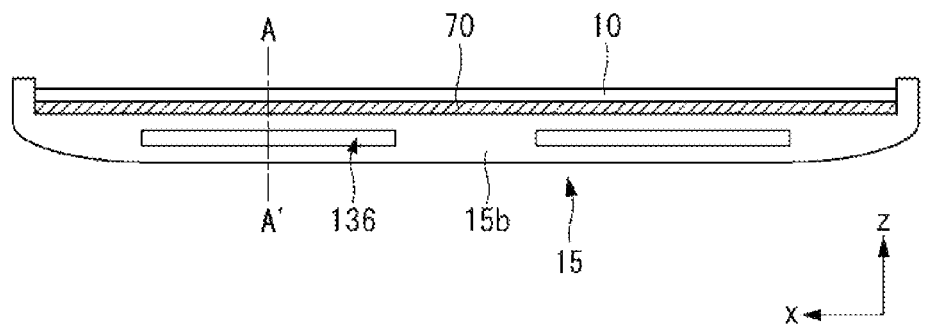
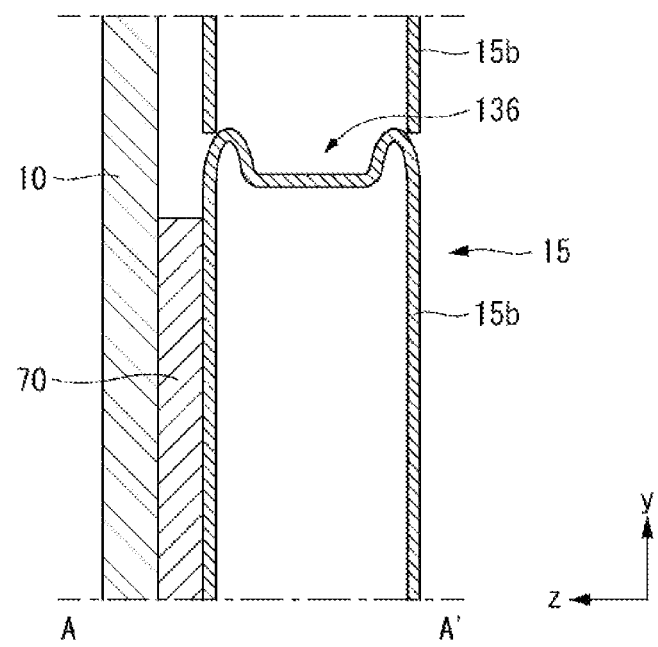

[FIG. 11]
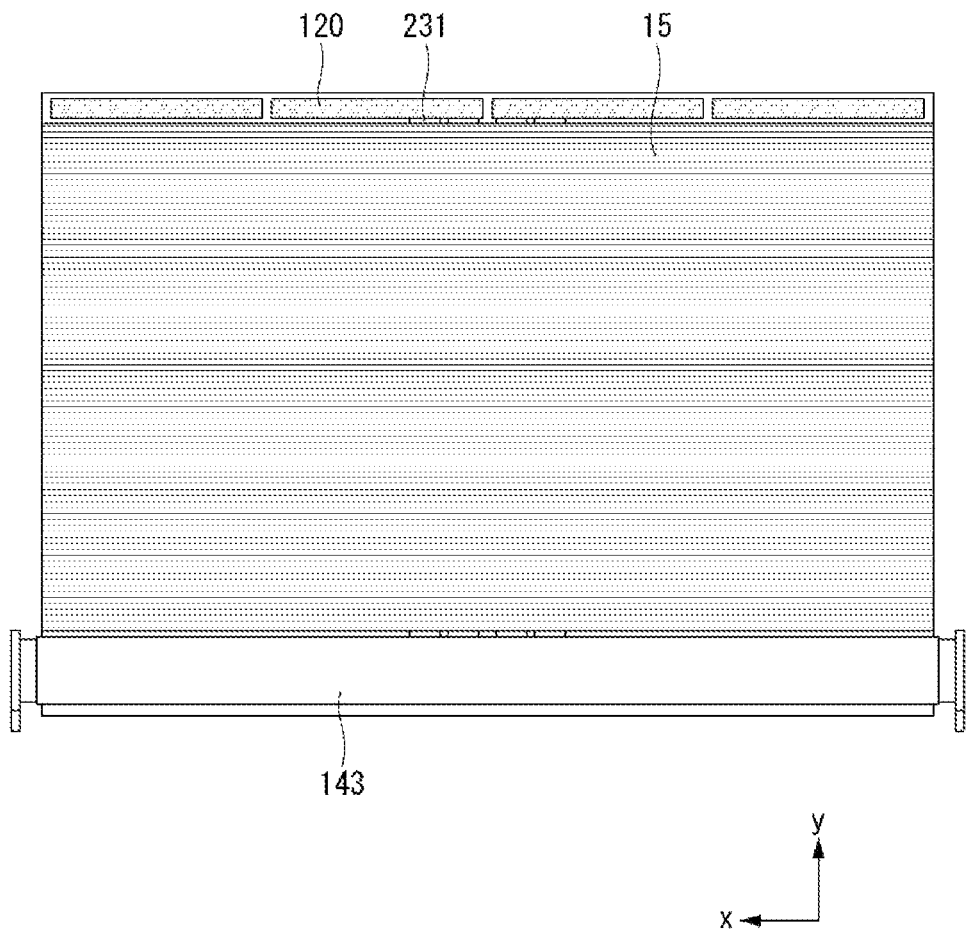

[FIG. 12]
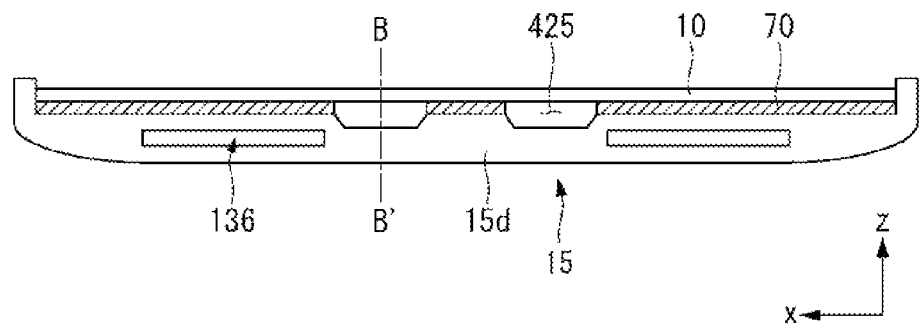
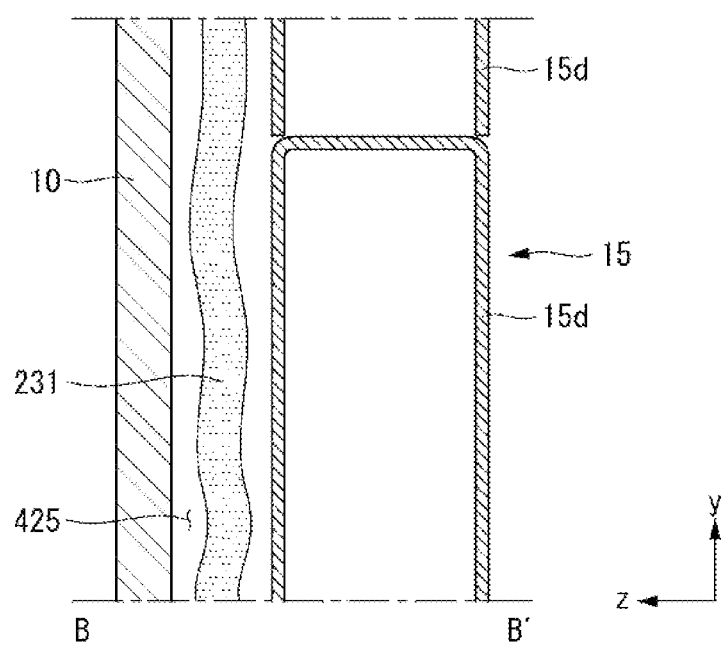

[FIG. 13]
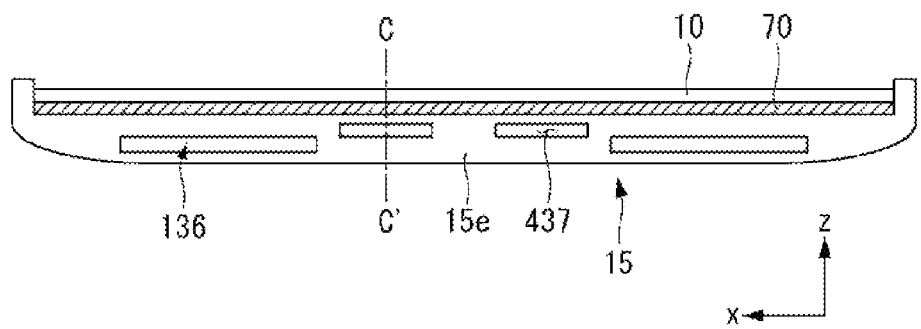
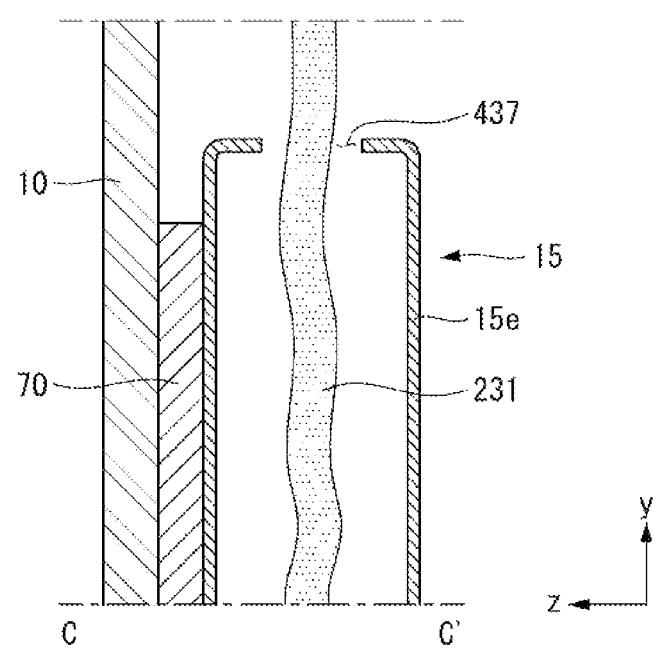

[FIG. 14]
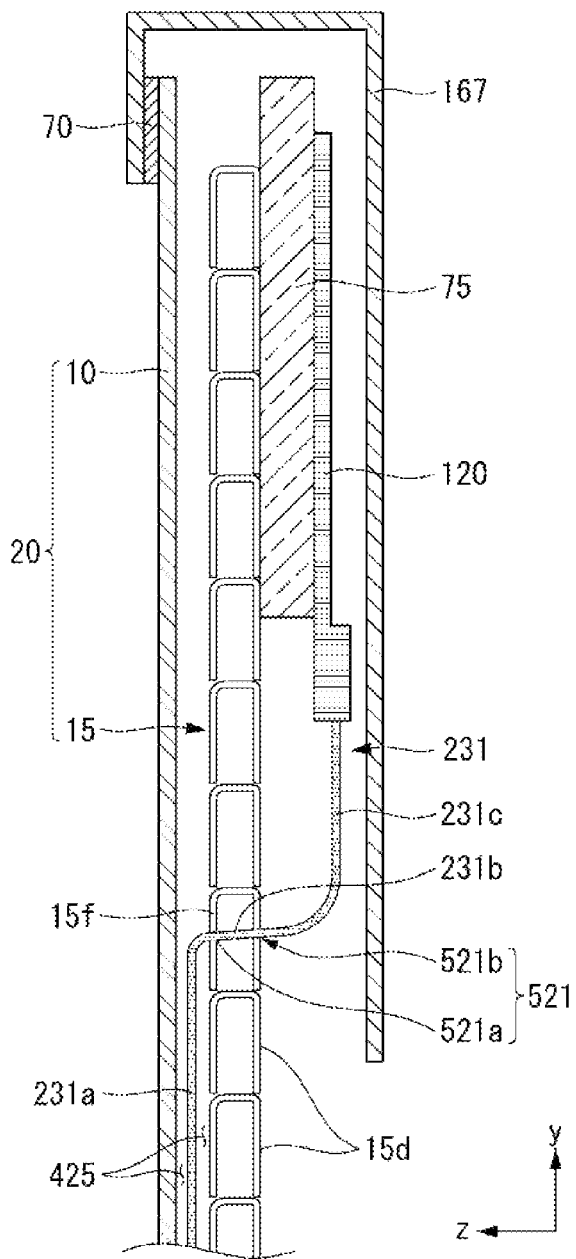

[FIG. 15]
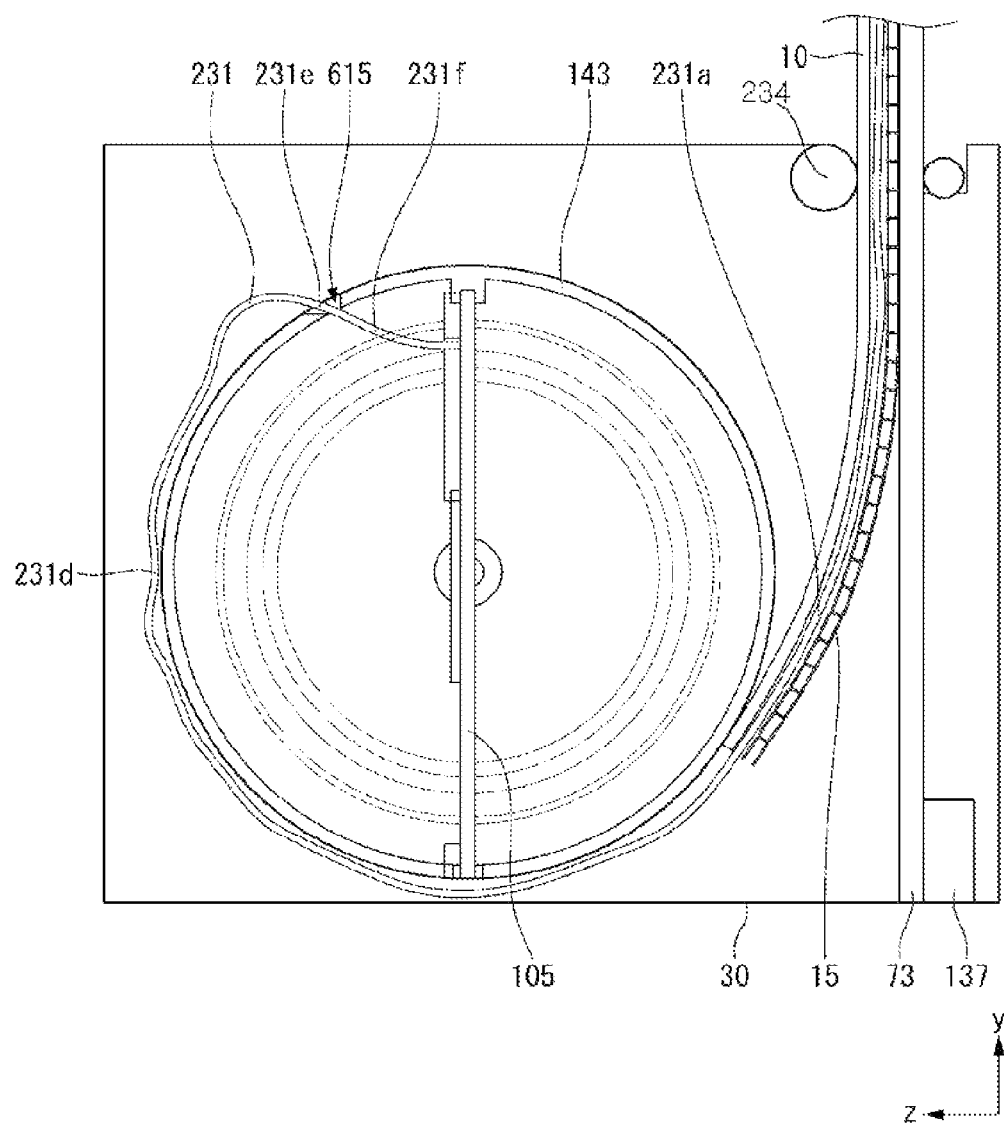

[FIG. 16]
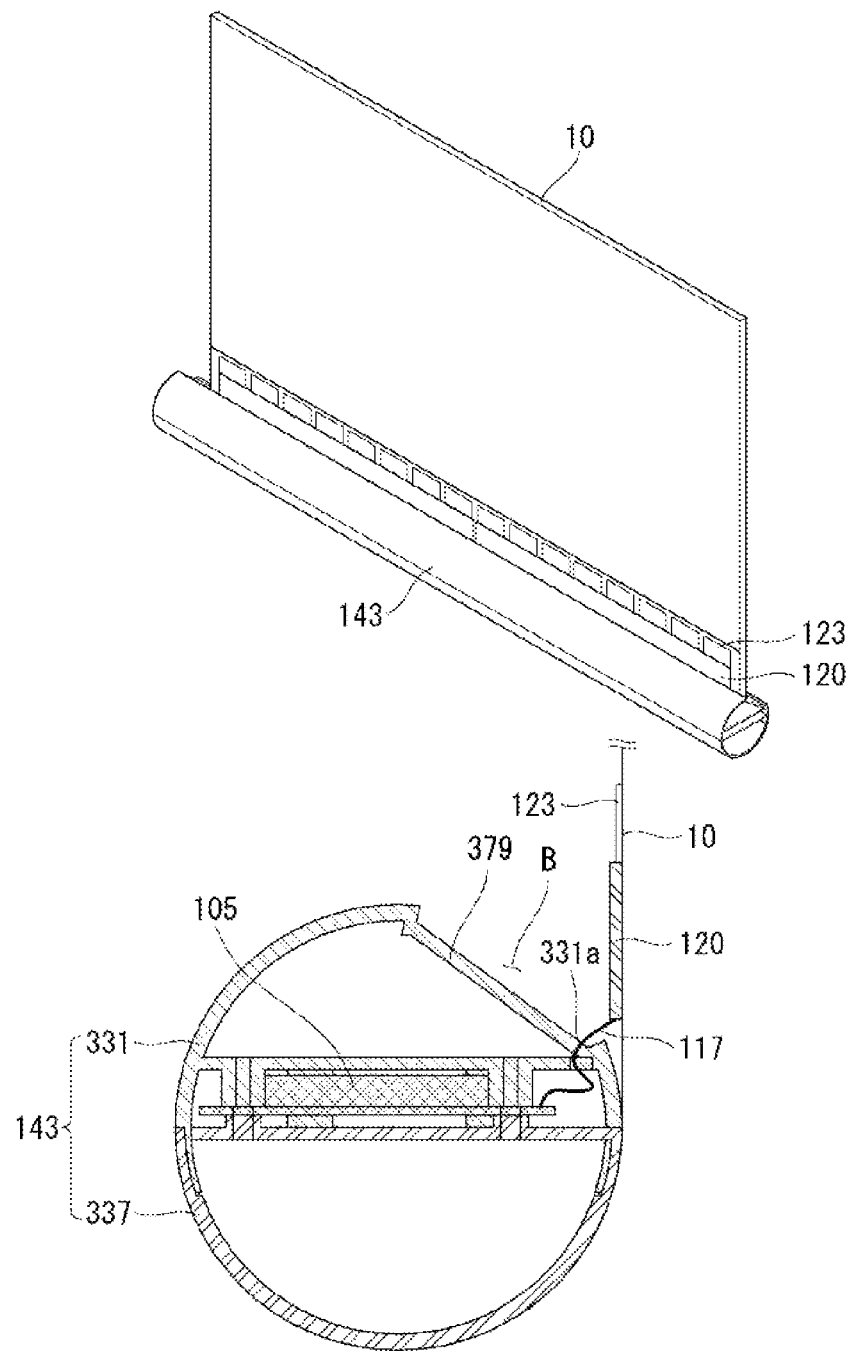

[FIG. 17]
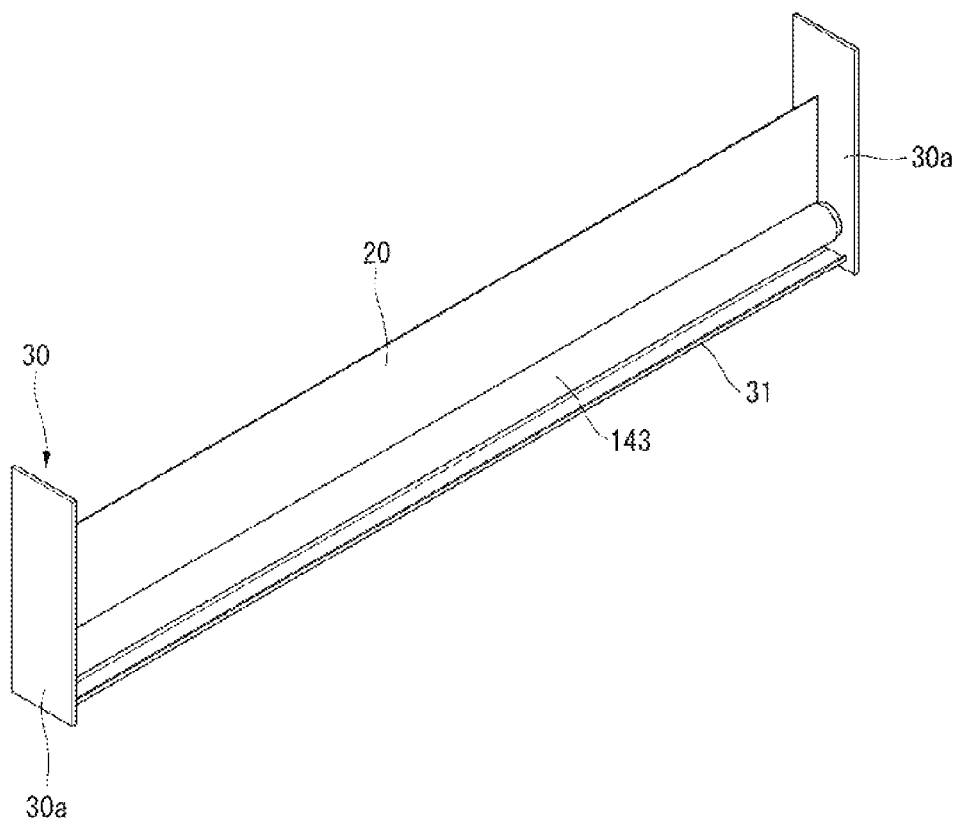

[FIG. 18]
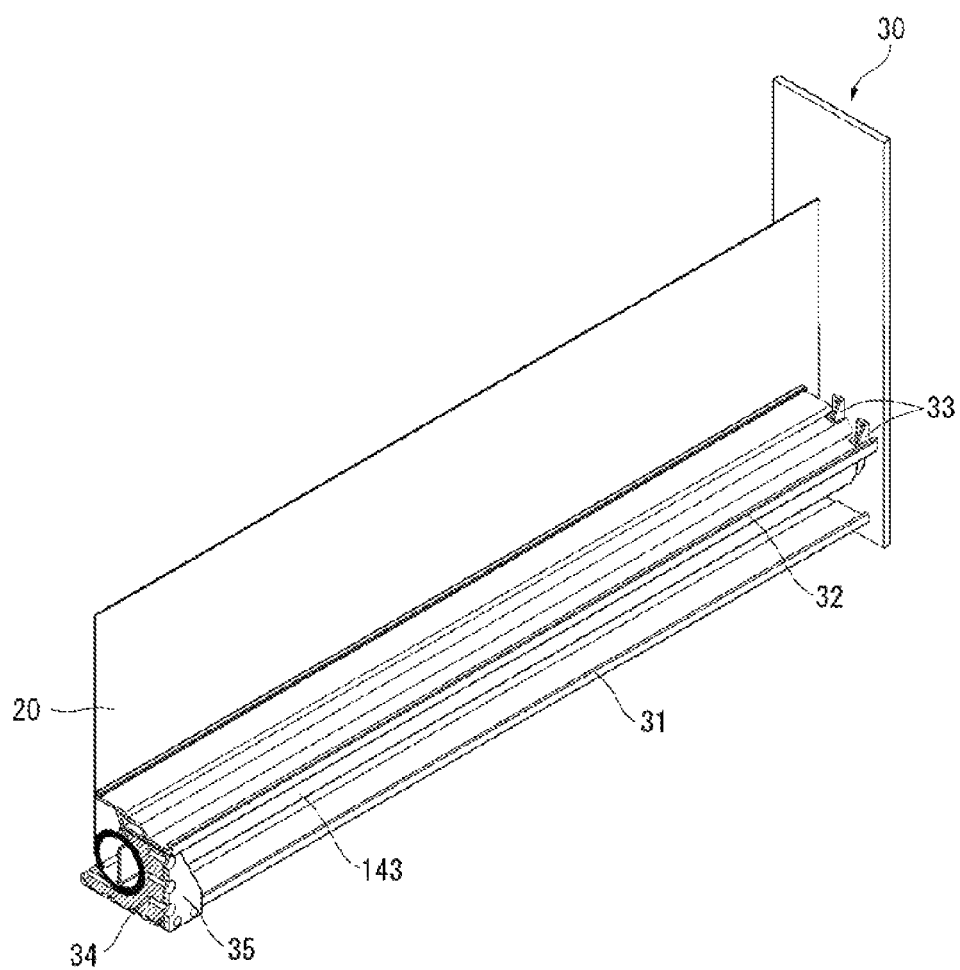

[FIG. 19]
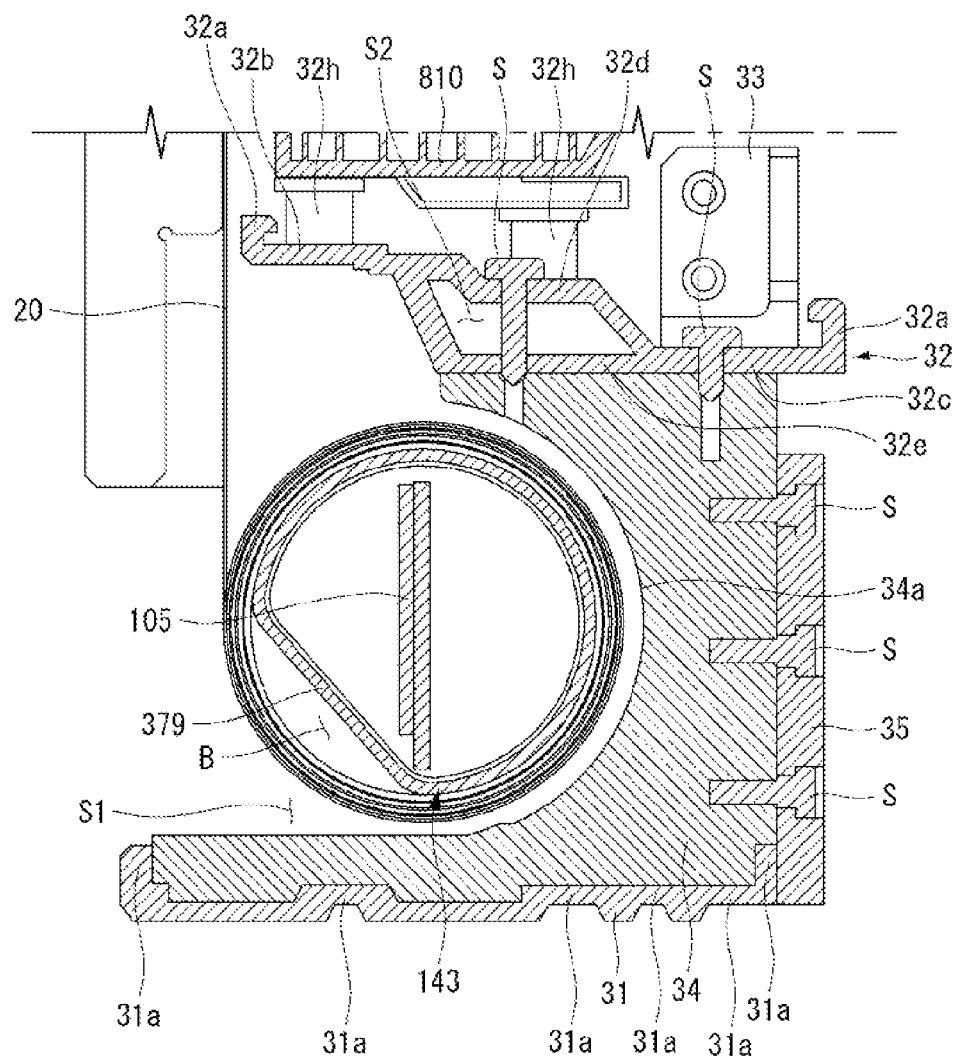

[FIG. 20]
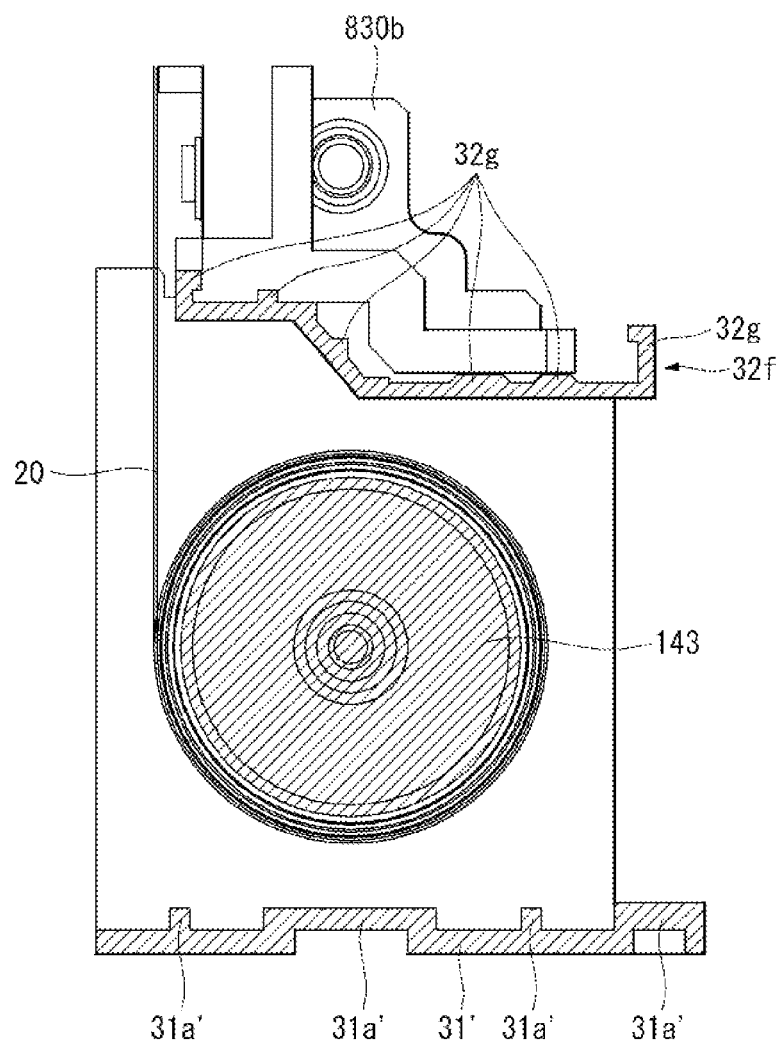

[FIG. 21]
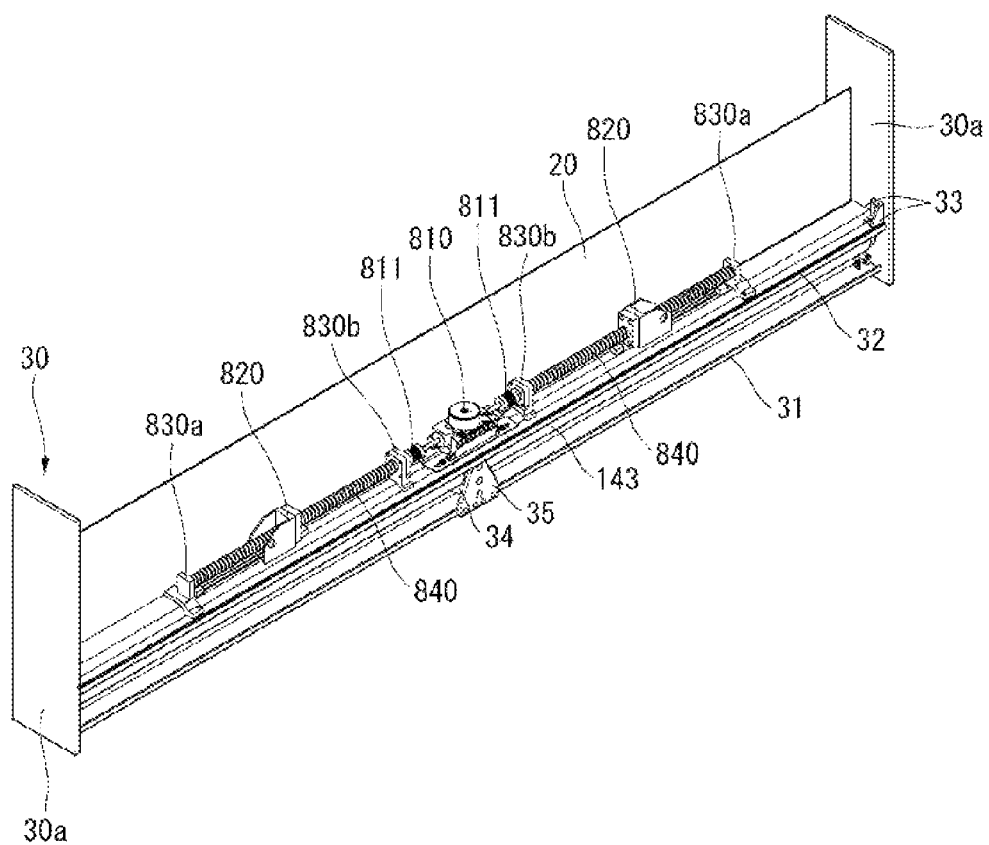

[FIG. 22]
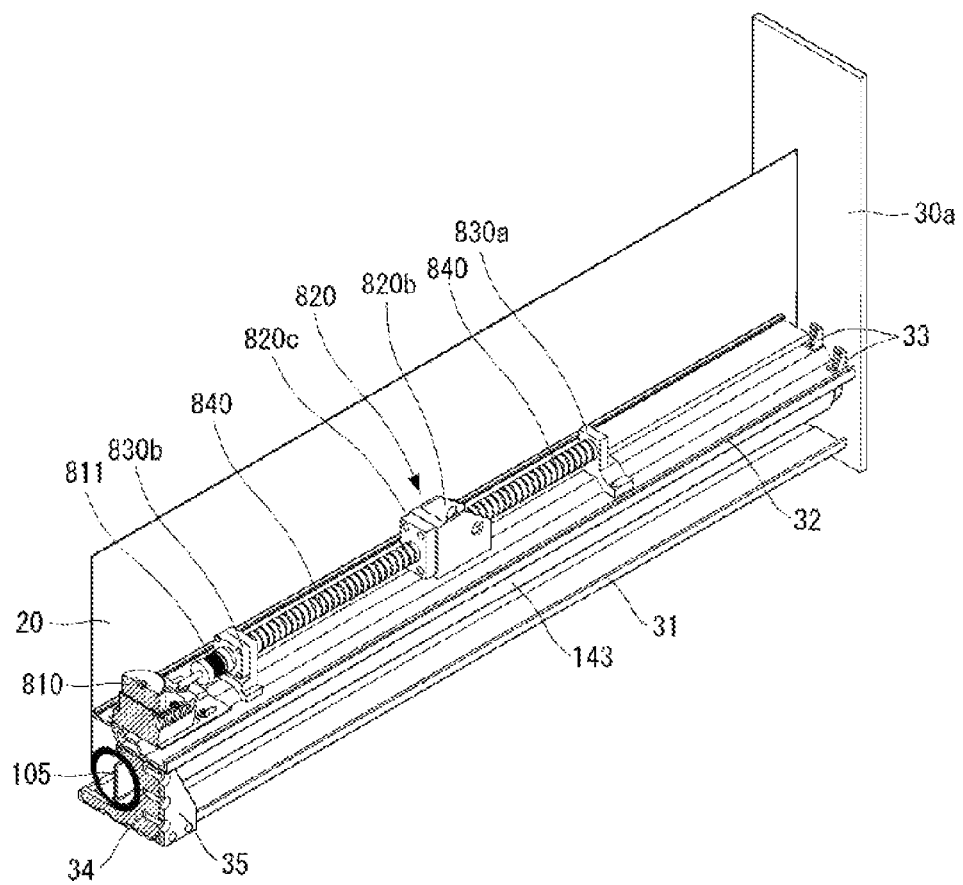

[FIG. 23]
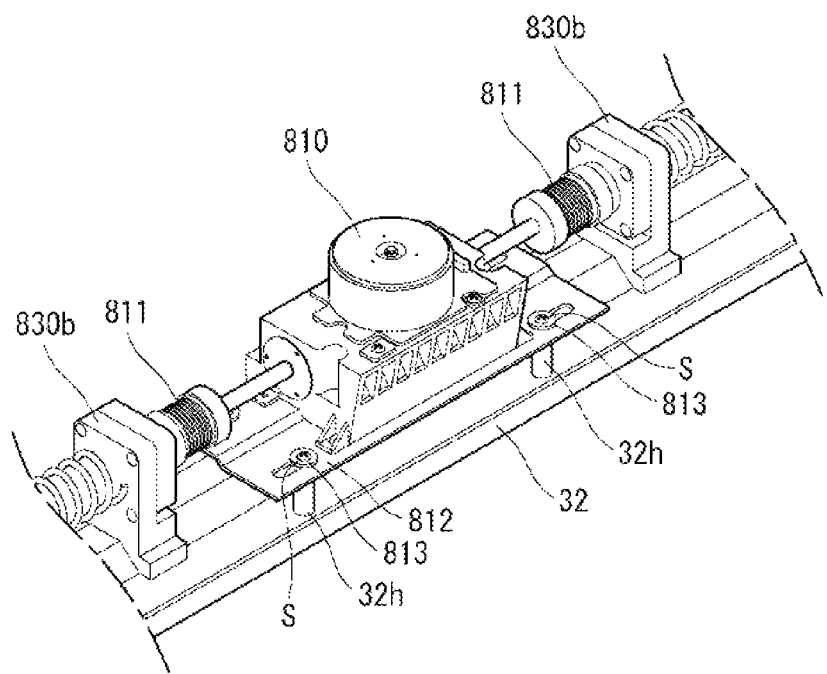

[FIG. 24]
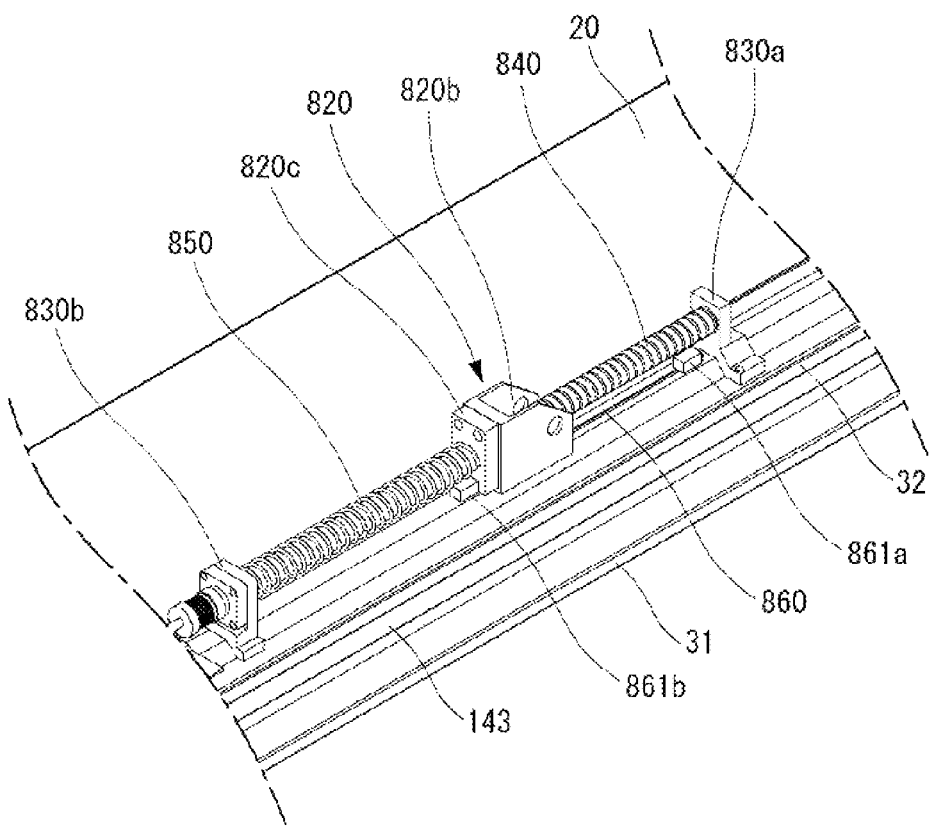

[FIG. 25]
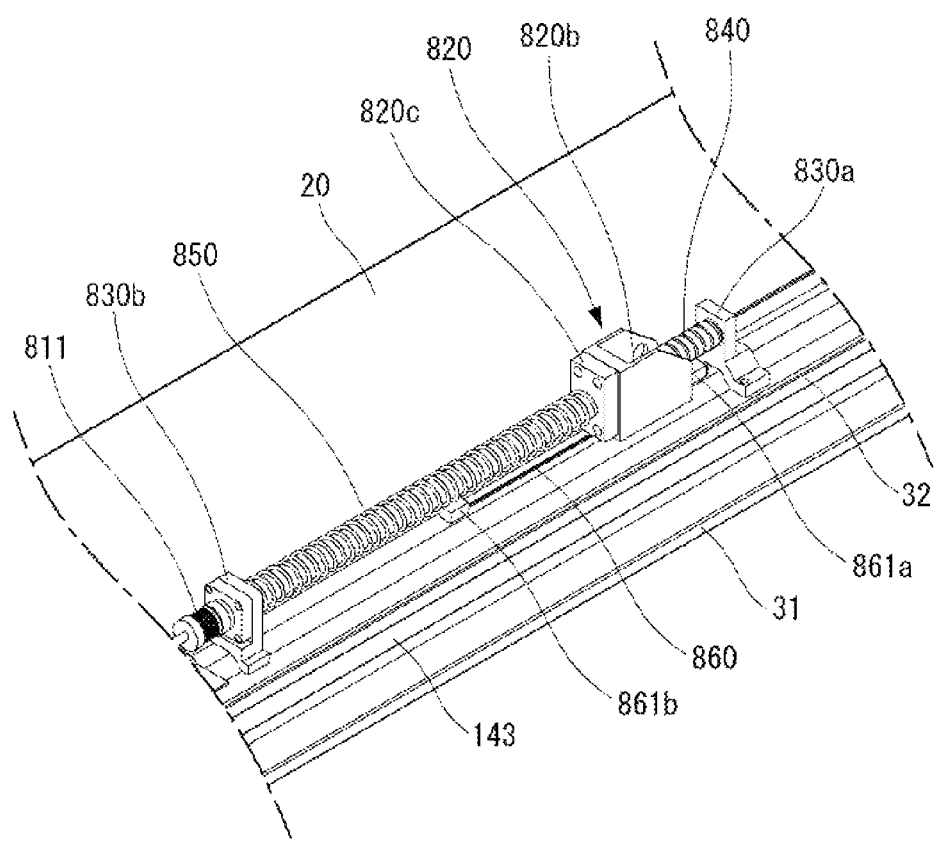

[FIG. 26]
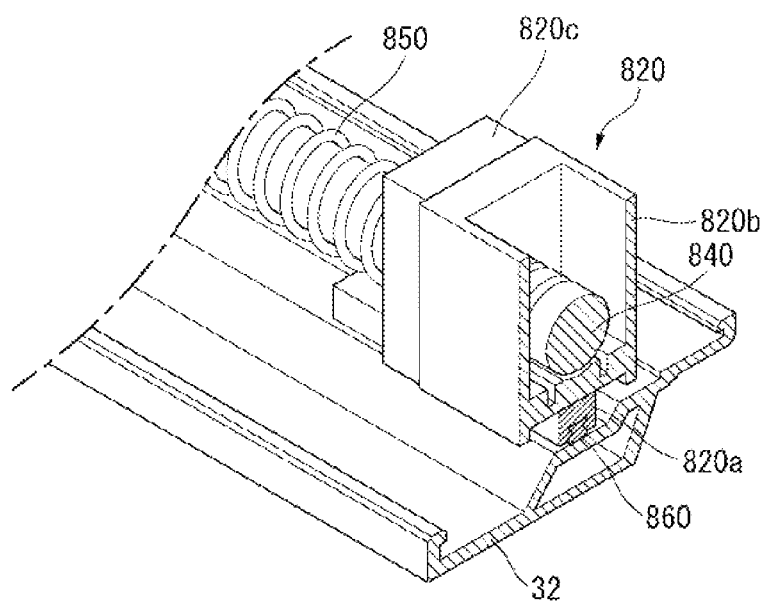

[FIG. 27]
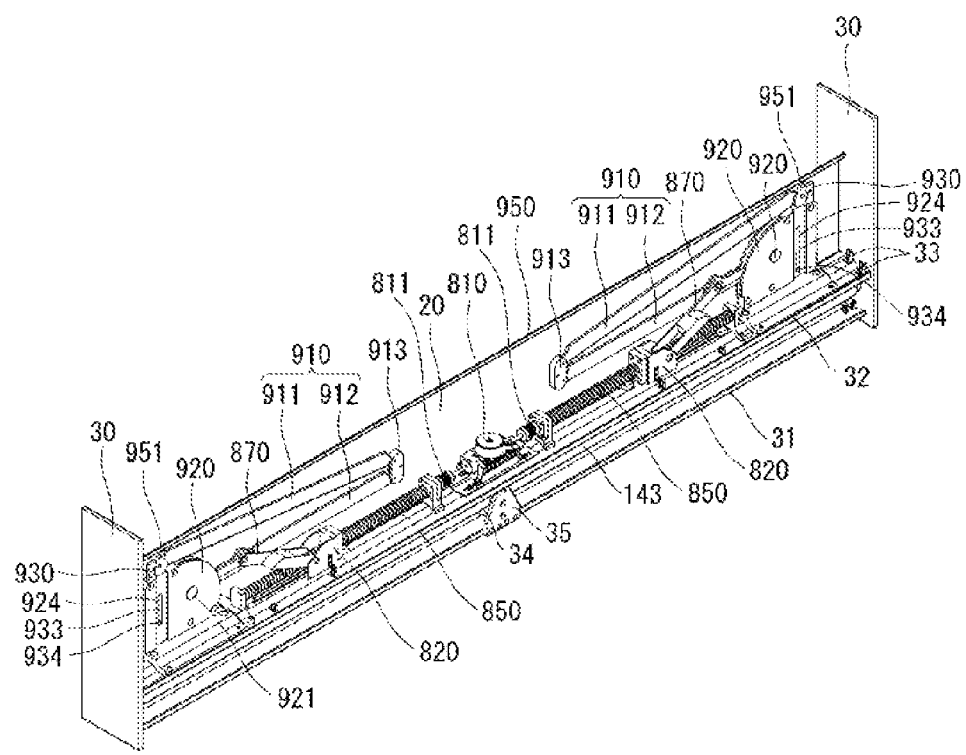

[FIG. 28]
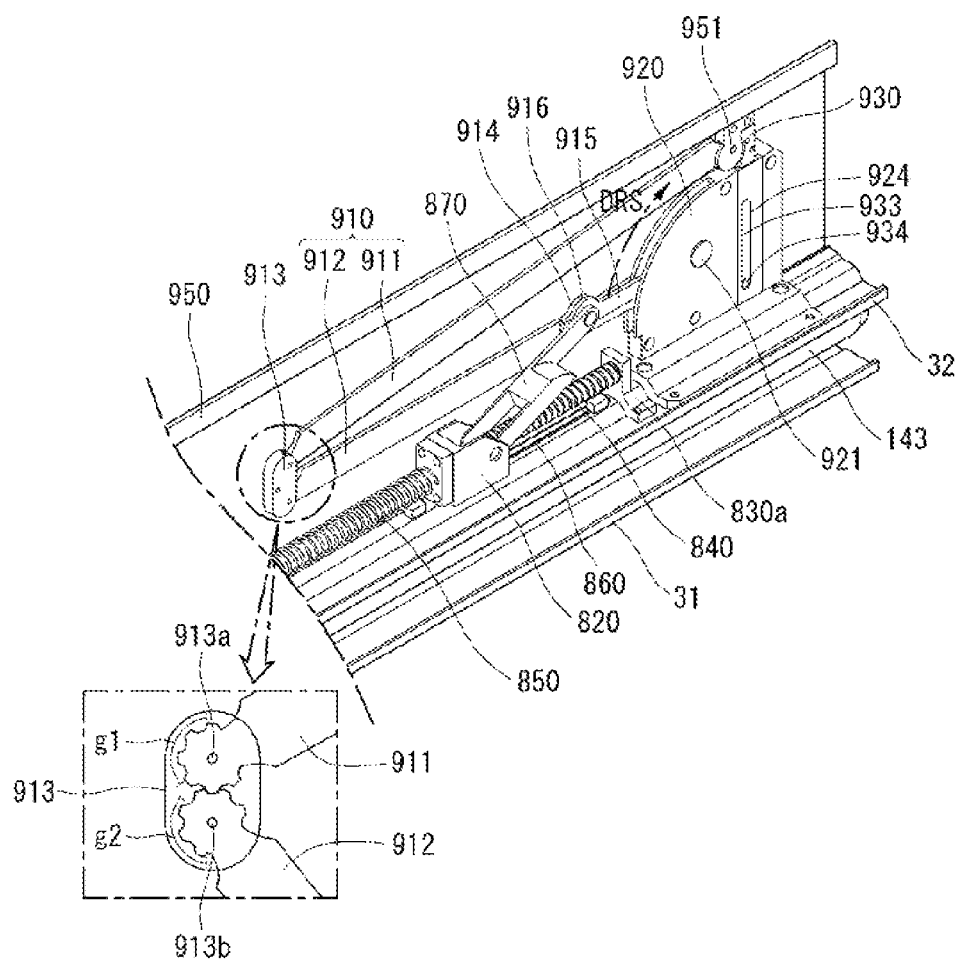

[FIG. 29]
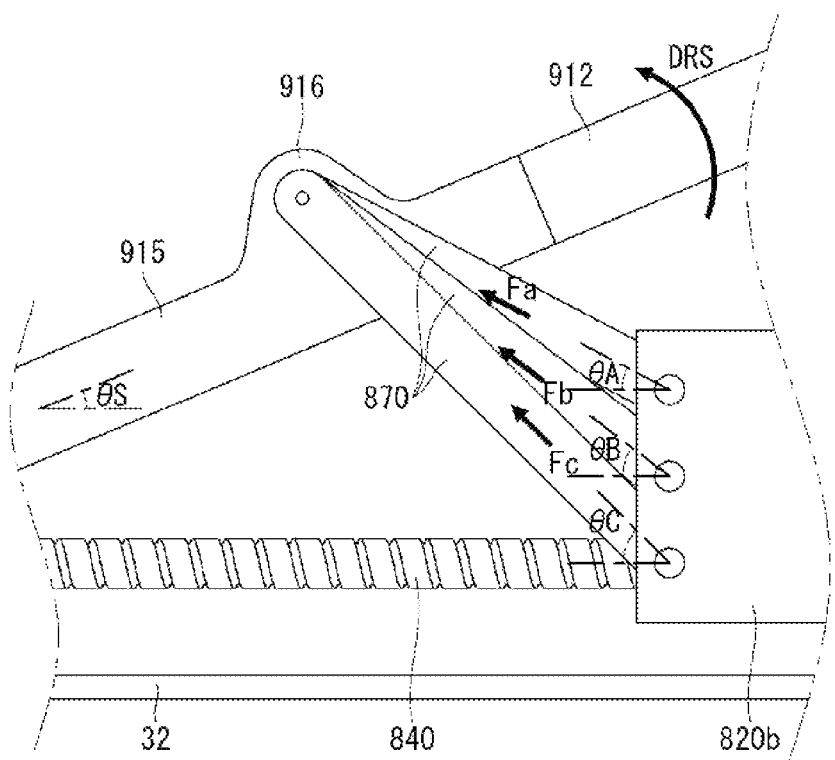

[FIG. 30]
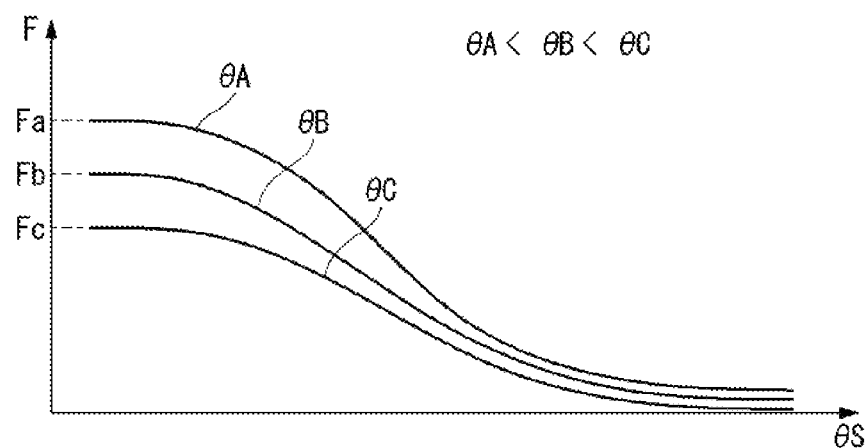

[FIG. 31]
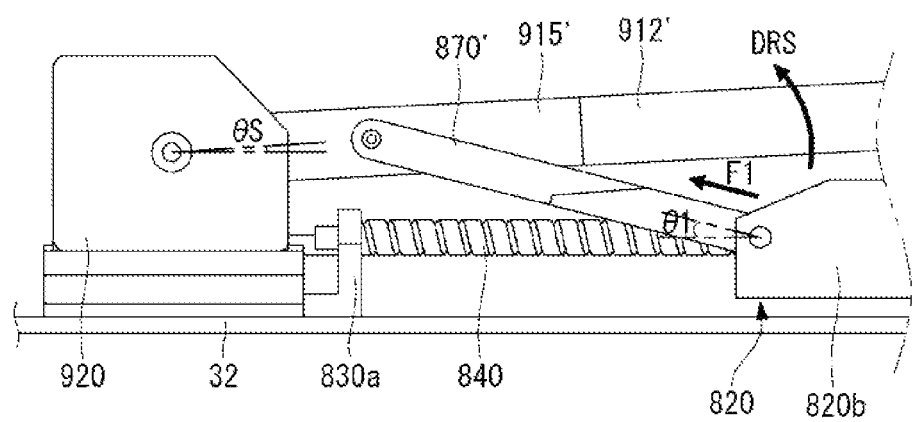

[FIG. 32]
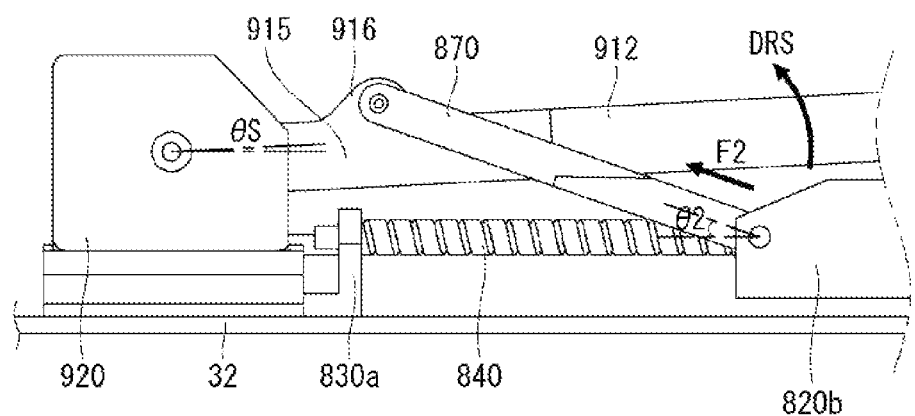

[FIG. 33]
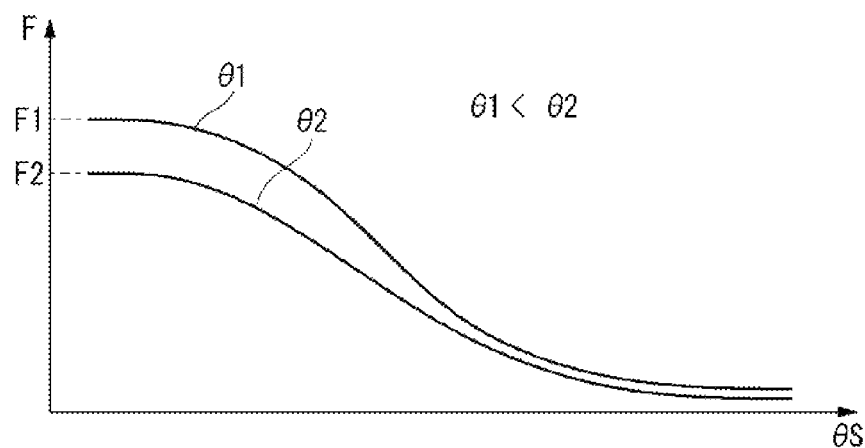

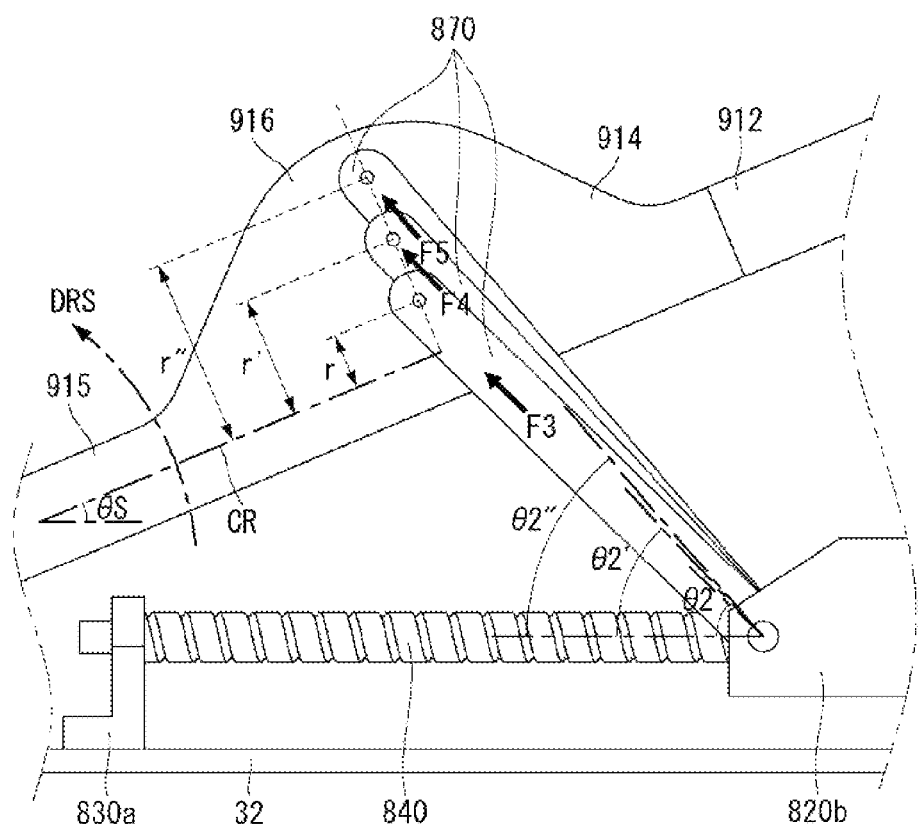
[FIG. 34]

[FIG. 35]
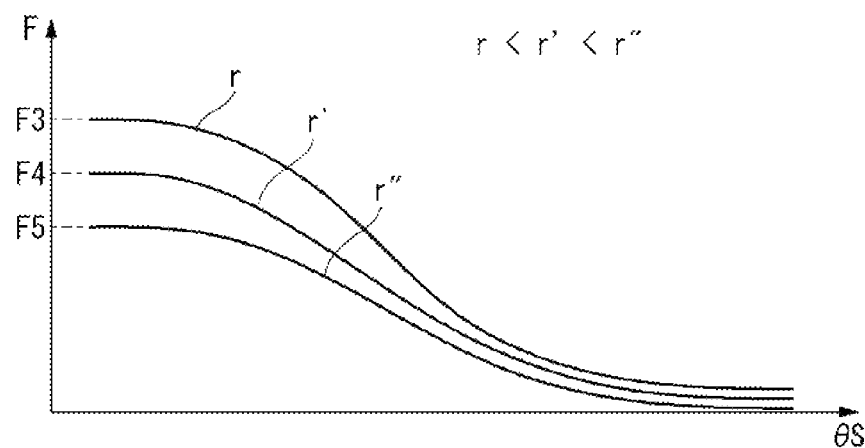

[FIG. 36]
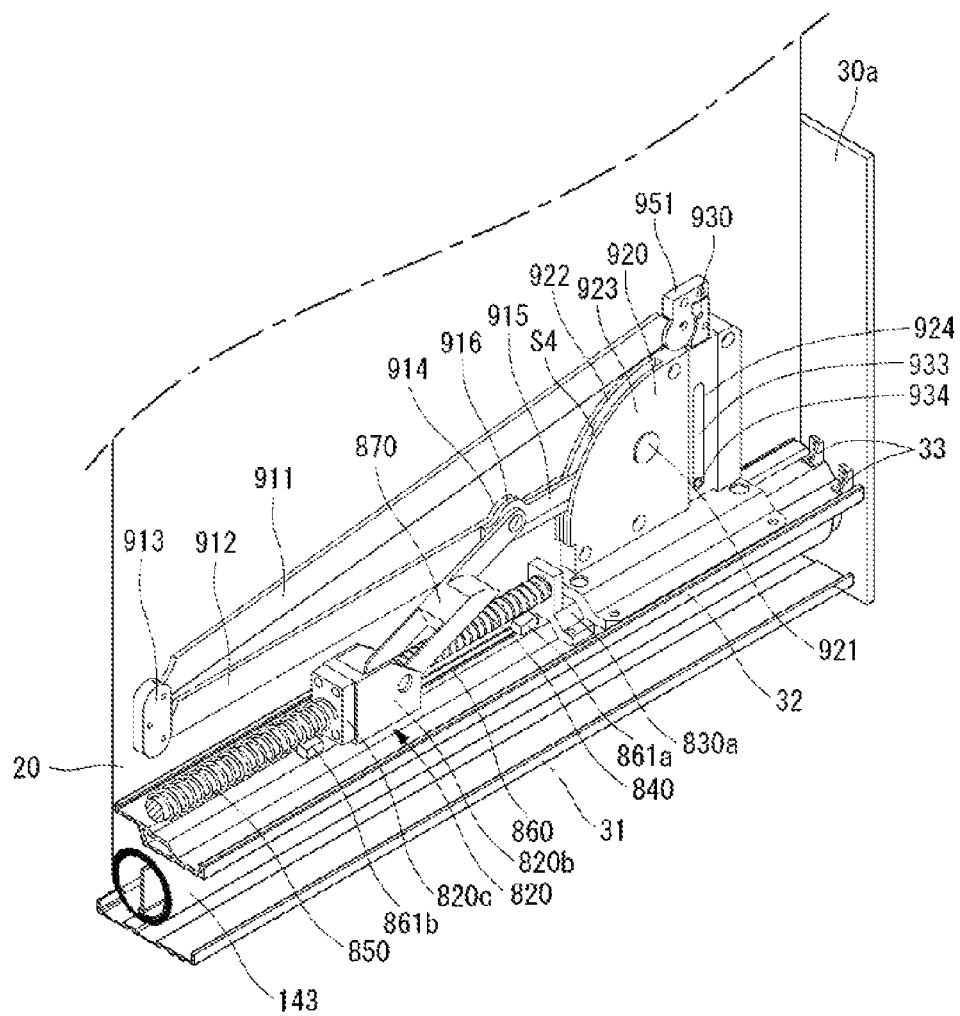

[FIG. 37]
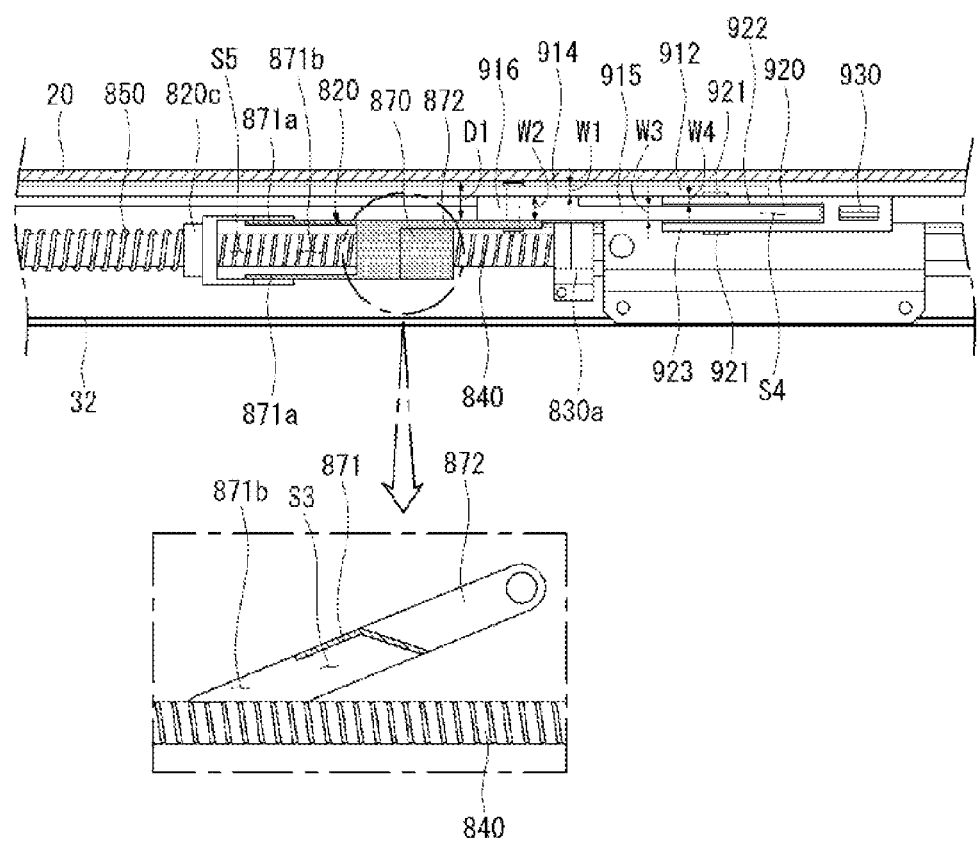

[FIG. 38]
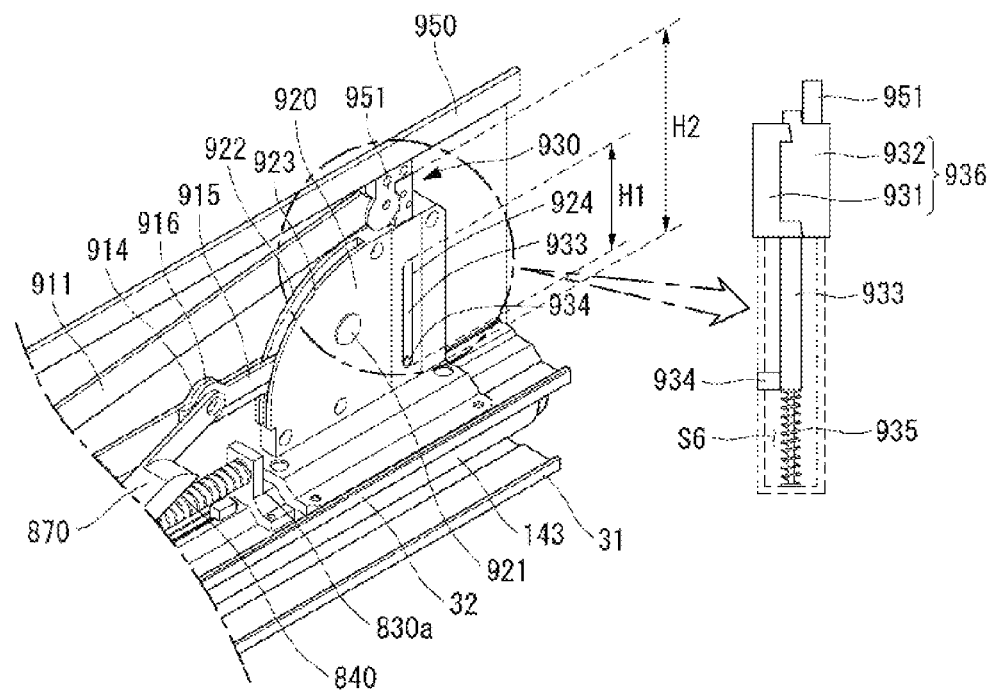

[FIG. 39]
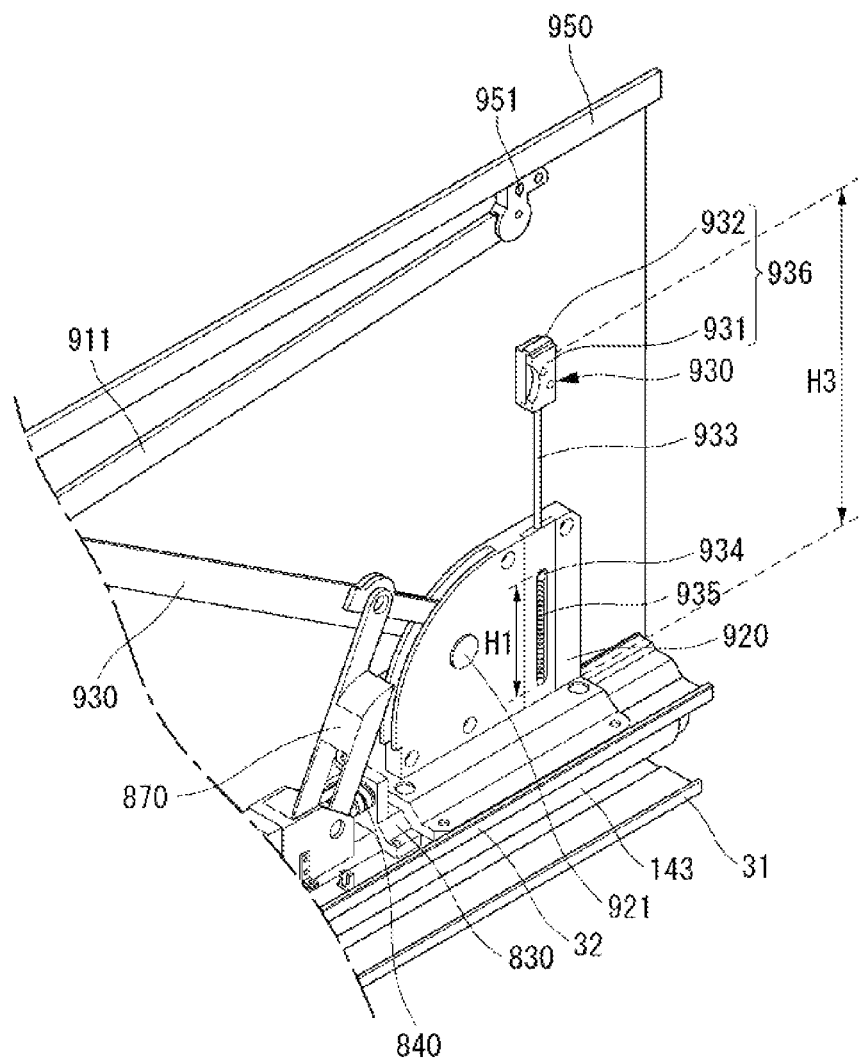

[FIG. 40]
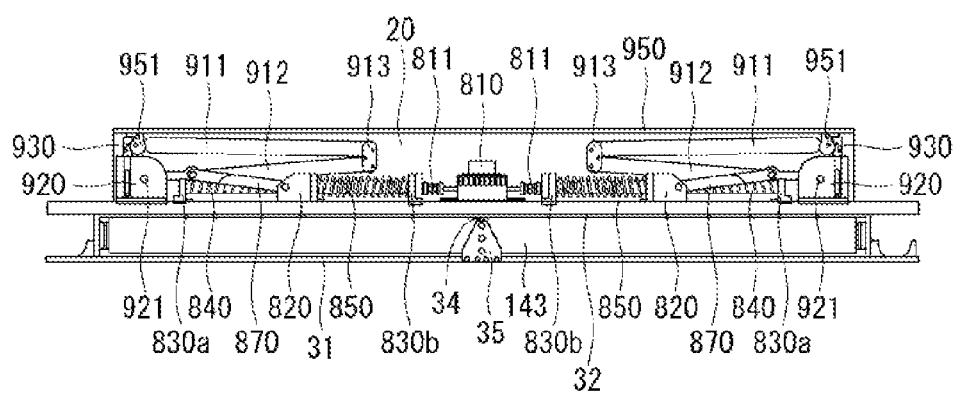

[FIG. 41]
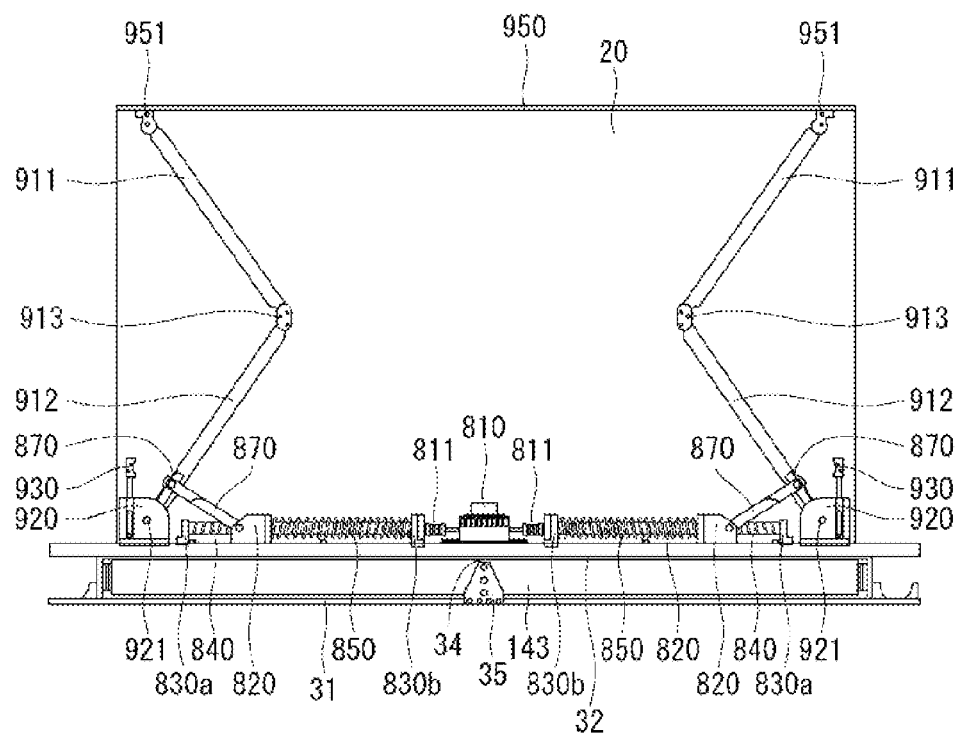

[FIG. 42]
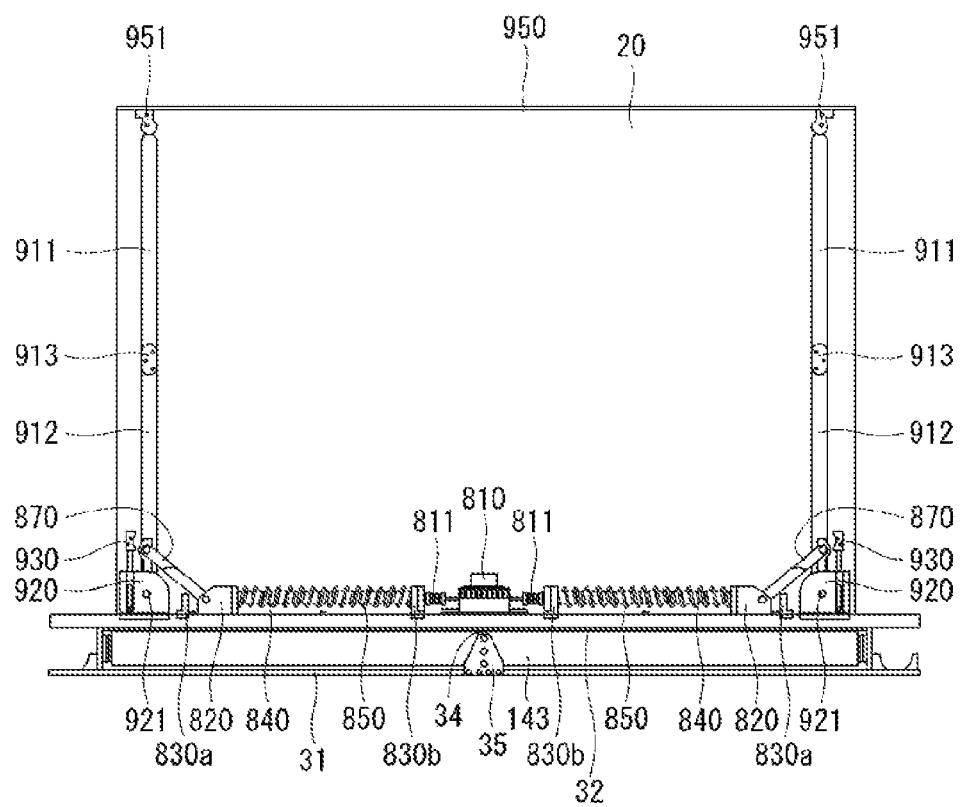

[FIG. 43]
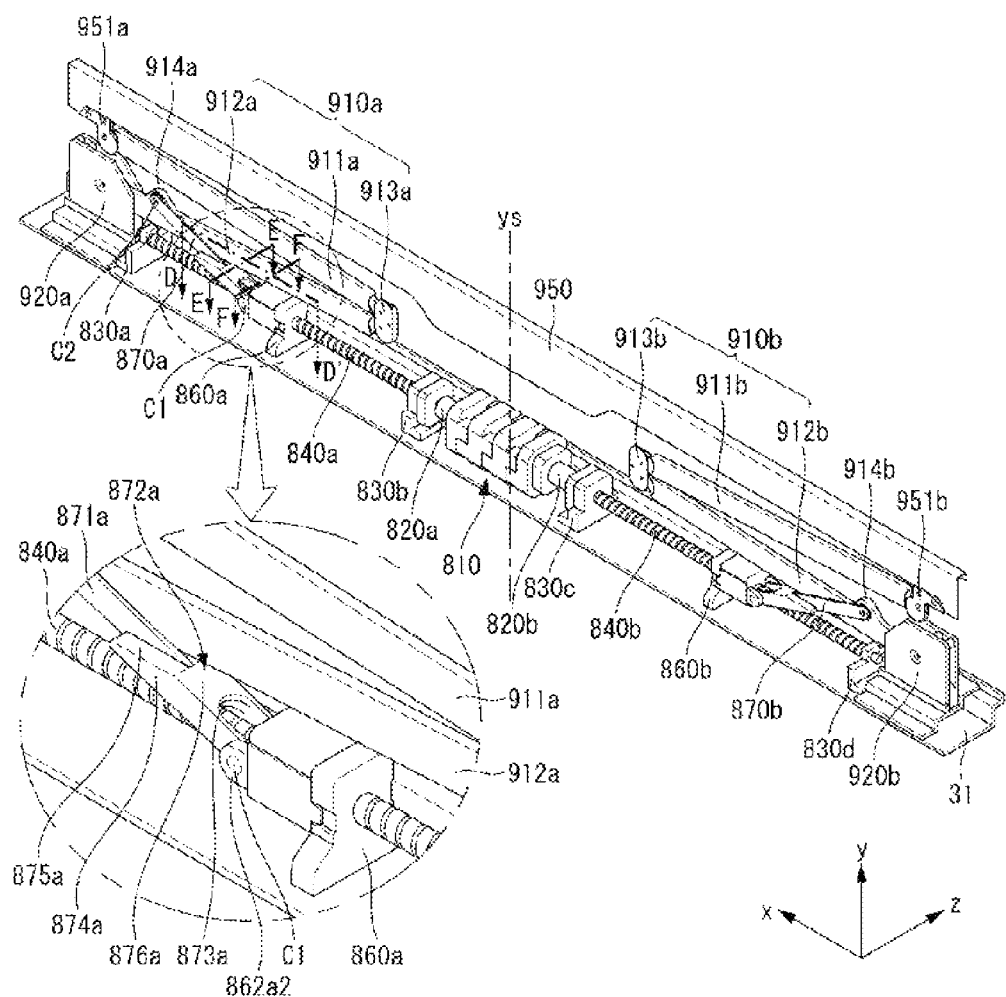

[FIG. 44]
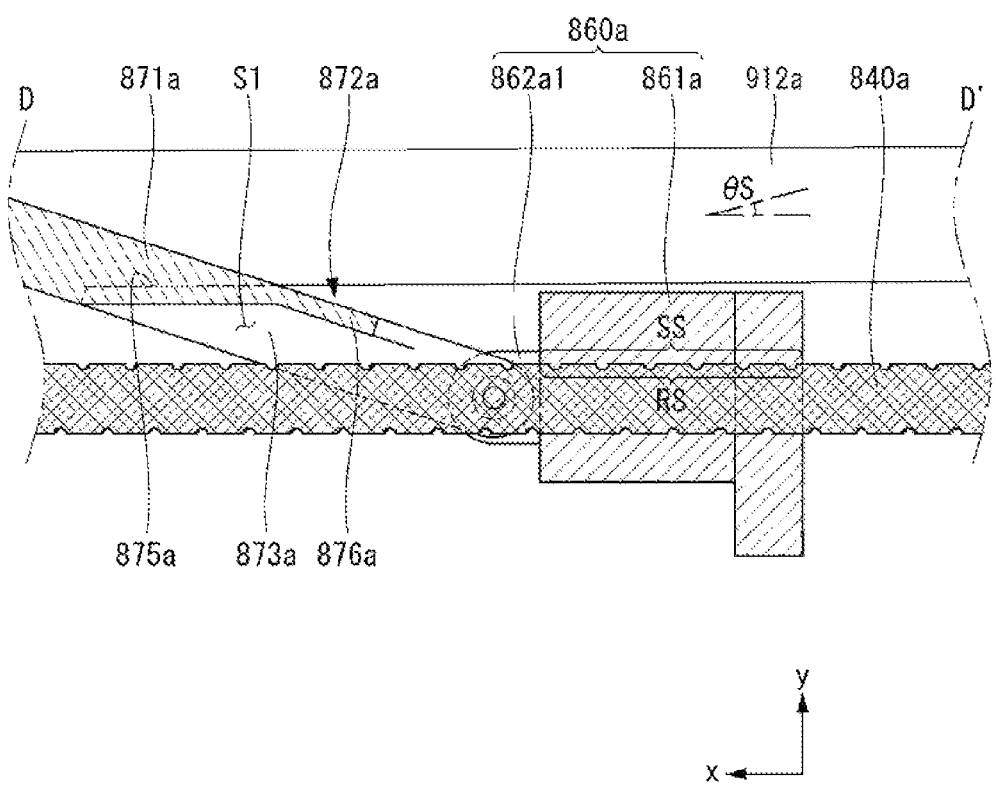

[FIG. 45]
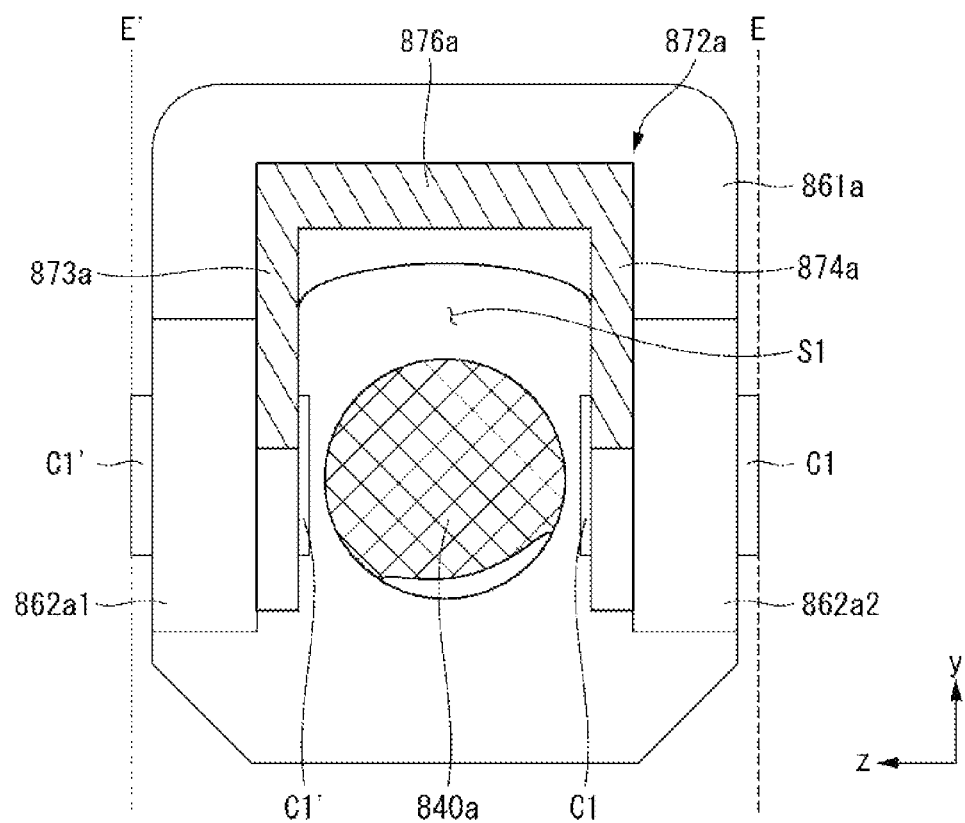

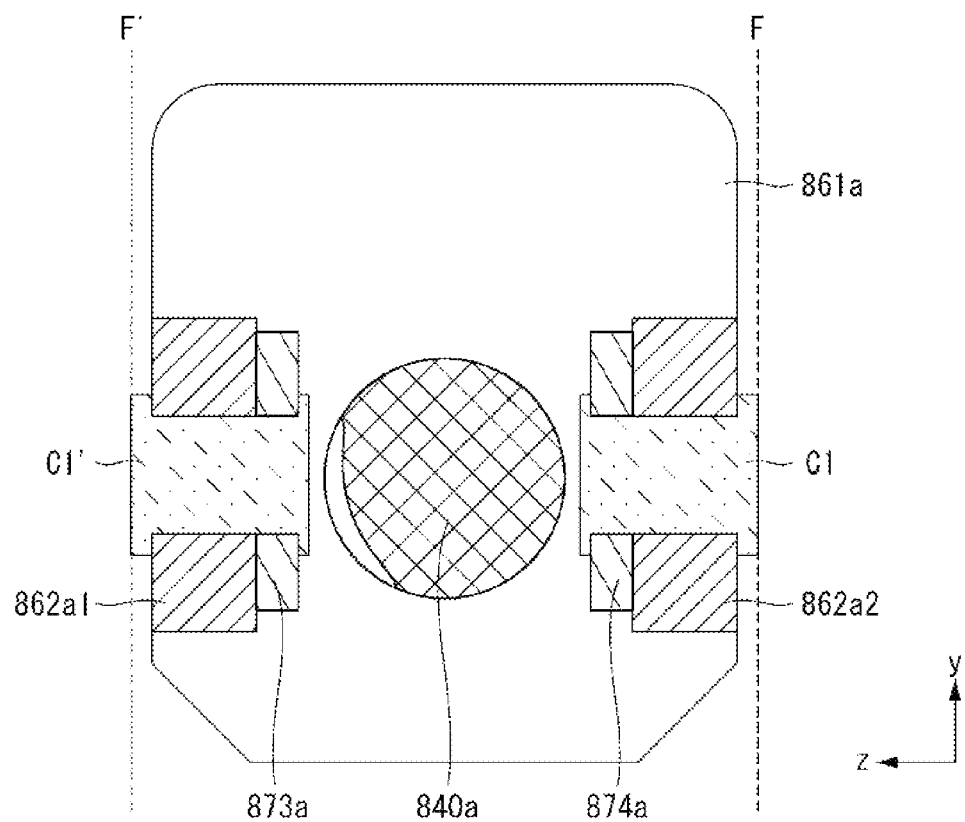
[FIG. 46]

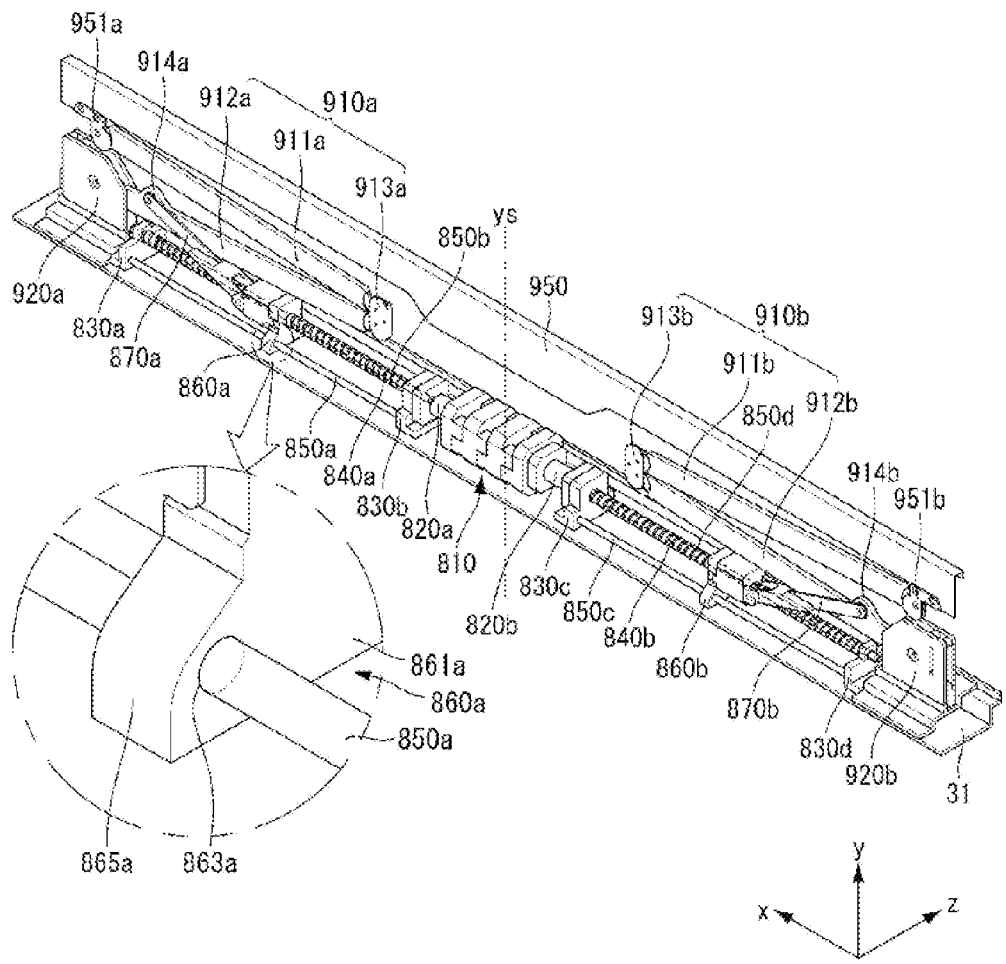
[FIG. 47]

[FIG. 48]
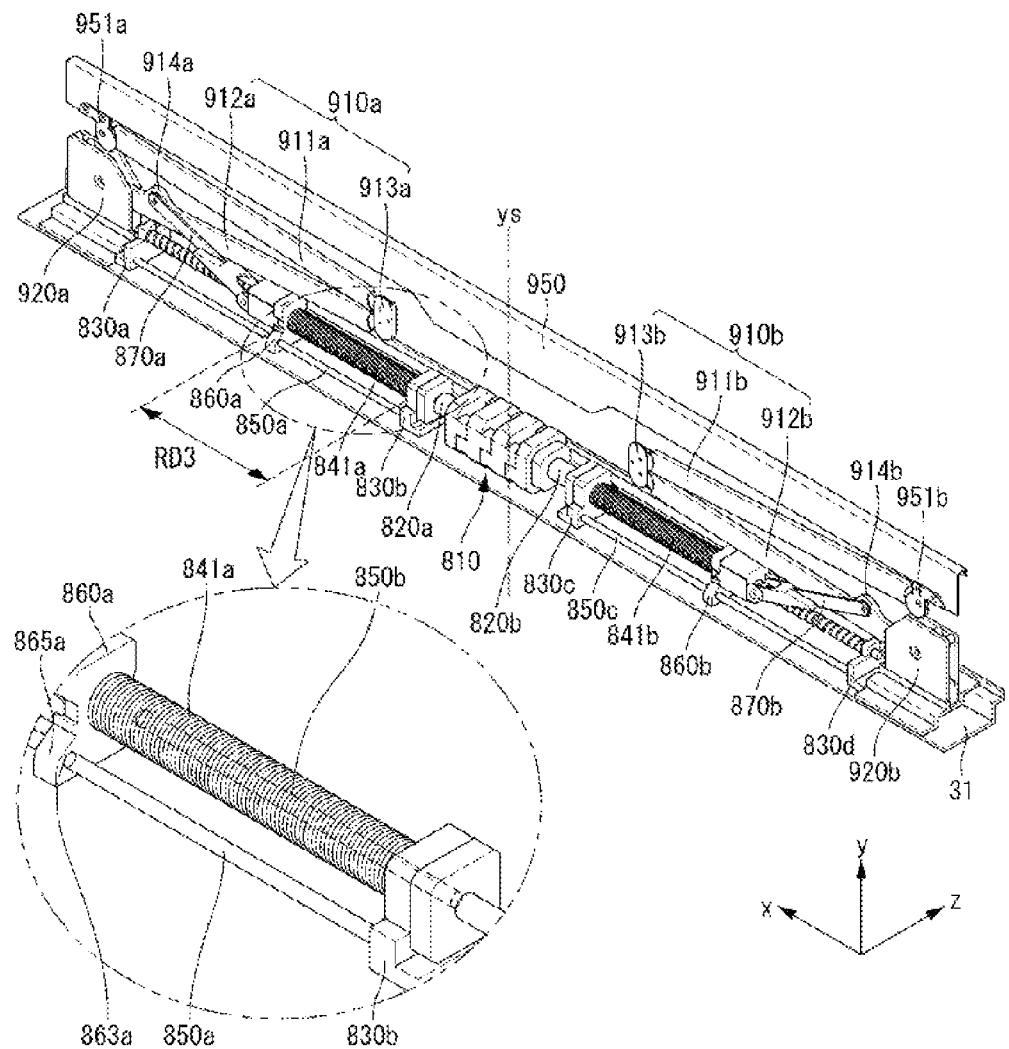

[FIG. 49]
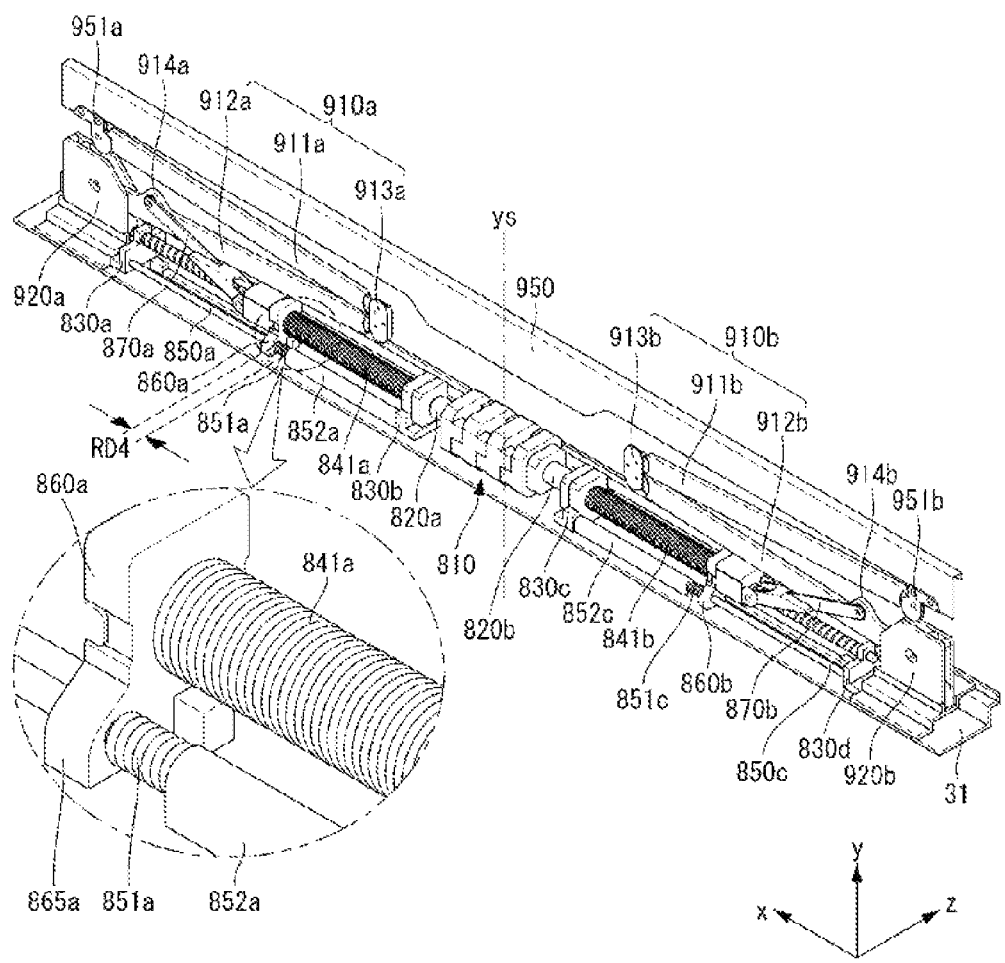

[FIG. 50]
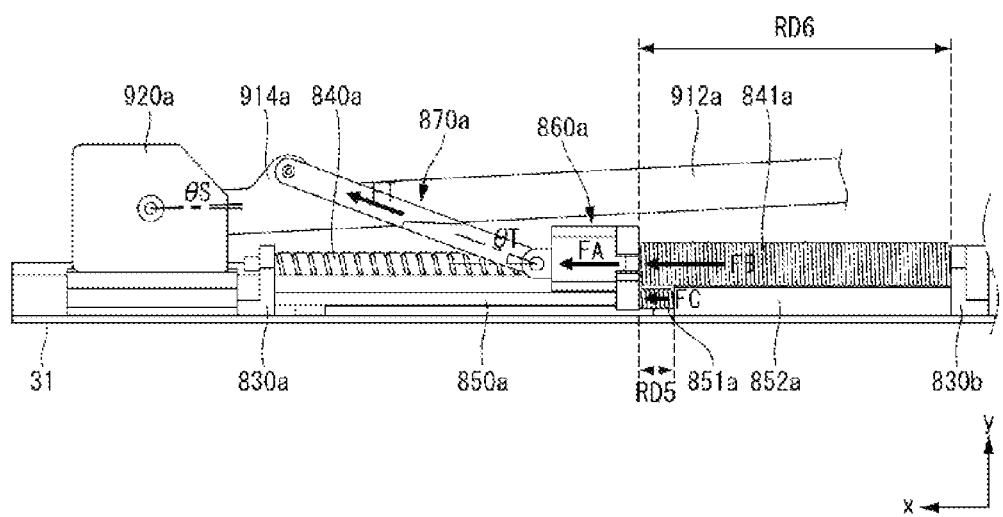

[FIG. 51]
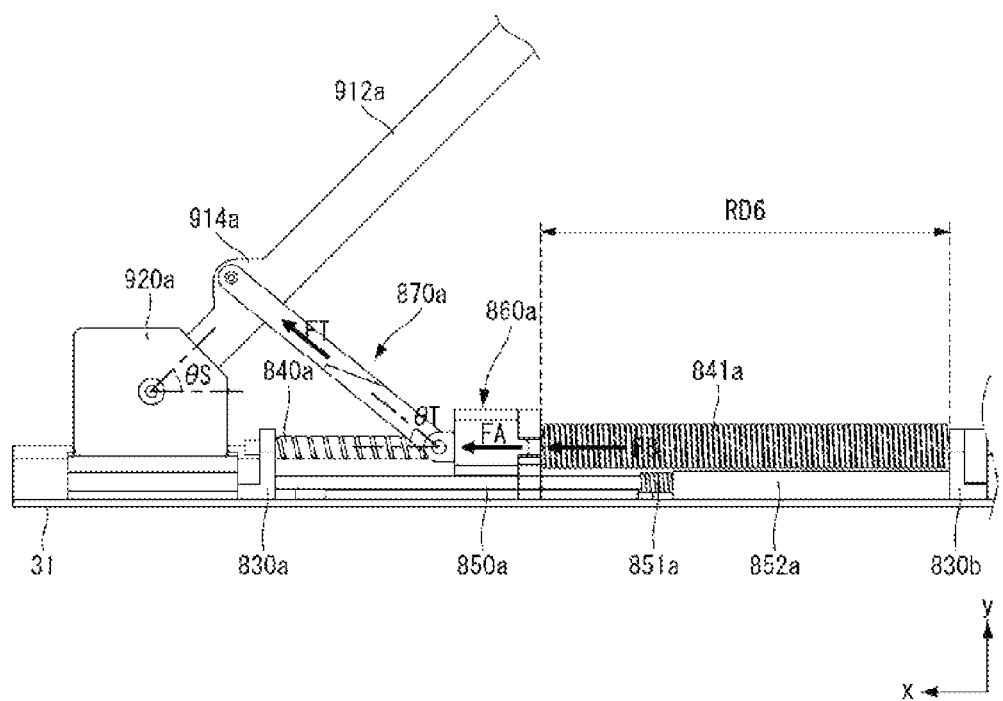

[FIG. 52]
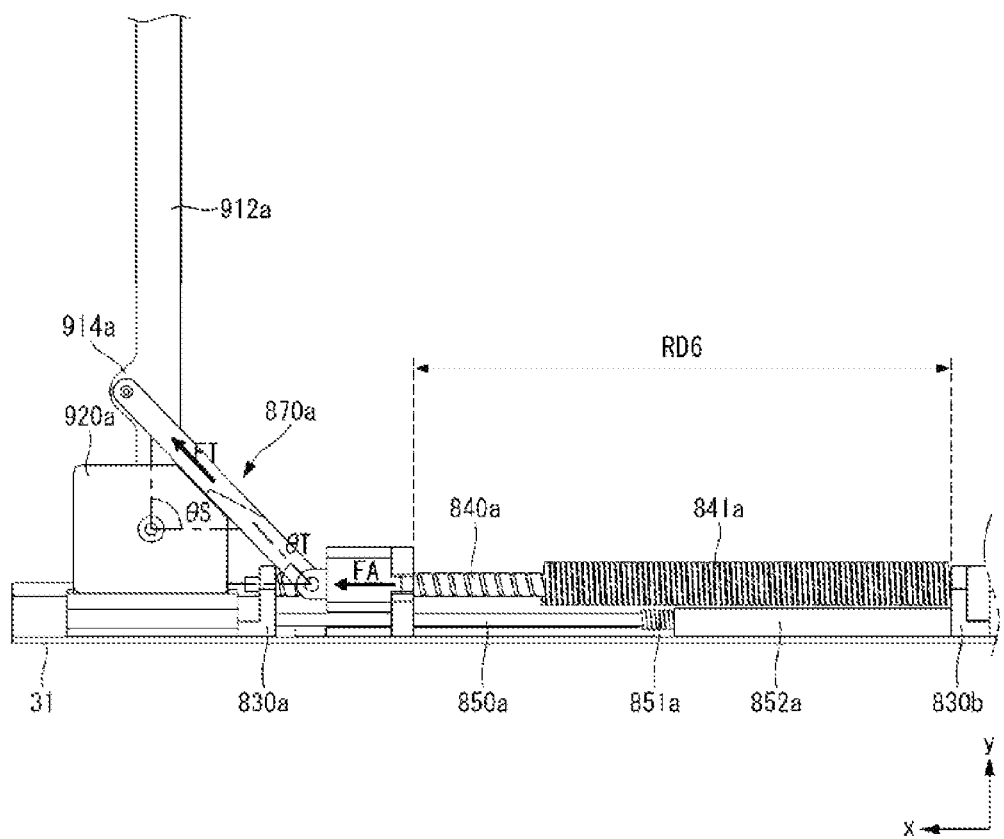

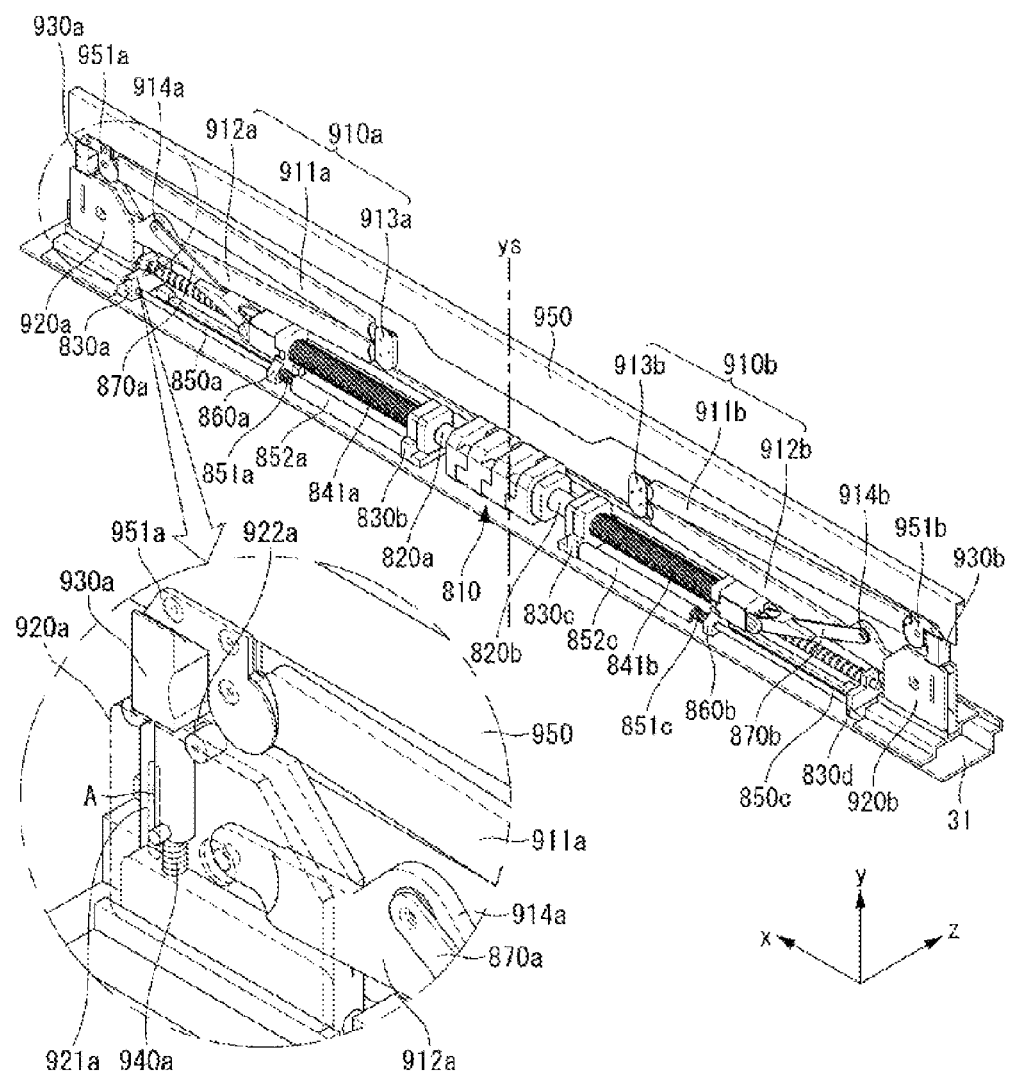
[FIG. 53]

[FIG. 54]
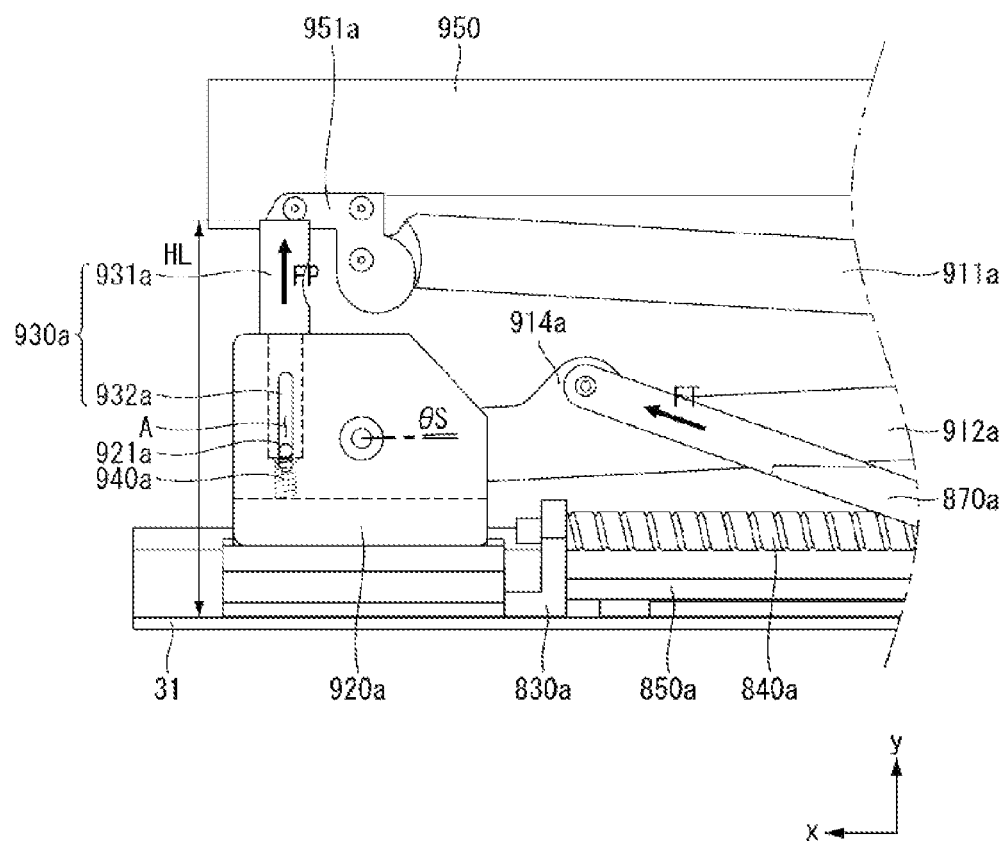

[FIG. 55]
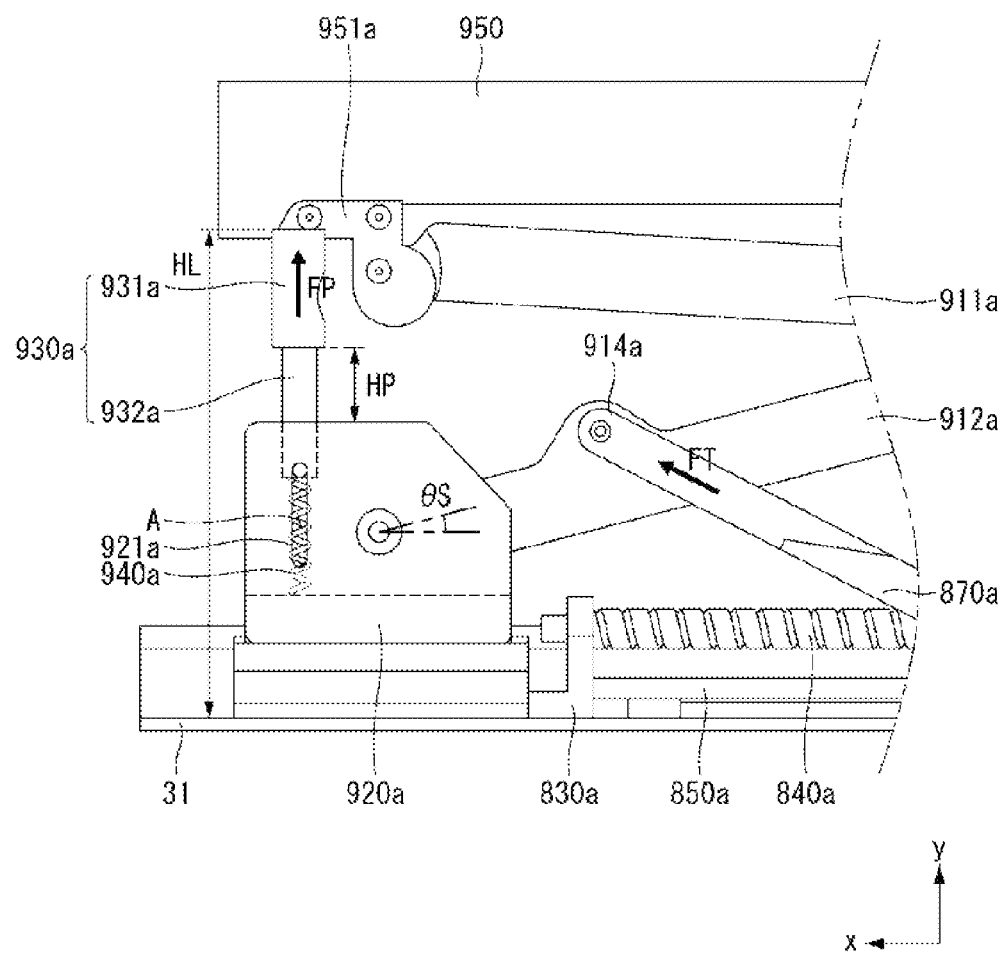

[FIG. 56]
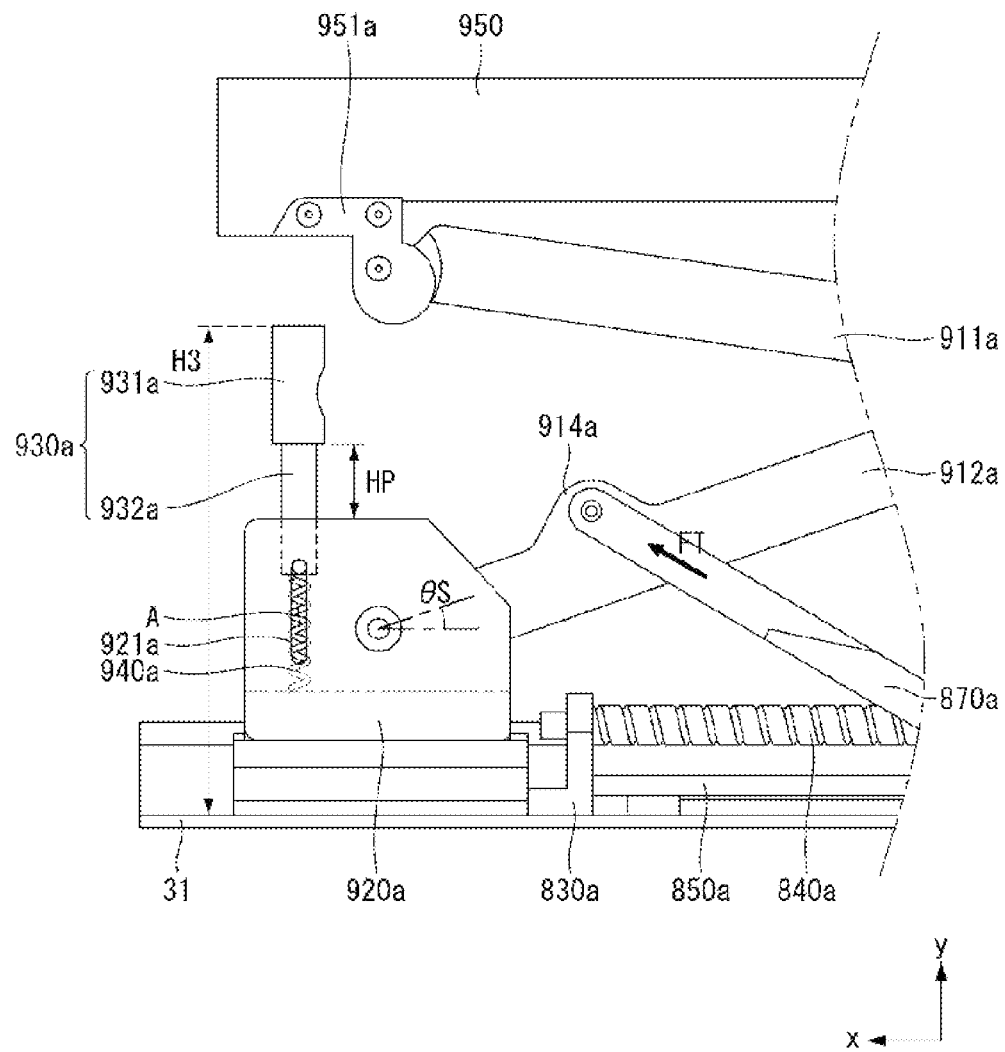

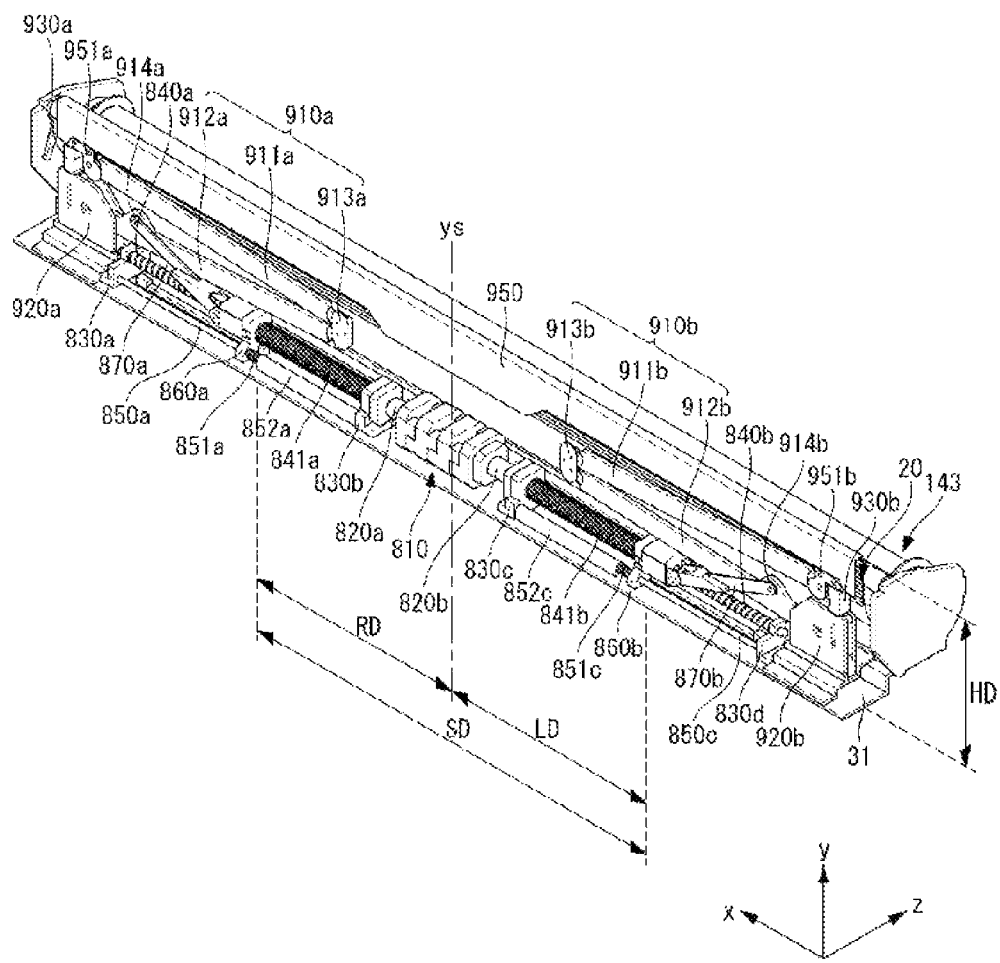
[FIG. 57]

[FIG. 58]
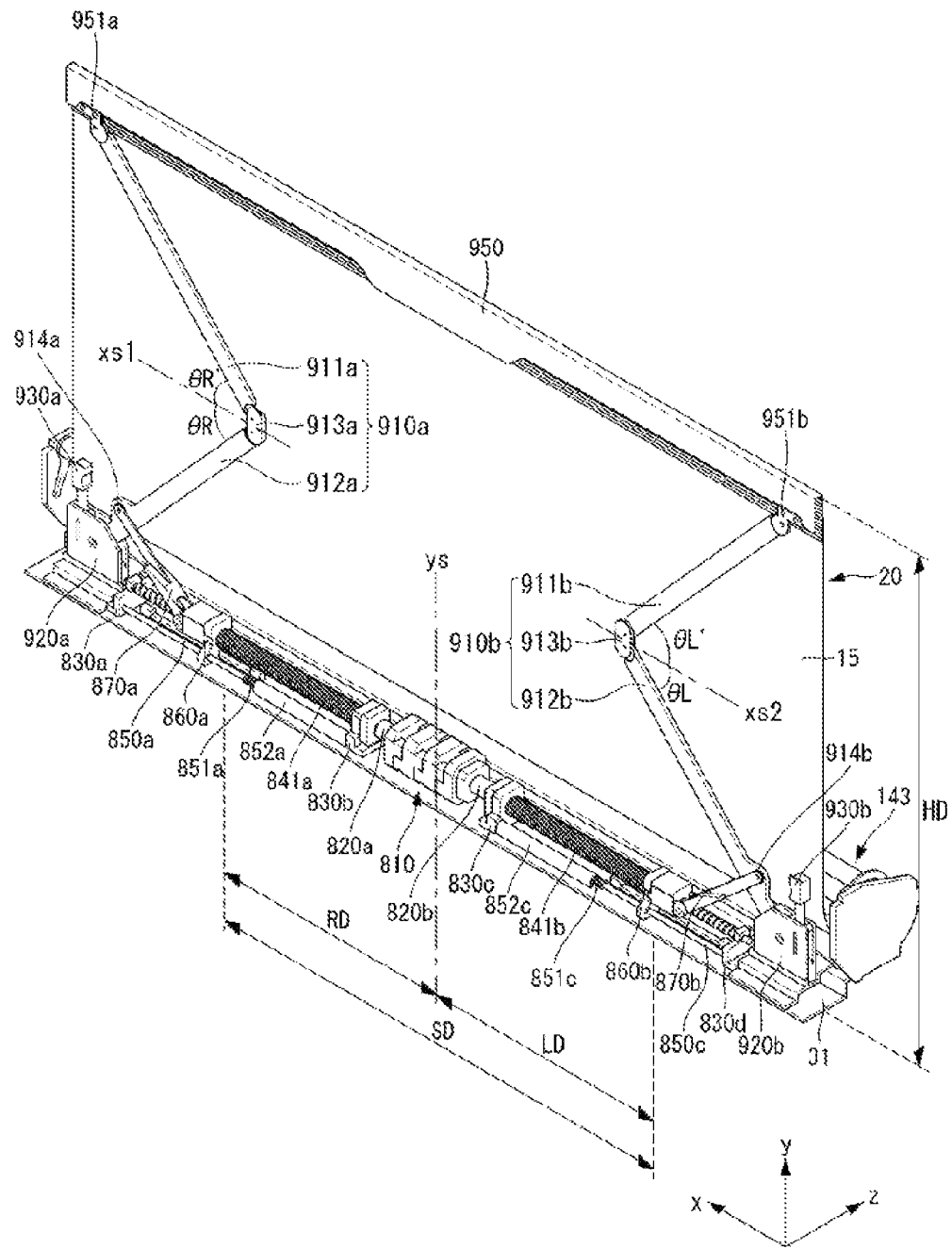

[FIG. 59]
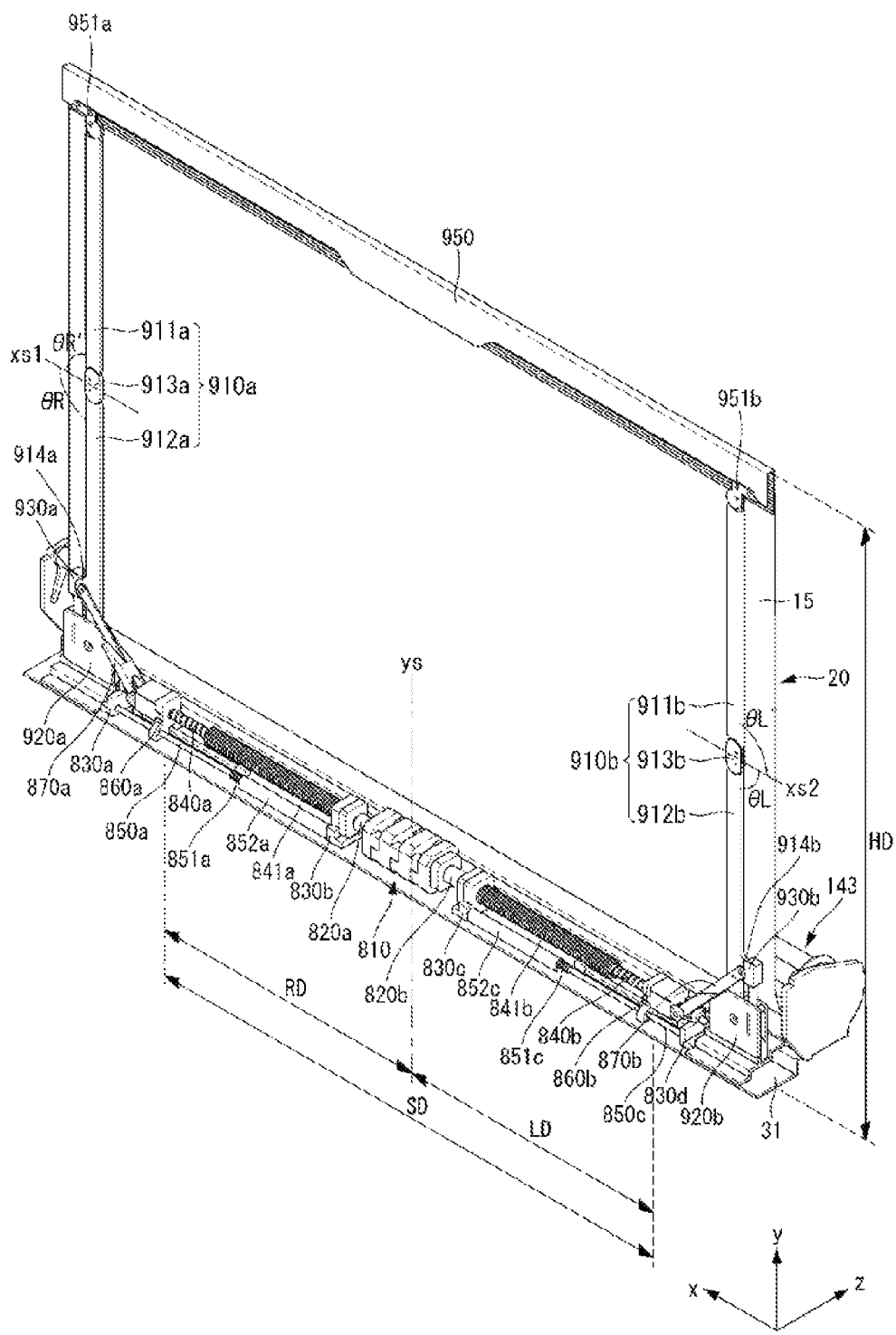

[FIG. 60]
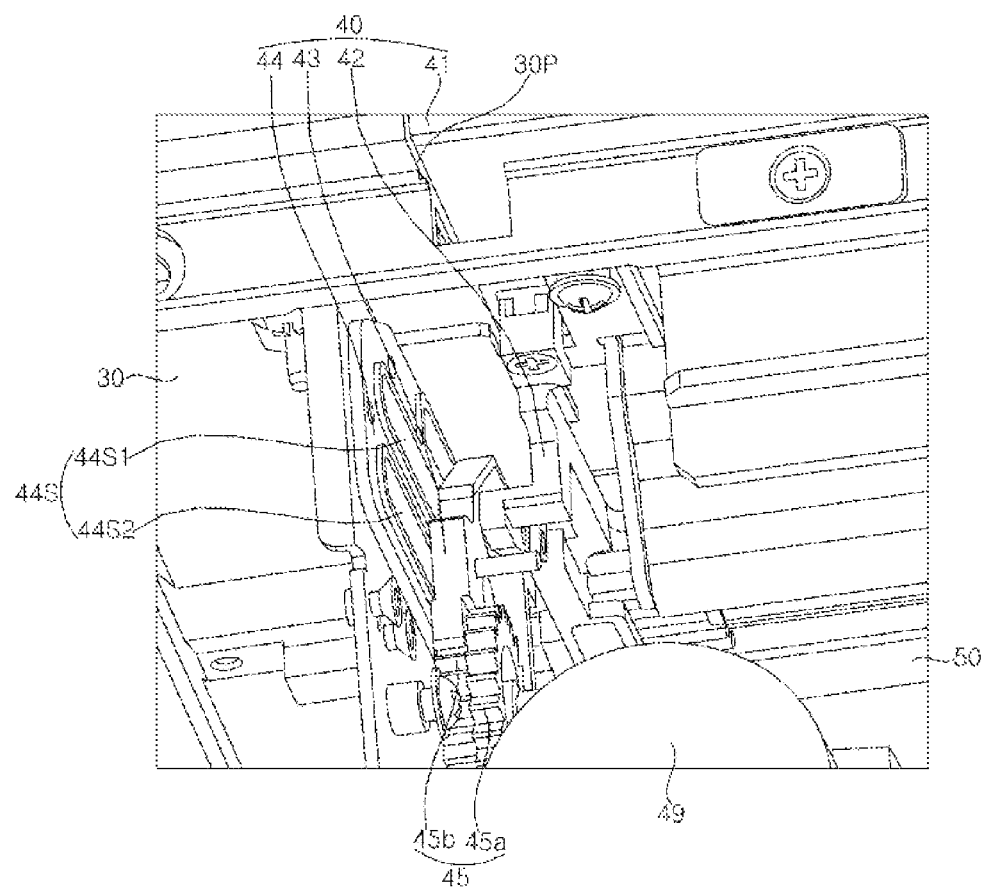

[FIG. 61]
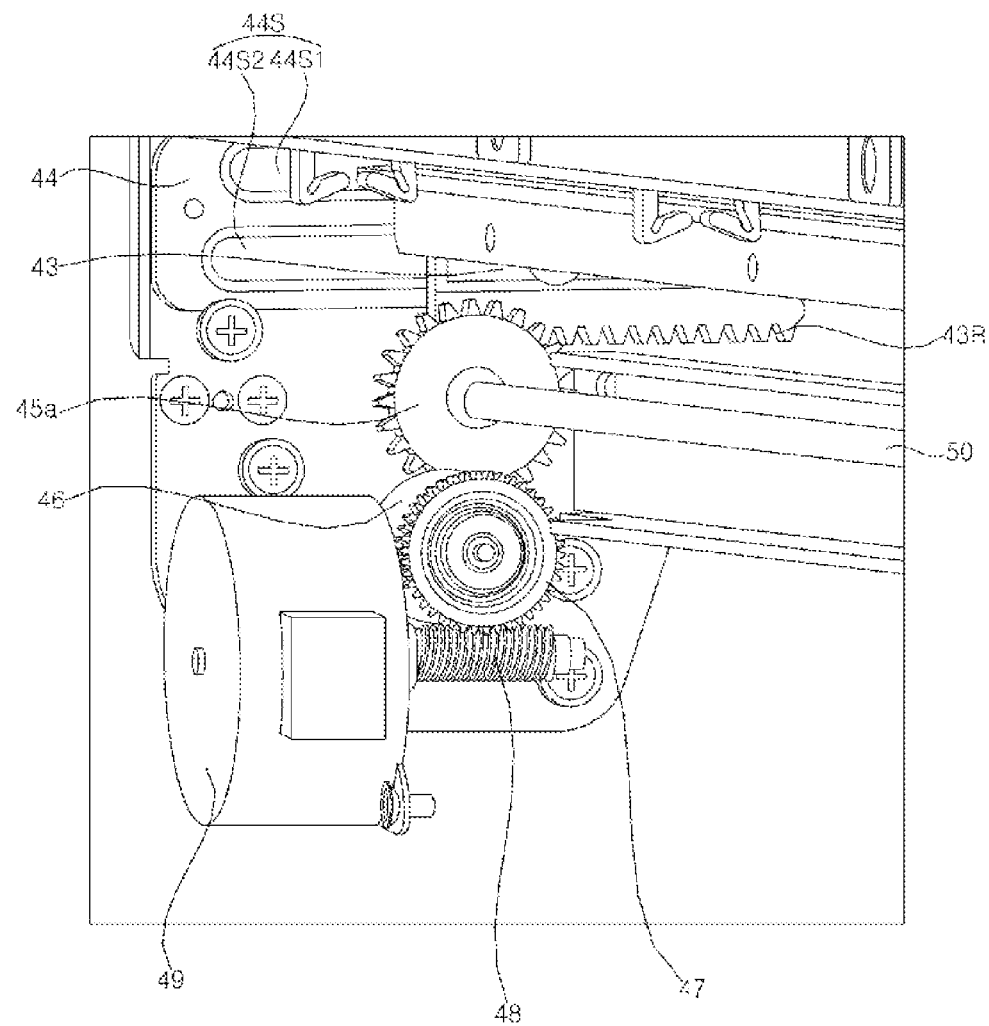

[FIG. 62]
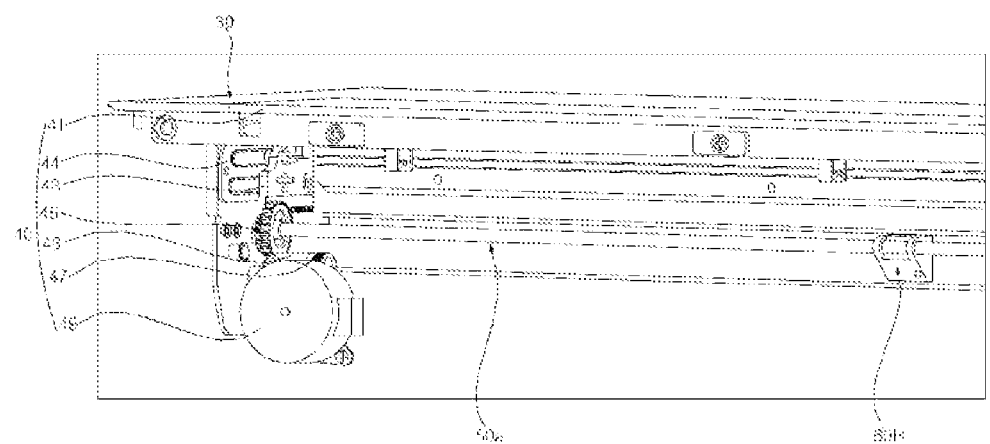

[FIG. 63]
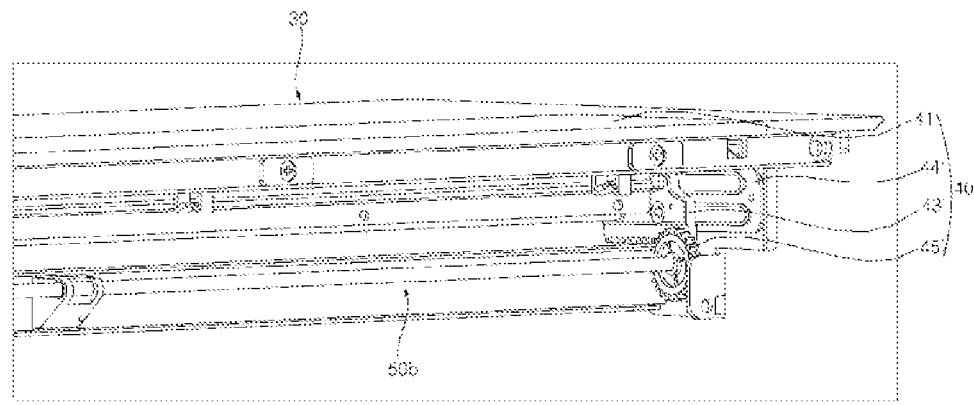

[FIG. 64]
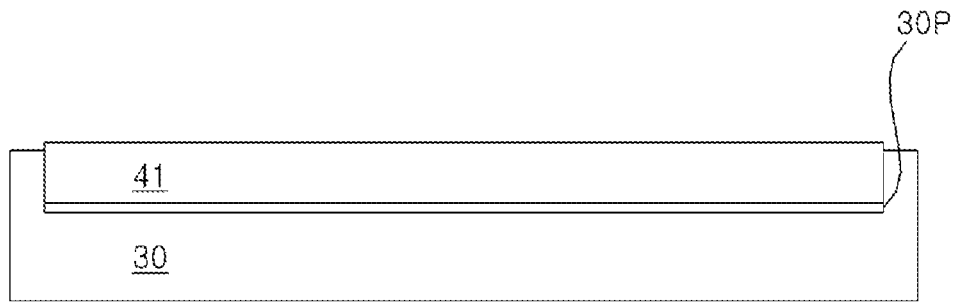

[FIG. 65]
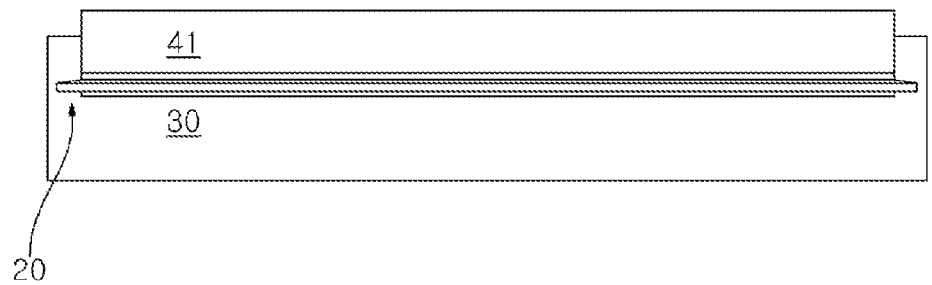

[FIG. 66]
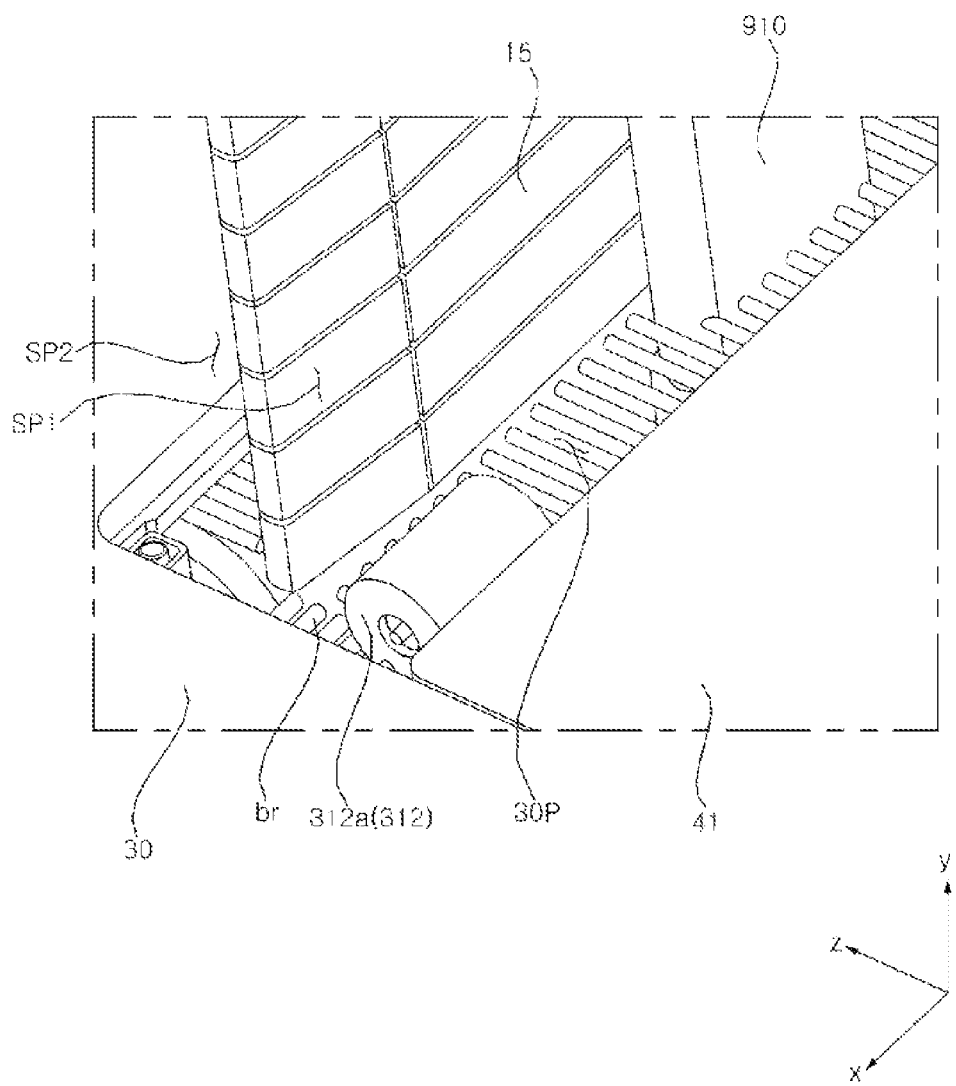

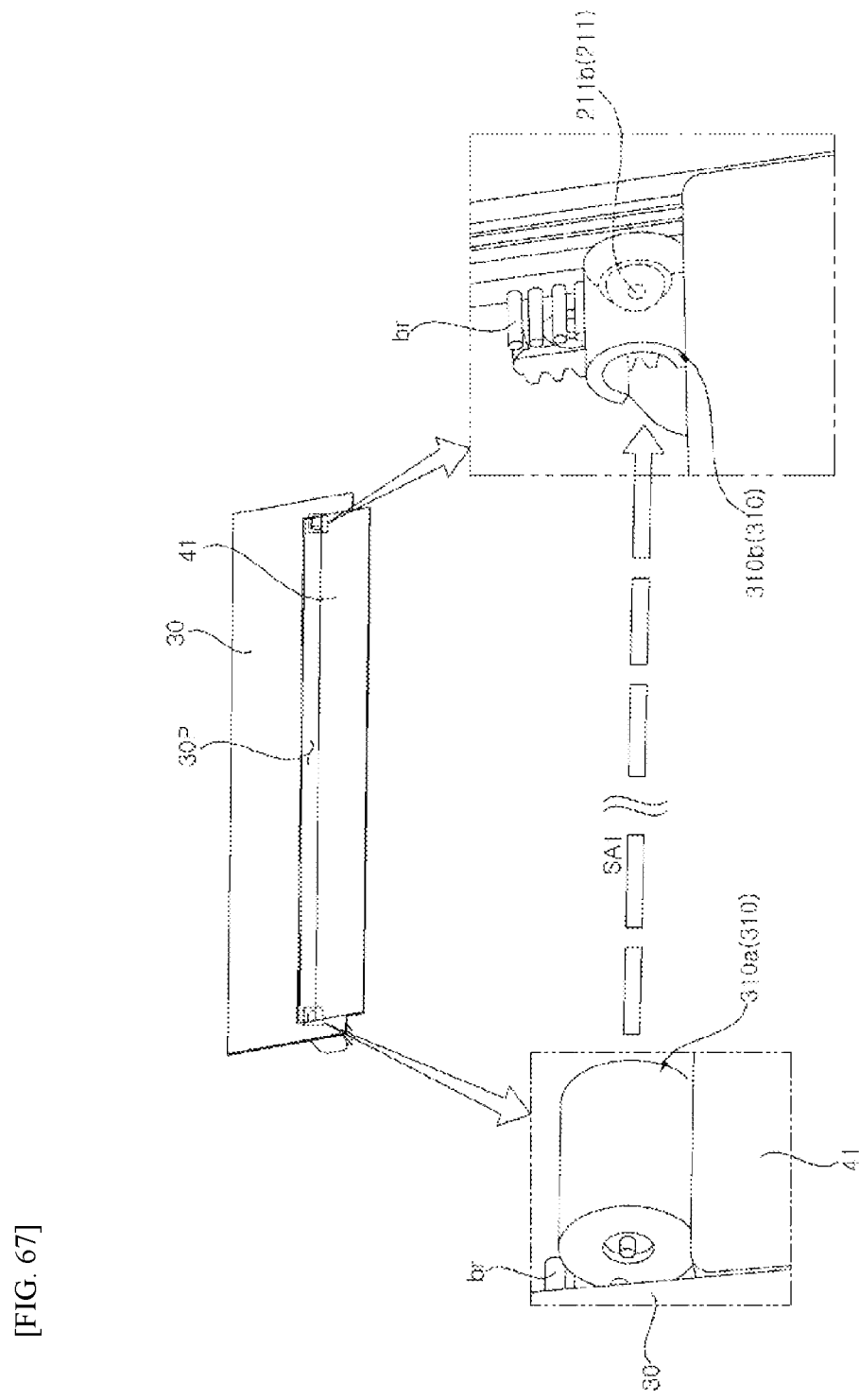
[FIG. 67]

[FIG. 68]
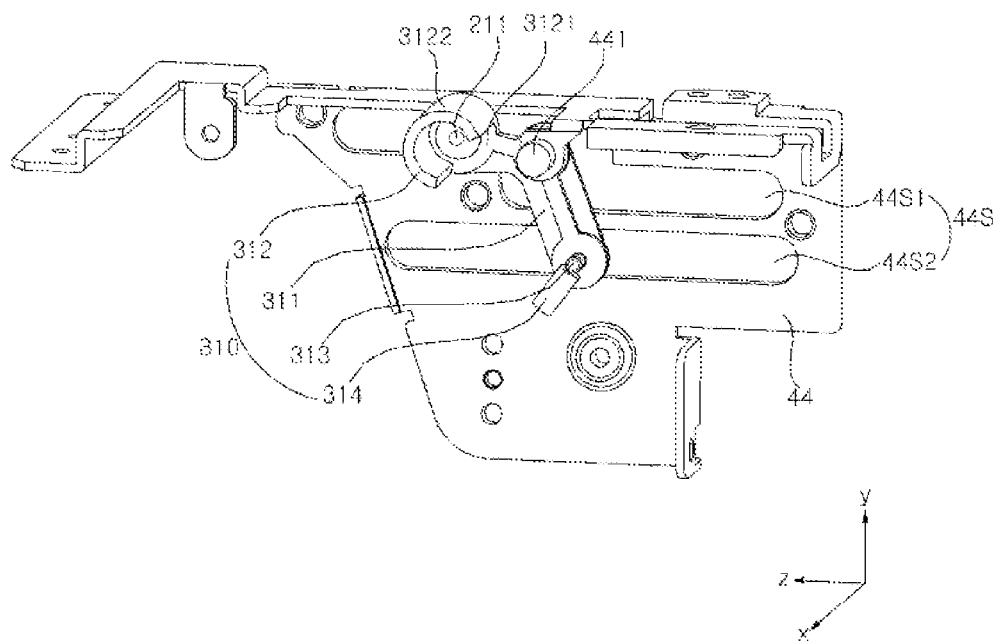

[FIG. 69]
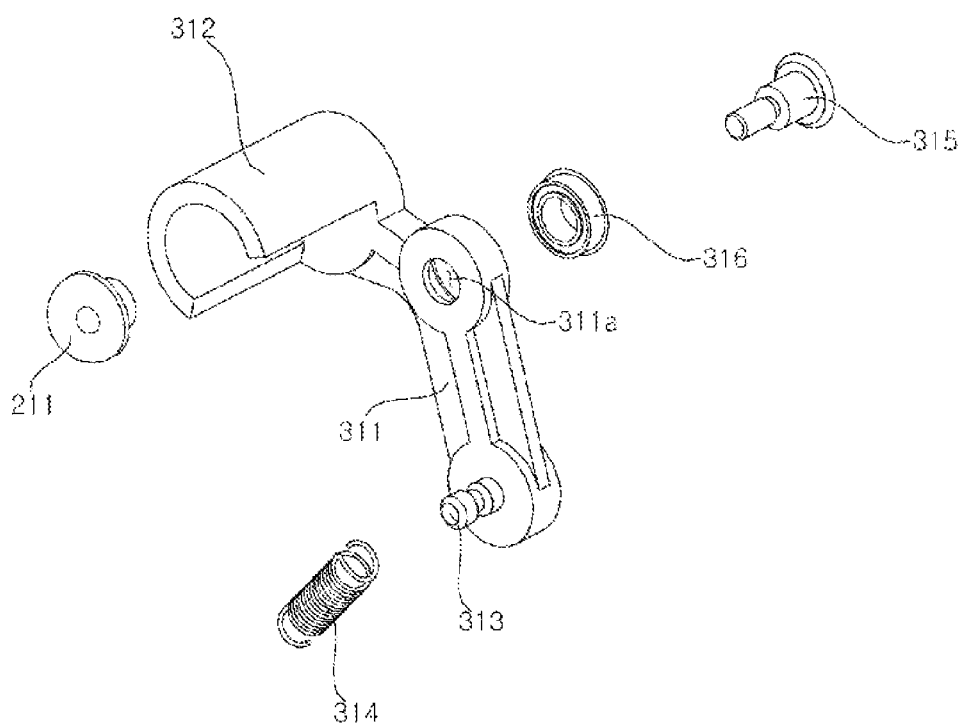

[FIG. 70]
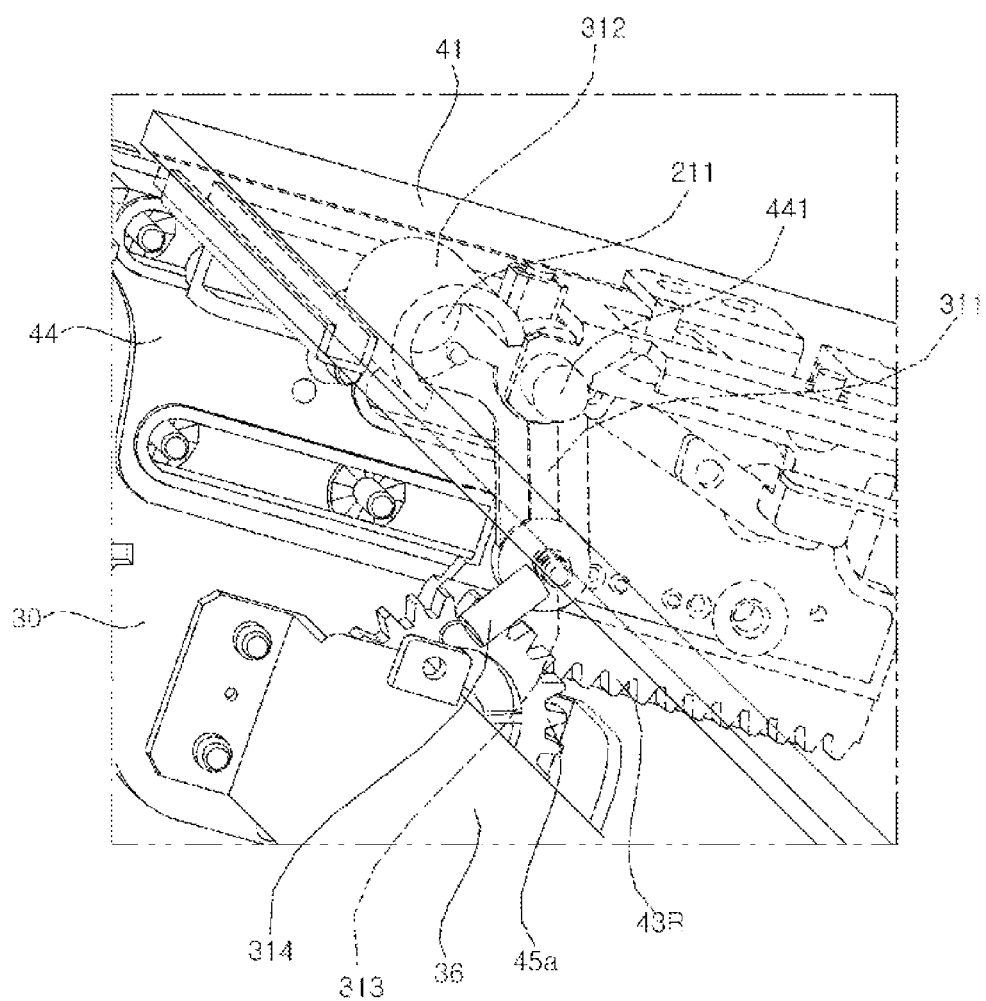

[FIG. 71]
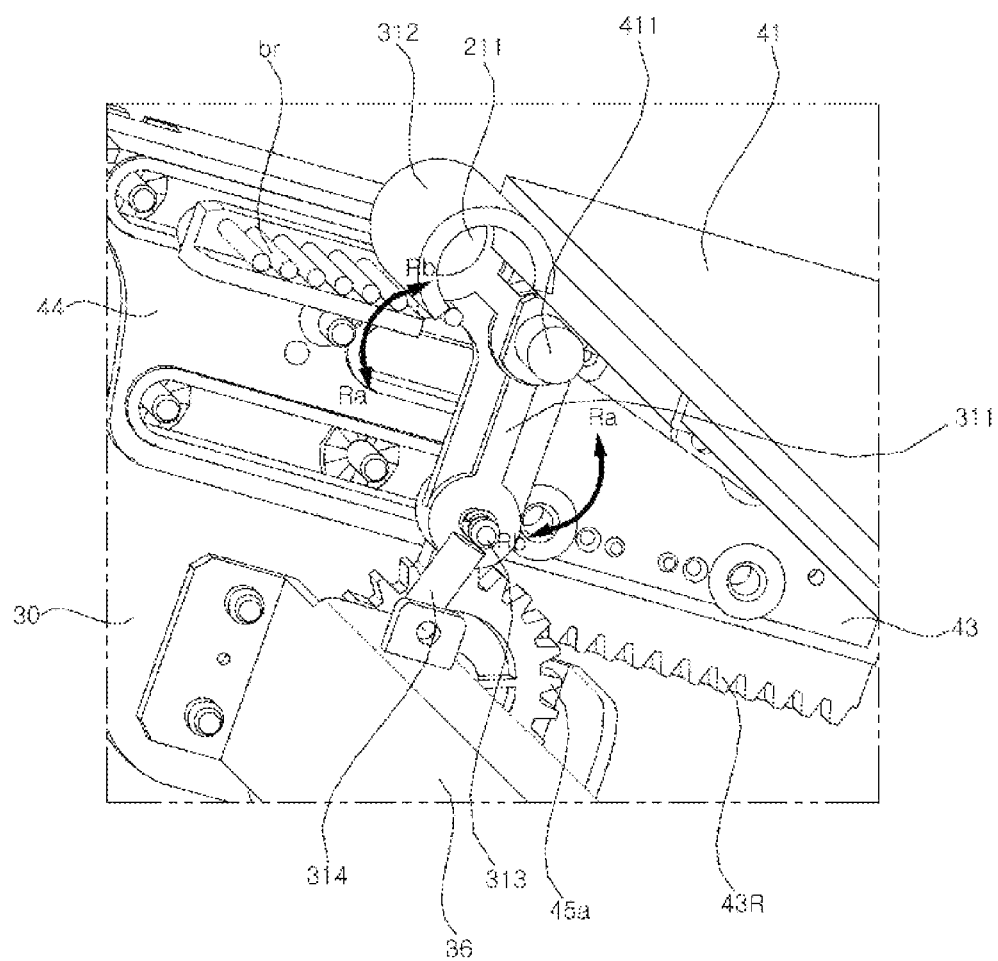

[FIG. 72]
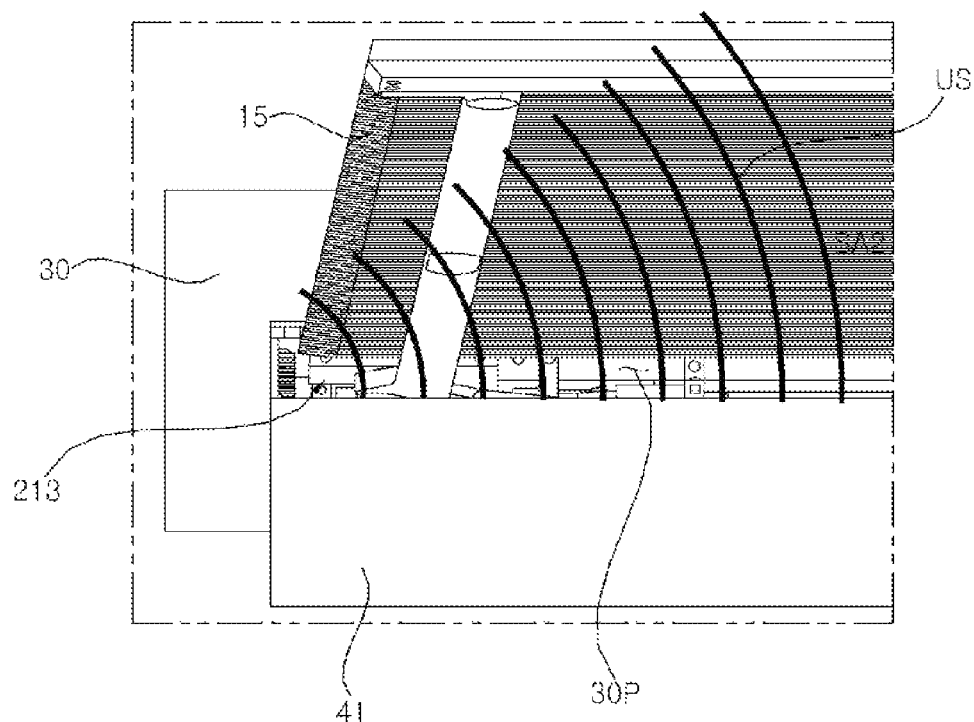

[FIG. 73]
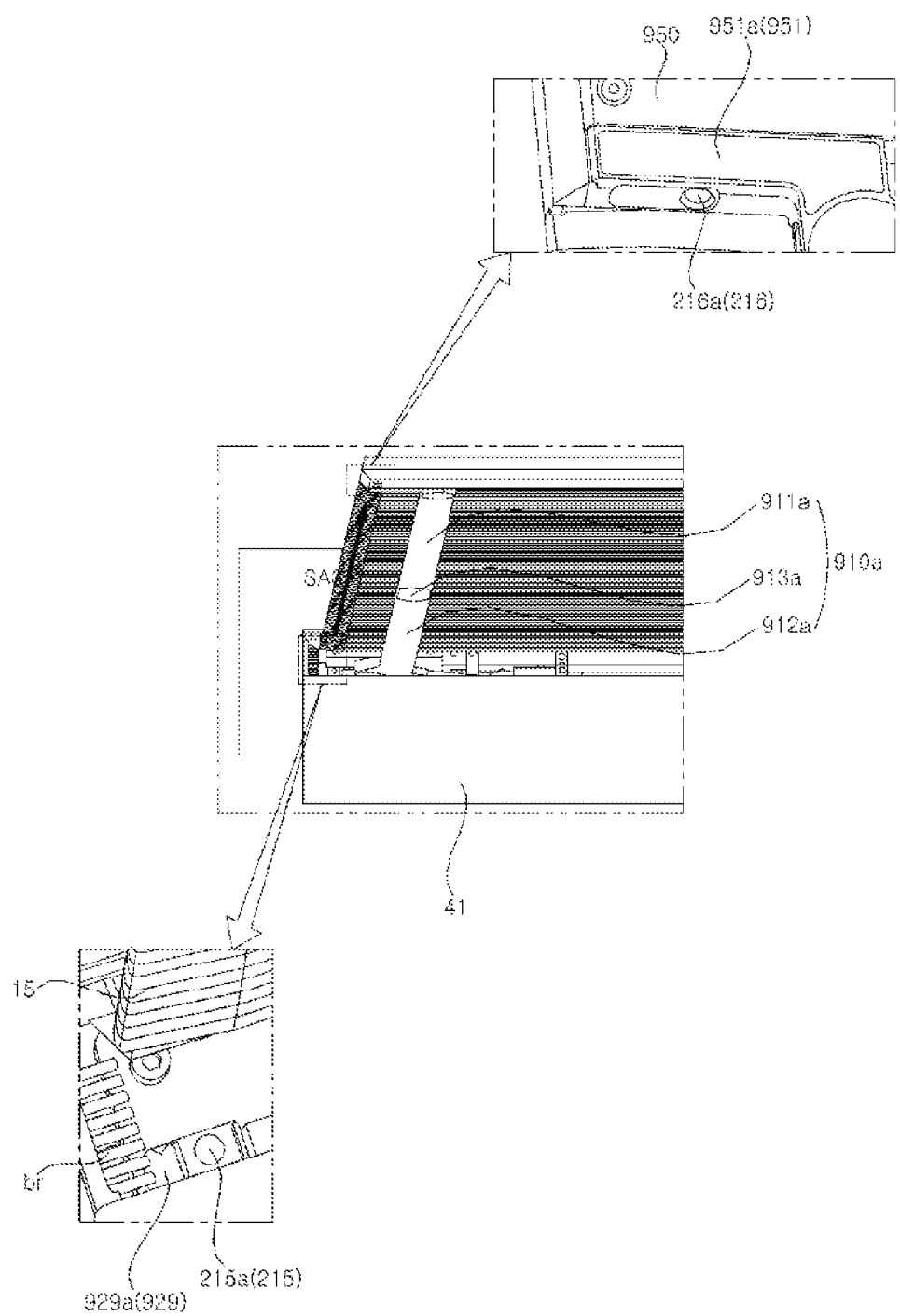

[FIG. 74]
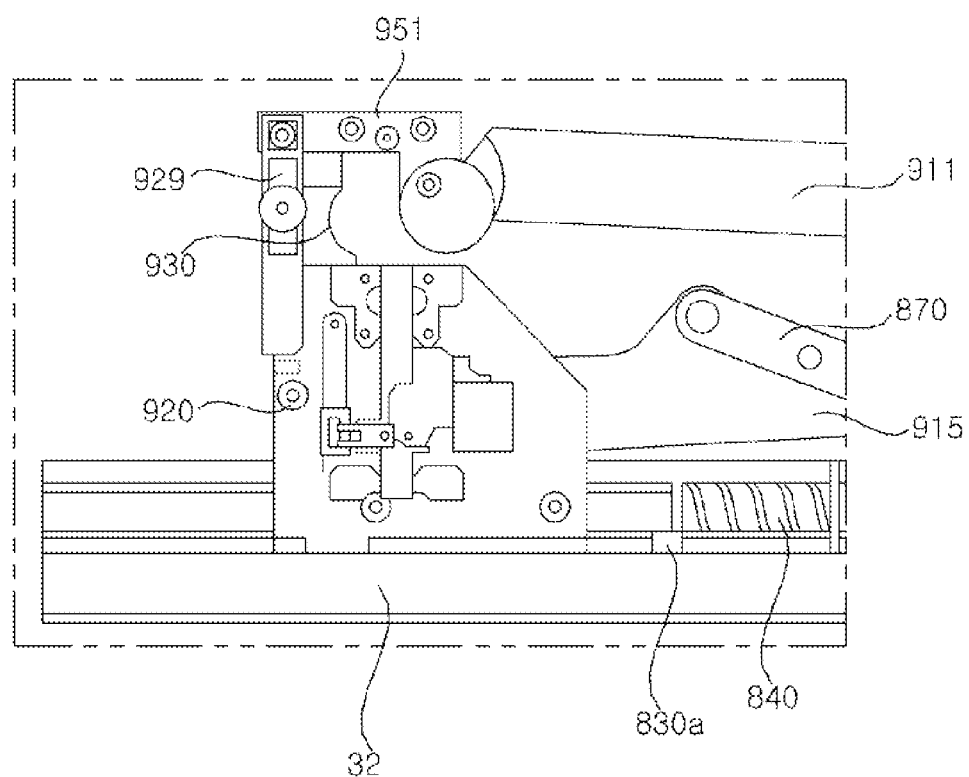

[FIG. 75]
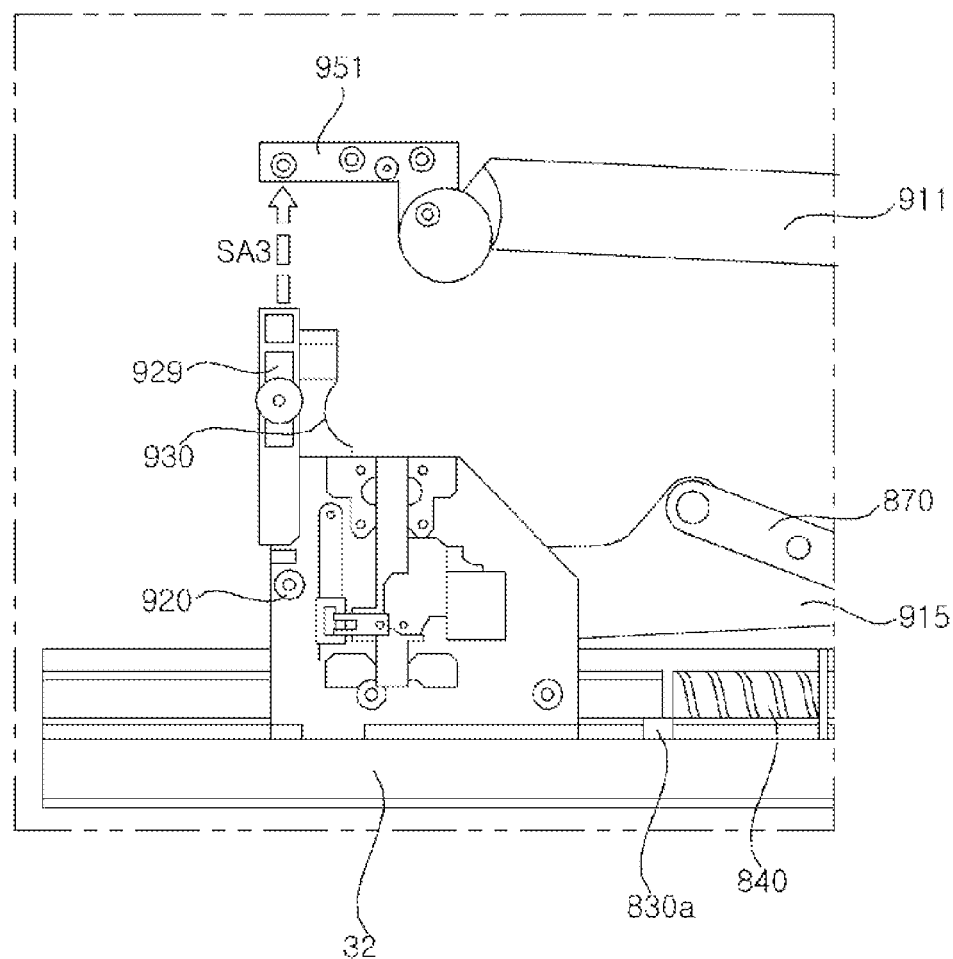

[FIG. 76]
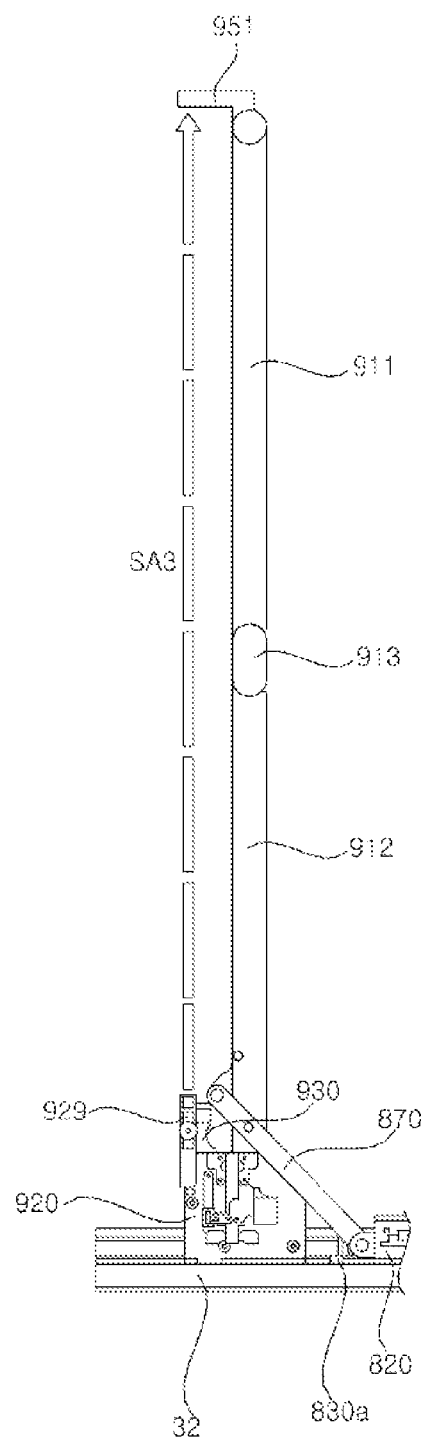

[FIG. 77]
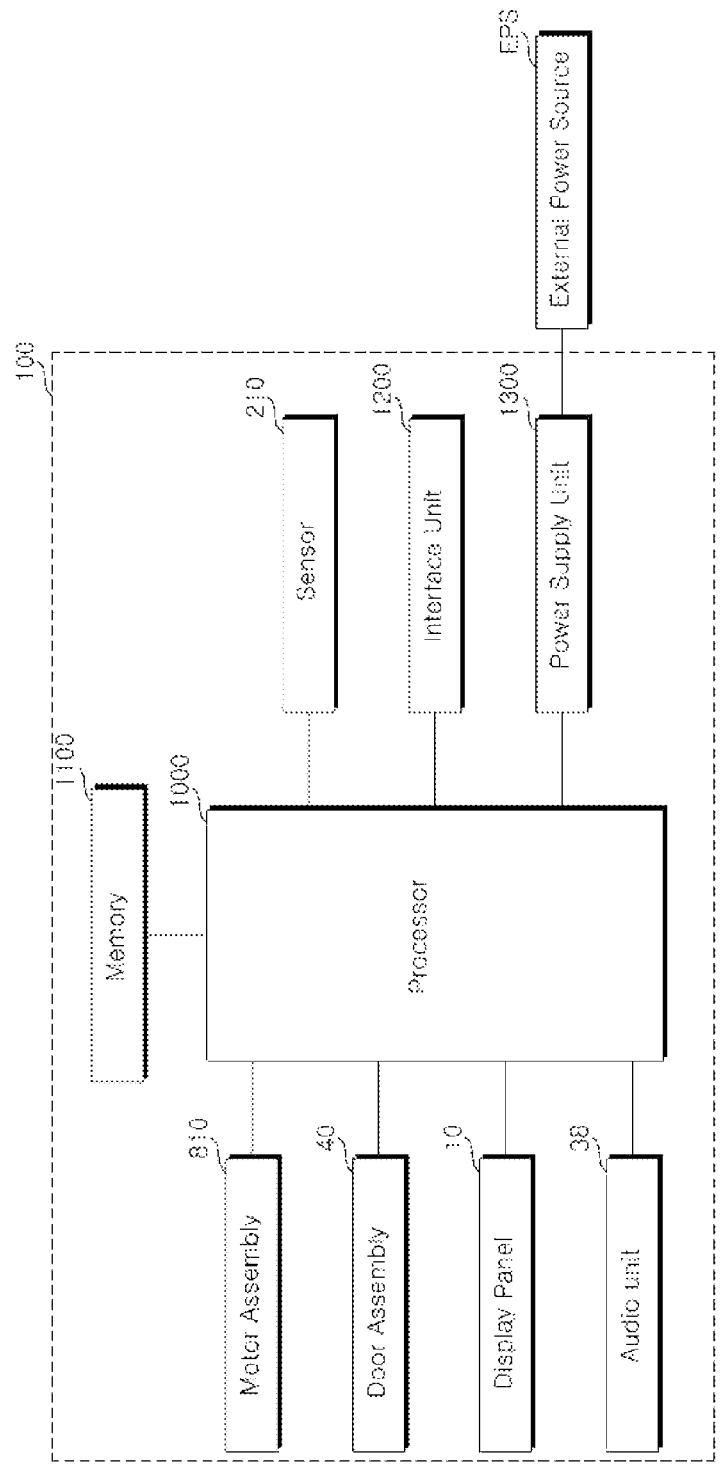

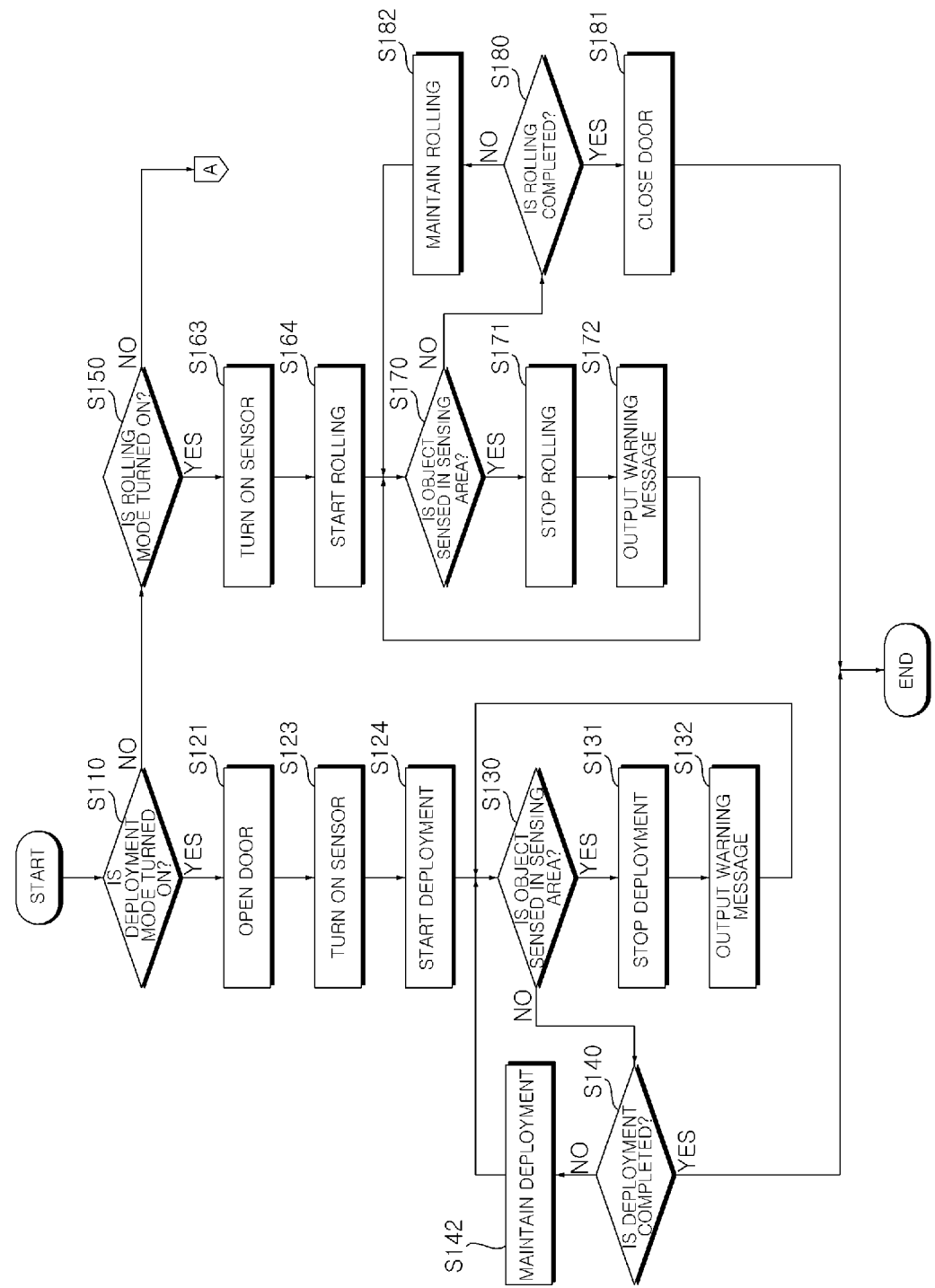
[FIG. 78]

[FIG. 79]
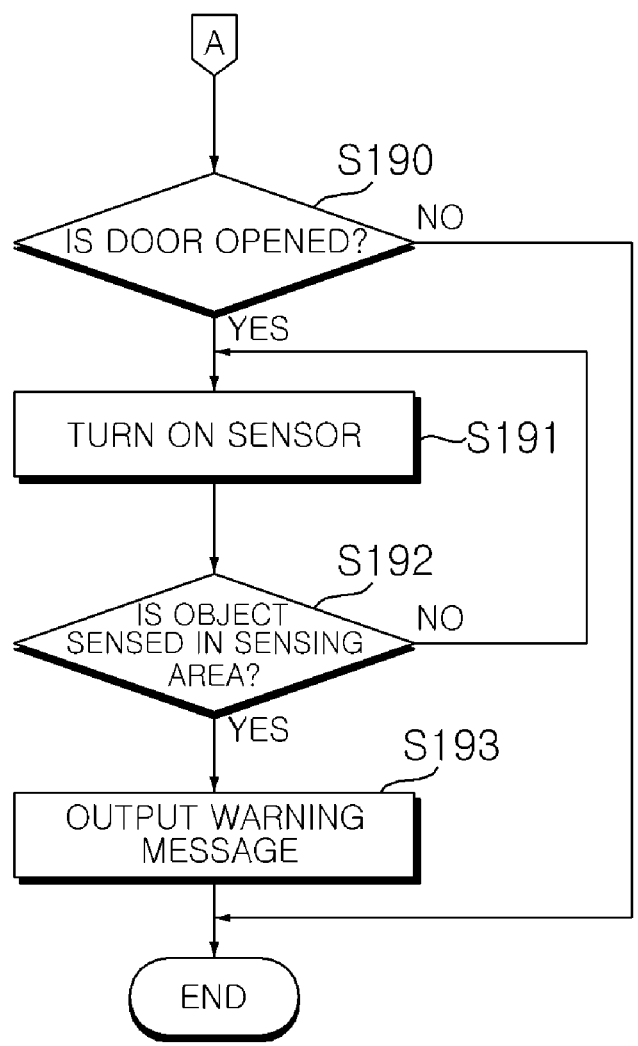

[FIG. 80]
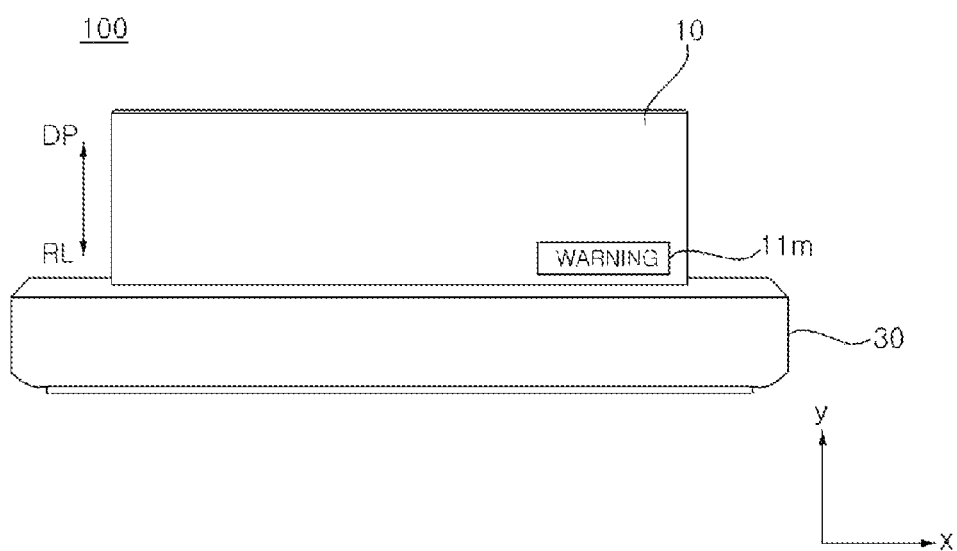

[FIG. 81]
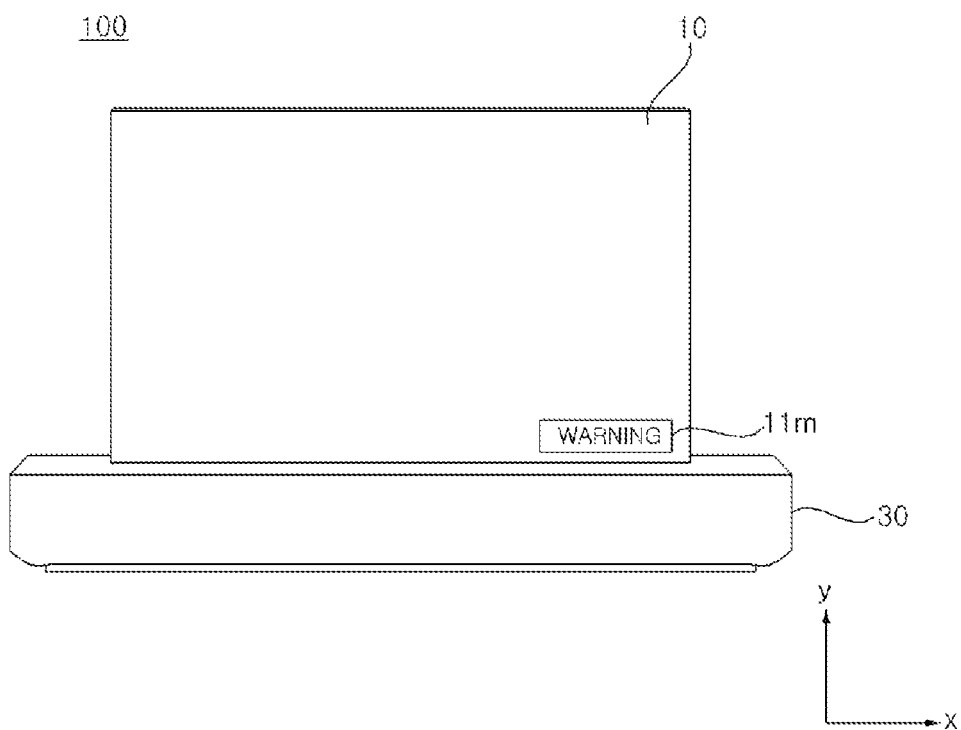

[FIG. 82]
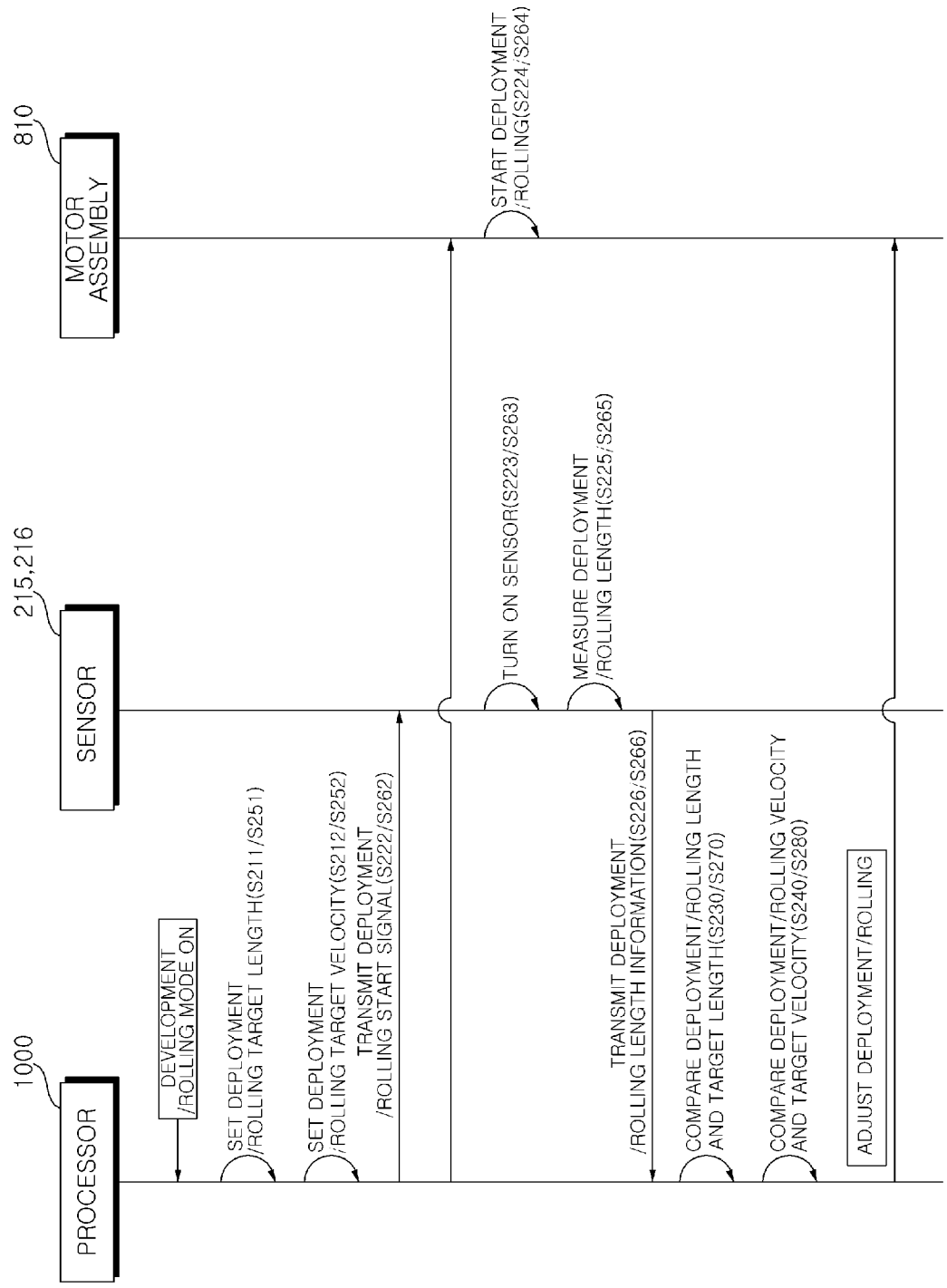

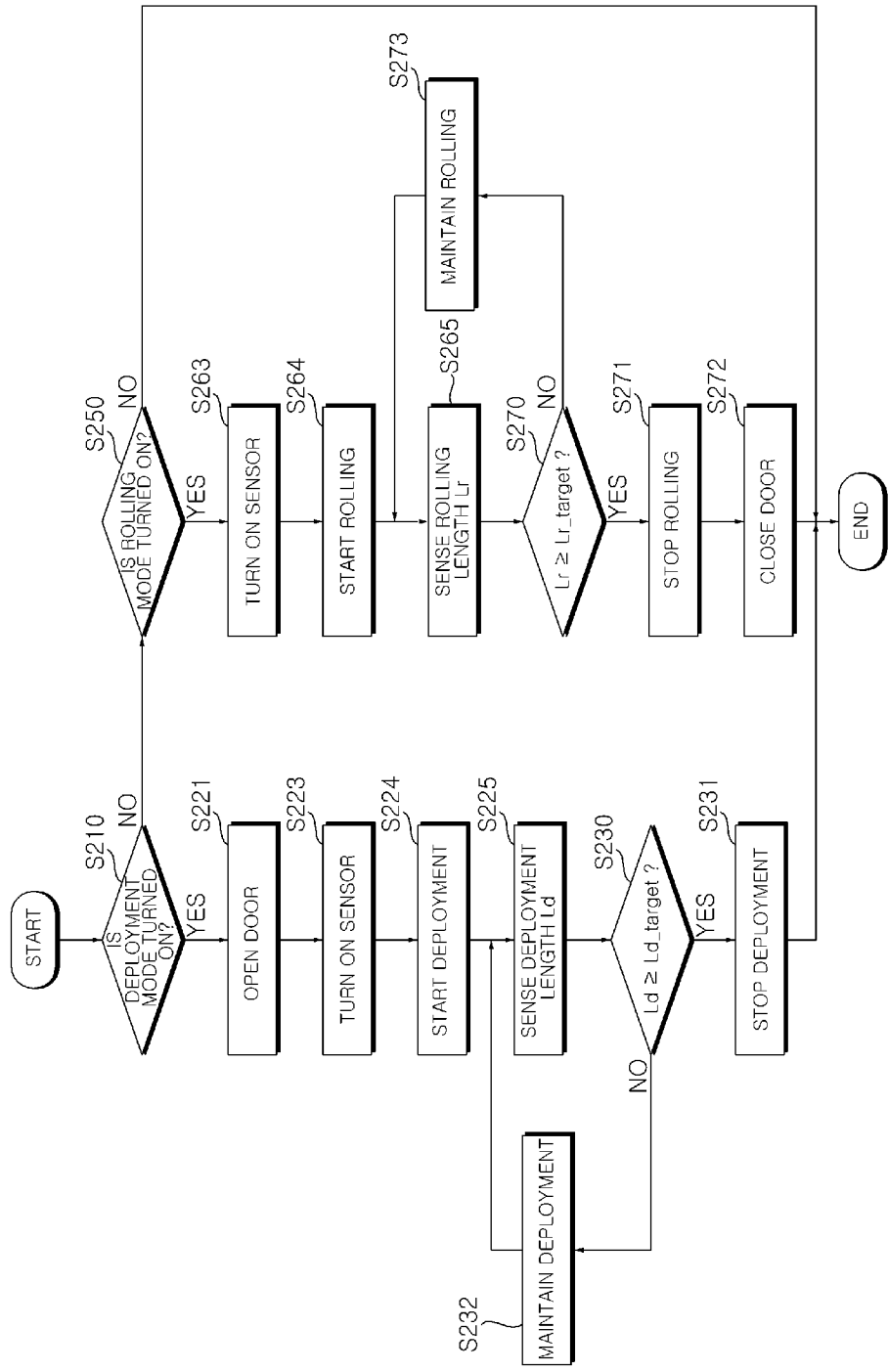
[FIG. 83]

[FIG. 84]
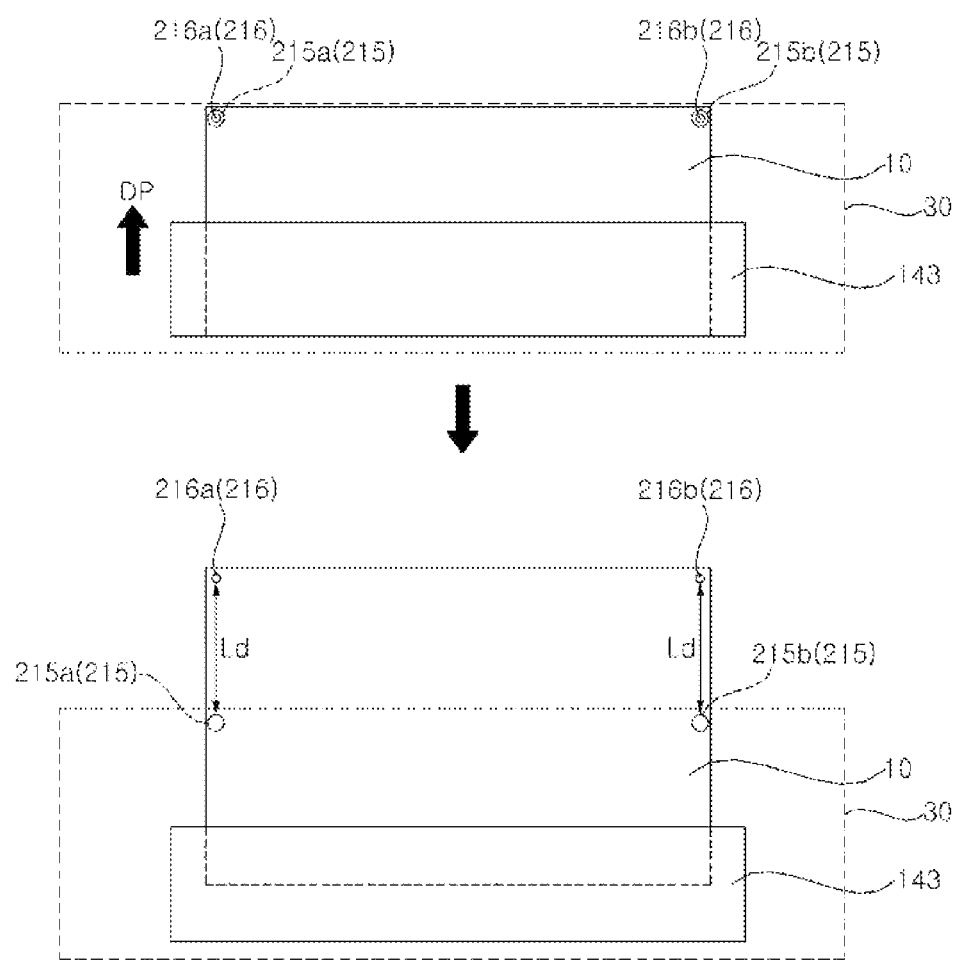

[FIG. 85]
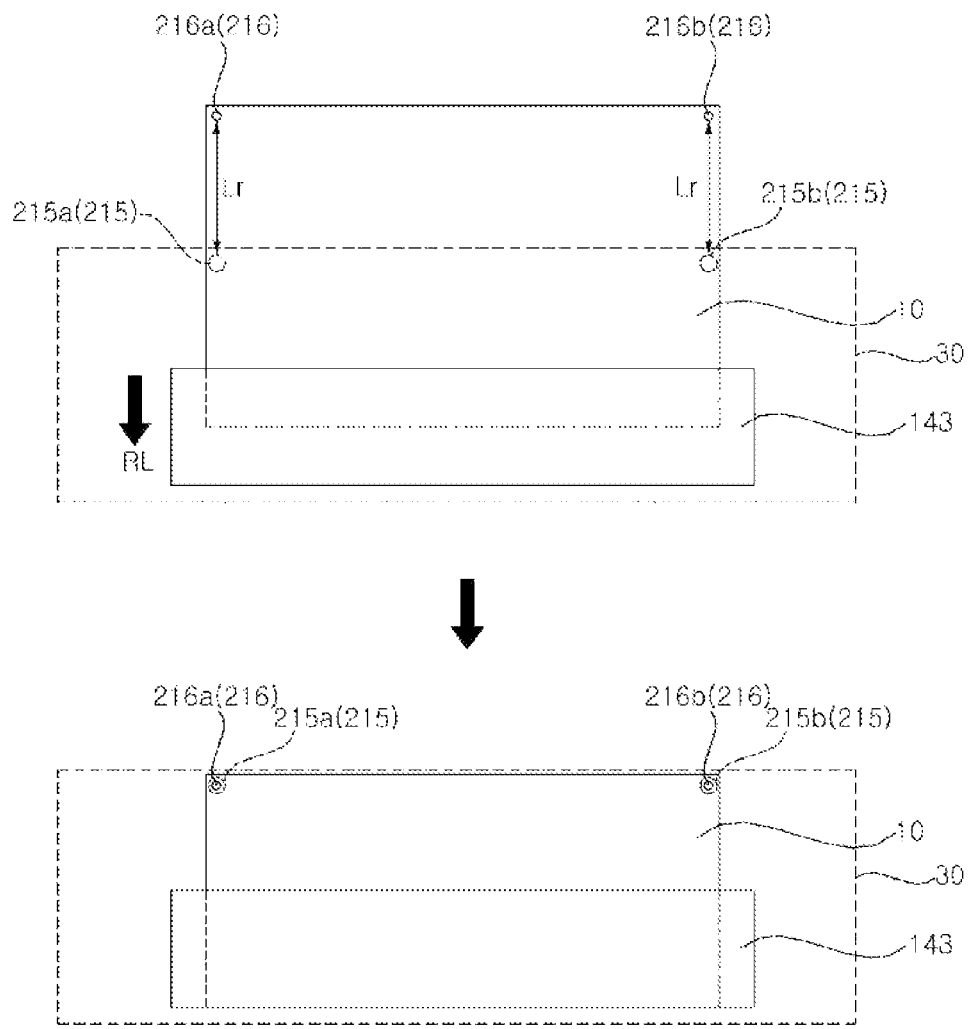

[FIG. 86]
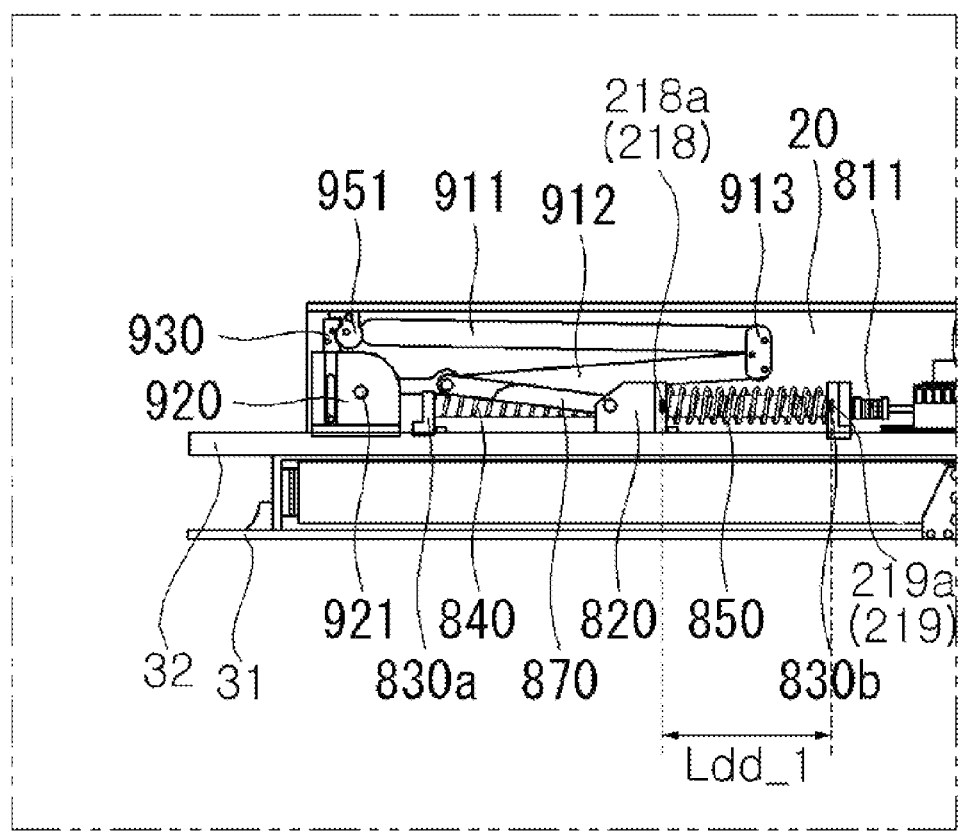

[FIG. 87]
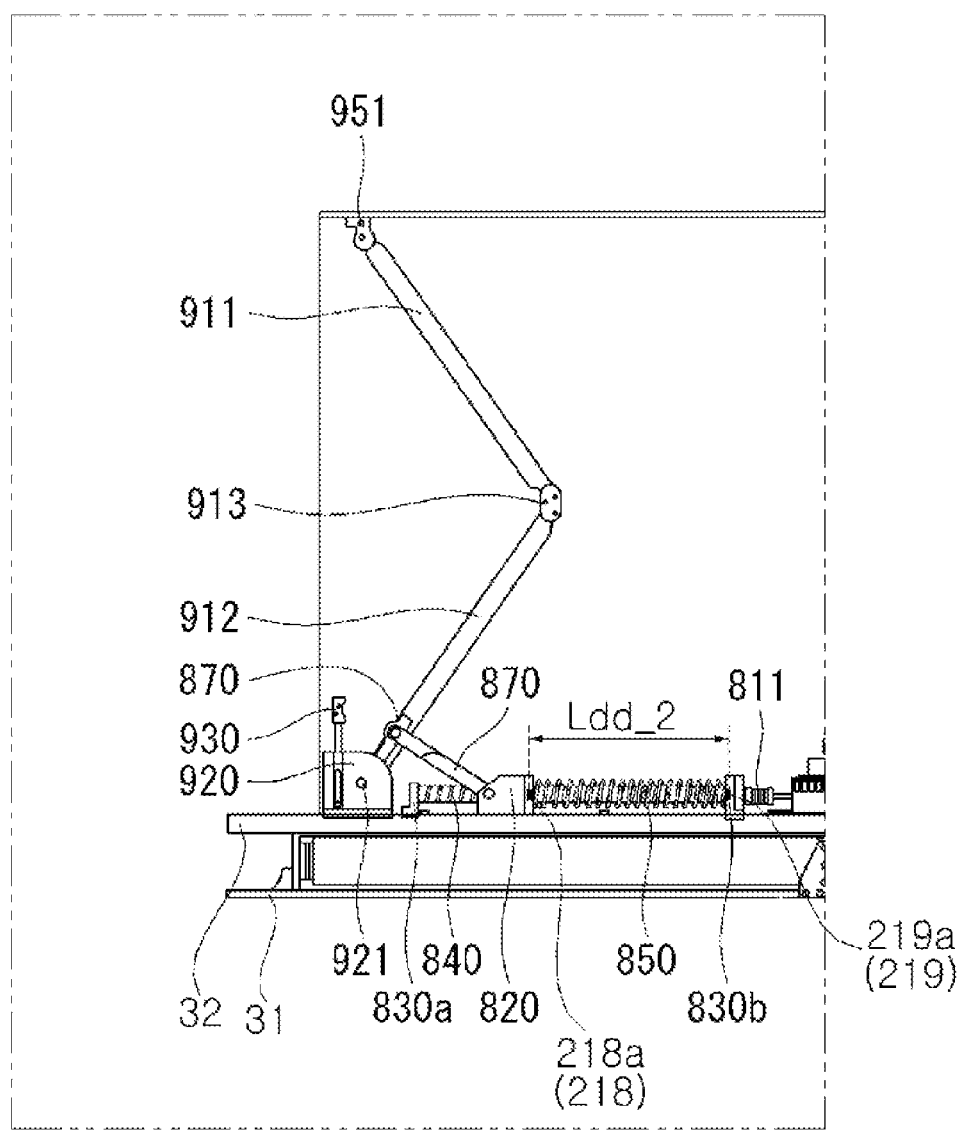

[FIG. 88]
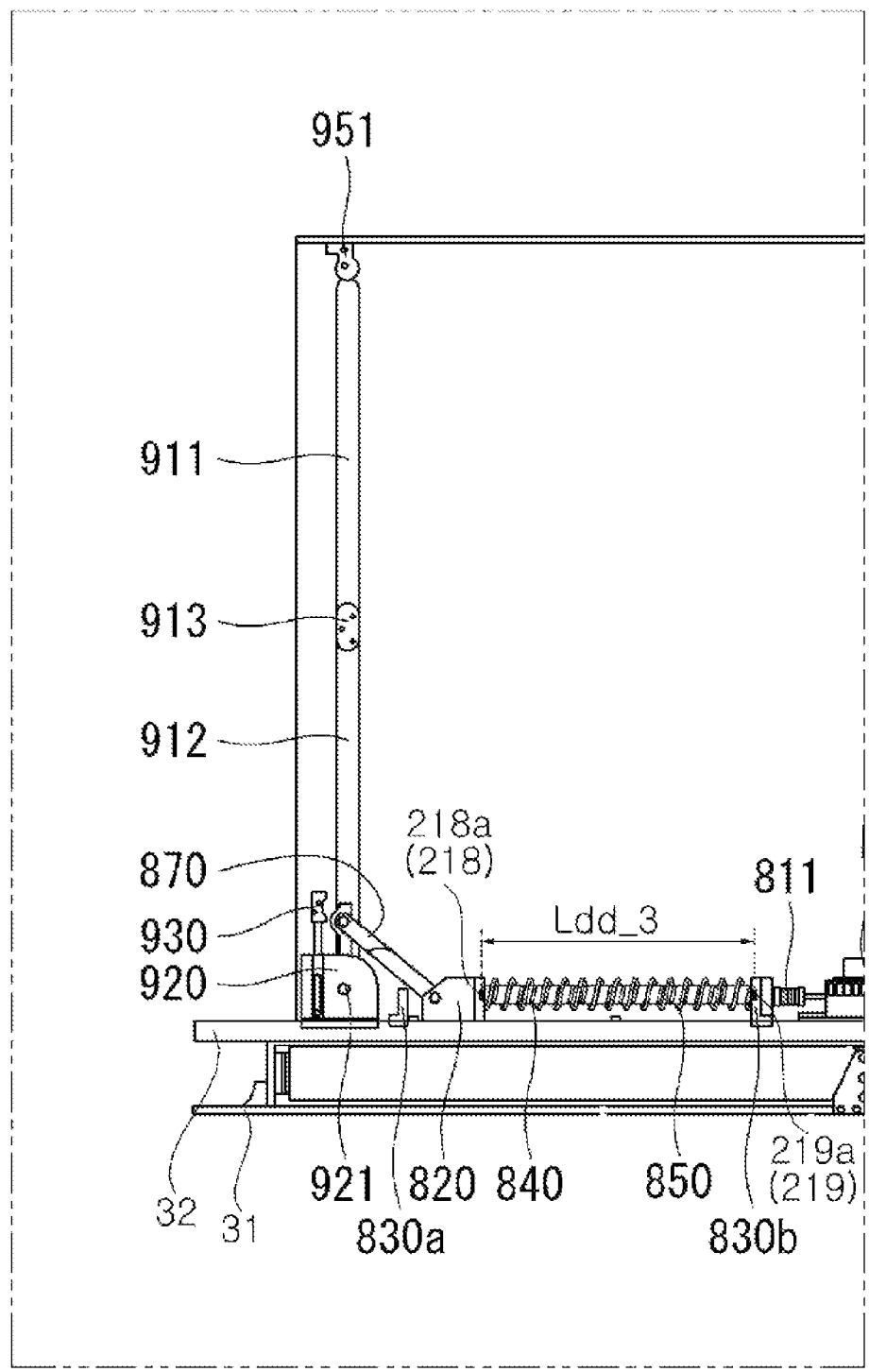

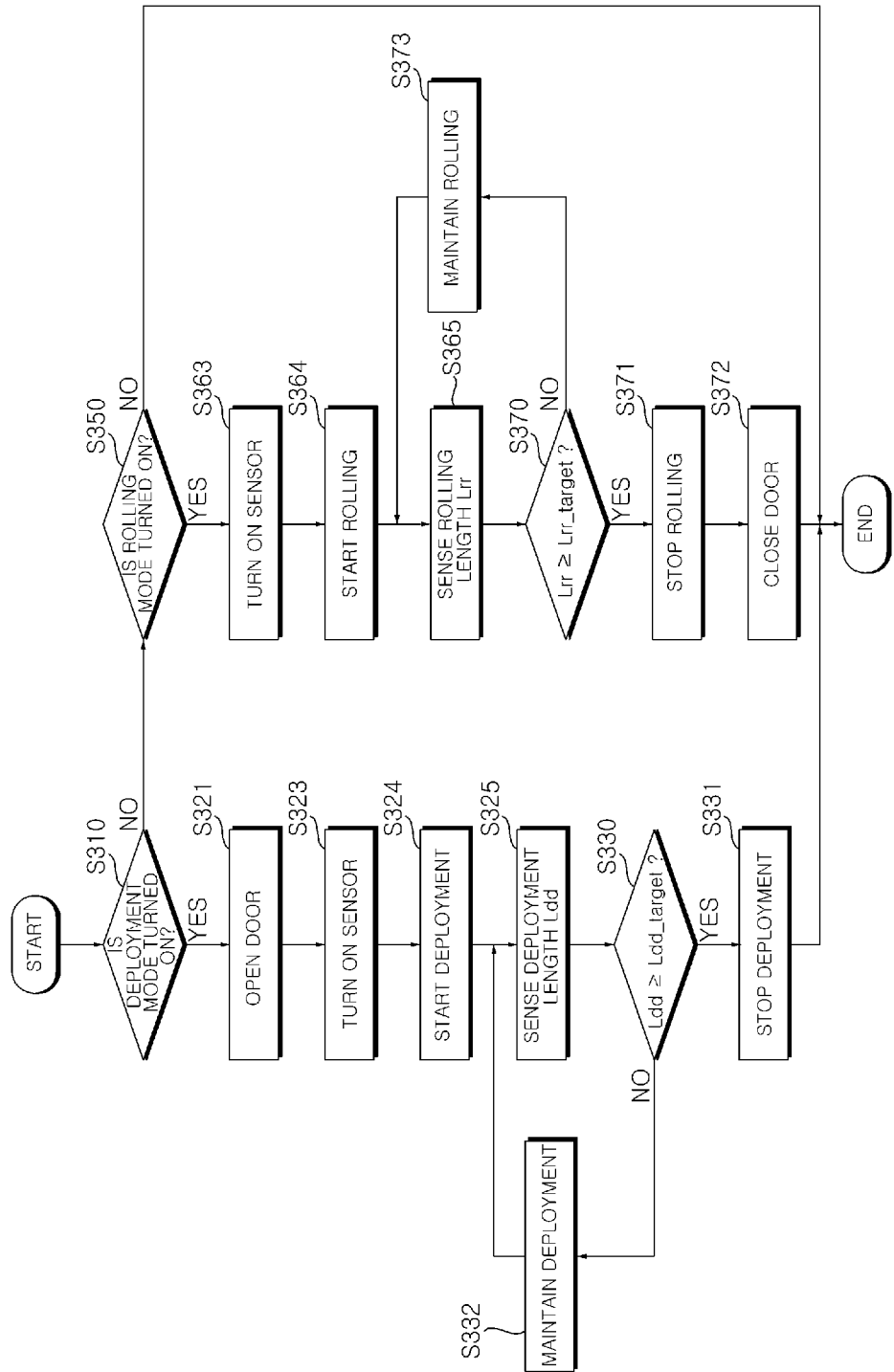
[FIG. 89]

DISPLAY DEVICE

CROSS-REFERENCE TO RELATED APPLICATIONS

This application is the National Stage filing under 35 U.S.C. 371 of International Application No. PCT/KR2020/004951, filed on Apr. 13, 2020, the contents of which are hereby incorporated by reference herein its entirety.

TECHNICAL FIELD

The present disclosure relates to a display device.

BACKGROUND ART

As the information society has developed, the demand for display device is increasing in various forms, and accordingly, in recent years, various display devices such as a liquid crystal display (LCD), plasma display panel (PDP), electroluminescent display (ELD), vacuum fluorescent display (VFD), and the like have been studied and used.

Among them, a display device using an organic light emitting diode (OLED) has excellent luminance and viewing angle characteristics in comparison with a liquid crystal display device and does not require a backlight unit, thereby being implemented in an ultrathin type.

In addition, a flexible display panel can be bent or wound around a roller. The flexible display panel may be used to implement a display device that unfolds on a roller or winds around the roller. Many studies have been made on a structure for winding a flexible display panel around a roller or unwinding the flexible display panel from the roller.

DISCLOSURE OF INVENTION

Technical Problem

An object of the present disclosure is to solve the above-described problems and other problems.

Another object of the present disclosure may be to provide a display device capable of detecting whether an external object is introduced into an opening opened/closed by a door.

Yet another object may be to provide a display device capable of preventing a device from being damaged due to the external object by stopping a deployment or rolling operation of a display panel when the external object is introduced into the opening during the development or rolling operation of the display panel.

Still yet another object of the present disclosure may be to provide a display device capable of announcing, when the external object is introduced into the opening, the introduction of the external object to a user.

Still yet another object of the present disclosure may be to provide a display device capable of precisely adjusting a deployment or rolling degree of the display panel.

Solution to Problem

In order to achieve the object, according to one aspect of the present disclosure, there may be provided a display device including: a housing having an opening; a roller elongated and positioned inside the housing; a display panel which is rolled on or unrolled from the roller, the display panel partitioning one space into a first space and a second space when being positioned outside the housing by passing through the opening; a sensor adjacent to a sensing area formed in at least one of the first space and the second space and sensing whether there is an object entering the sensing area; and a control unit controlling whether there is an operation of the display panel which is rolled on or unrolled from the roller based on information acquired by the sensor.

Advantageous Effects of Invention

Effects of the display device according to the present disclosure will be described below.

According to at least one of embodiments of the present disclosure, a display device can be provided, which is capable of detecting whether an external object is introduced into an opening opened/closed by a door.

According to at least one of embodiments of the present disclosure, a display device can be provided, which is capable of preventing a device from being damaged due to the external object by stopping a deployment or rolling operation of a display panel when the external object is introduced into the opening during the development or rolling operation of the display panel.

According to at least one of embodiments of the present disclosure, a display device can be provided, which is capable of announcing, when the external object is introduced into the opening, the introduction of the external object to a user.

According to at least one of embodiments of the present disclosure, a display device can be provided, which is capable of precisely adjusting a deployment or rolling degree of the display panel.

An additional range of an applicability of the present disclosure will be apparent from the following detailed description. However, since various changes and modifications can be clearly appreciated by those skilled in the art within the spirit and the scope of the present disclosure, the detailed description and a specific embodiment such as a preferred embodiment of the present disclosure should be appreciated as being just given as an example.

BRIEF DESCRIPTION OF DRAWINGS

FIGS. 1 to 89 are diagrams illustrating examples of a display device according to embodiments of the present disclosure.

MODE FOR CARRYING OUT INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if an embodiment is described with reference to a specific figure, if necessary, reference numeral not shown in the specific figure may be referred to, and reference numeral not shown in the specific figure is used when the reference numeral is shown in the other figures.

Referring to FIG. 1, a display device 100 may include a display unit 20 and a housing 30. The housing 30 may have an internal space. At least a portion of the display unit 20 may be located inside the housing 30. At least a portion of the display unit 20 may be located outside the housing 30. The display unit 20 may display a screen.

The direction parallel to the longitudinal direction of the housing 30 may be referred to as a first direction DR1, +x axis direction, −x axis direction, a left direction, or a right direction. The direction in which the display unit 20 displays a screen may be referred to as +z axis, a forward direction, or the front. The direction opposite to the direction in which the display unit 20 displays the screen may be referred to as −z axis, a rearward direction, or the rear. A third direction DR3 may be parallel to +z axis direction or −z axis direction. The direction parallel to the height direction of the display device 100 may be referred to as a second direction DR2, +y axis direction, the −y axis direction, an upper direction, or a lower direction.

The third direction DR3 may be a direction perpendicular to the first direction DR1 and/or the second direction DR2. The first direction DR1 and the second direction DR2 may be collectively referred to as a horizontal direction. In addition, the third direction DR3 may be referred to as a vertical direction. A left and right direction LR may be parallel to the first direction DR1, and an up and down direction UD may be parallel to the second direction DR2.

Referring to FIG. 2, the display unit 20 may be entirely located inside the housing 30. At least a portion of the display unit 20 may be located outside the housing 30. The degree to which the display unit 20 is exposed to the outside of the housing 30 may be adjusted as necessary.

Referring to FIG. 3, the display unit 20 may include a display panel 10 and a plate 15. The display panel 10 may be flexible. For example, the display panel 10 may be an organic light emitting display (OLED).

The display panel 10 may have a front surface for displaying an image. The display panel 10 may have a rear surface facing the front surface. The front surface of the display panel 10 may be covered with a light transmissive material. For example, the light transmissive material may be synthetic resin or film.

The plate 15 may be coupled, fastened or attached to the rear surface of the display panel 10. The plate 15 may include a metal material. The plate 15 may be referred to as a module cover 15, a cover 15, a display panel cover 15, a panel cover 15, or an apron 15.

Referring to FIG. 4, the plate 15 may include a plurality of segments 15c. A magnet 64 may be located inside a recess 118 of the segment 15c. The recess 118 may be located on a surface of the segment 15c facing the display panel 10. The recess 118 may be located in the front surface of each segment 15c. Since the magnet 64 is accommodated inside the recess 118, the magnet 64 may not protrude from the segment 15c. The display panel 10 may be flat without being wrinkled even when it is in contact with the segment 15c.

Referring to FIG. 5, a plurality of magnets 64 may be located on a link 73. For example, at least one magnet 64 may be located on a first arm 73a and at least one magnet 64 may be located on a second arm 73b. The plurality of magnets 64 may be spaced apart from each other.

Referring to FIG. 6, one magnet 64 may be located on the first arm 73a and the second arm 73b, respectively. The magnet 64 may have a shape extended in the long side direction of the first arm 73a and the second arm 73b. Since the magnet 64 has a shape extended in the long side direction of the first arm 73a and the second arm 73b, the area of the portion where the link 73 is in close contact with the display panel and the module cover may be increased. Accordingly, the adhesion between the link 73 and the display panel and the module cover may be strengthened.

Referring to FIG. 7, the magnet 64 may be located in a depression 321 formed in the link 73. The depression 321 may have a shape recessed inward of the link 73. The magnet 64 may be coupled to the link 73 through at least one screw 187.

The width LHW in which the depression 321 is recessed inwardly of the link 73 may be equal to or larger than the thickness MGW of the magnet 64. If the thickness MGW of the magnet 64 is larger than the width LHW of the depression 321, the display panel 10 and the module cover 15 may not be in close contact with the link 73. In this case, the display panel 10 may be wrinkled or may not be flat.

A panel protector 97 may be located in the rear surface of the display panel 10. The panel protector 97 may prevent the display panel 10 from being damaged due to friction with the module cover 15. The panel protector 97 may include a metal material. The panel protector 97 may have a very thin thickness. For example, the panel protector 97 may have a thickness of about 0.1 mm.

Since the panel protector 97 contains a metal material, magnetic attraction between the panel protector 97 and the magnet 64 may occur. Accordingly, the module cover 15 located between the panel protector 97 and the link 73 may be in close contact with the magnet 64 even if it does not contain a metal material.

Referring to FIG. 8, the module cover 15 may be in close contact with the link 73 by an upper bar 75 of the upper side and a guide bar 234 of the lower side (see FIG. 15). A portion between the upper bar 75 and the guide bar 234 of the link 73 may not be in close contact with the module cover 15. Alternatively, the central portion of the link 73 may not be in close contact with the module cover 15. The central portion of the link 73 may be near an arm joint 152. In this case, the distance APRD1, APLD2 between the module cover 15 and the link 73 may not be constant. In this case, the display panel 10 may be bent or twisted.

Referring to FIG. 9, when the magnet 64 is located in the depression 321 of the link 73, the magnet 64 attracts the panel protector 97, so that the module cover 15 can also be in close contact with the magnet at the same time. That is, the central portion of the link 73 may be in close contact with the module cover 15.

Referring to FIG. 10, a bead 136 may be formed in the upper surface of the segment 15b. The bead 136 may have a shape recessed inwardly of segment 15b. The bead 136 may have a shape recessed in the −y axis direction. For example, the bead 136 may be formed by pressing the segment 15b. A plurality of beads 136 may be formed on the segment 15b. The plurality of beads 136 may be spaced apart from each other. The bead 136 may enhance the rigidity of segment 15b. The bead 136 can prevent the shape of the segment 15b from being deformed due to an external impact. The segment 15b may fixed to the rear of the display panel 10 by an adhesive member 70. The panel protector 97 (see FIG. 8) may be disposed between the adhesive member 70 and the display panel 10. For example, the adhesive member 70 may be a double-sided tape.

Referring to FIG. 11, a source PCB 120 may be located above the module cover 15. In the case of roll-up or roll-down, the position of the source PCB 120 may be changed with the movement of the module cover 15. A FFC cable 231 may be located in the central portion of the module cover 15 based on the first direction. The FFC cable 231 may be located in both ends of the module cover 15 based on the first direction.

Referring to FIG. 12, the segment 15d may include a depression 425 recessed in the −z axis direction. The depression 425 may form a space between the display panel 10 and the module cover 15.

The FFC cable 231 may be accommodated in a space formed by the depression 425. In addition, the depression 425 may improve the rigidity of the segment 15d.

The bead 136 may be located on the segment 15d excluding a portion where the depression 425 is located. The bead 136 may not be located in the portion where the depression 425 is located because the thickness of the segment 15d in the third direction becomes thinner.

Referring to FIG. 13, a penetrating portion 437 may be located in the central portion of the segment 15e based on the first direction. The penetrating portion 437 may penetrate the central portion of the segment 15e in the second direction. That is, the penetrating portion 437 may be a hole located in the segment 15e. The penetrating portion 437 may be a portion where the FFC cable 231 is located. Since the penetrating portion 437 is formed in the segment 15e, the thickness of the segment 15e may be reduced in comparison with the case where the FFC cable 231 is located in the depression 425.

The bead 136 may be located on the segment 15e excluding a portion where the penetrating portion 437 is located. In the portion where the penetrating portion 437 is located, the bead 136 may not be located because the thickness of the segment 15e in the third direction becomes thinner.

Referring to FIG. 14, a top case 167 may cover the source PCB 120 and the upper bar 75 as well as the display panel 10 and the module cover 15. One surface of the upper bar 75 may be coupled to the rear surface of the module cover 15, and the other surface thereof may be coupled to the source PCB 120. The upper bar 75 may be fixed to the module cover 15 to support the source PCB 120.

The lower end of the FFC cable 231 may be connected to a timing controller board 105 (see FIG. 15) inside a panel roller 143 (see FIG. 15). The FFC cable 231 may be wound around or unwound from the panel roller 143 together with the display unit 20.

A portion of the FFC cable 231 may be located between the display panel 10 and the module cover 15. A portion of the FFC cable 231 located between the display panel 10 and the module cover 15 may be referred to as a first portion 231a. The first portion 231a may be located in the depression 425 formed by the plurality of segments 15d. Alternatively, the first portion 231a may be accommodated in the depression 425 formed by the plurality of segments 15d.

A portion of the FFC cable 231 may penetrate the segment 15f. A portion of the FFC cable 231 that passes through the segment 15f may be referred to as a second portion 231b. The segment 15f may include a first hole 521a formed in the front surface and a second hole 521b formed in the rear surface. The first hole 521a and the second hole 521b may be connected to each other to form a single hole 521. The hole 521 may penetrate the segment 15f in the third direction. The second portion 231b may penetrate the hole 521. The hole 521 may be referred to as a connection hole 521.

The upper end of the FFC cable 231 may be electrically connected to the source PCB 120. A part of the FFC cable 231 may be located in the rear surface of the module cover 15. A portion of the FFC cable 231 located in the rear surface of the module cover 15 may be referred to as a third portion 231c. The third portion 231c may be electrically connected to the source PCB 120.

The third portion 231c may be covered by the top case 167. Accordingly, the third portion 231c may not be exposed to the outside.

Referring to FIG. 15, the FFC cable 231 may be connected to the timing controller board 105 mounted in the panel roller 143. A penetrating hole 615 may be formed on the panel roller 143, and the FFC cable 231 may be connected to the timing controller board 105 through the penetrating hole 615.

The penetrating hole 615 may be located in one side of the panel roller 143 and may penetrate an outer circumferential portion of the panel roller 143. The FFC cable 231 may be connected to one side of the timing controller board 105 through the penetrating hole 615.

Even when the FFC cable 231 is located in the outer circumference of the panel roller 143, it may maintain the connection with the timing controller board 105 due to the penetrating hole 615. Accordingly, the FFC cable 231 may rotate together with the panel roller 143 to prevent twisting.

A part of the FFC cable 231 may be wound around the panel roller 143. A portion of the FFC cable 231 wound around the panel roller 143 may be referred to as a fourth portion 231d. The fourth portion 231d may be in contact with the outer circumferential surface of the panel roller 143.

A part of the FFC cable 231 may pass through the penetrating hole 615. A portion of the FFC cable 231 passing through the penetrating hole 615 may be referred to as a fifth portion 231e.

The lower end of the FFC cable 231 may be electrically connected to the timing controller board 105. A part of the FFC cable 231 may be located inside the panel roller 143. A portion of the FFC cable 231 located inside the panel roller 143 may be referred to as a sixth portion 231f. The sixth portion 231f may be electrically connected to the timing controller board 105.

Referring to FIG. 16, the lower end of the display panel 10 may be connected to the roller 143. The display panel 10 may be wound around or unwound from the roller 143. The front surface of the display panel 10 may be coupled to the plurality of source PCBs 120. The plurality of source PCBs 120 may be spaced apart from each other.

A source chip on film (COF) 123 may connect the display panel 10 and the source PCB 120. The source COF 123 may be located in the front surface of the display panel 10. The roller 143 may include a first part 331 and a second part 337. The first part 331 and the second part 337 may be fastened by a screw. The timing controller board 105 may be mounted in the roller 143.

The source PCB 120 may be electrically connected to the timing controller board 105. The timing controller board 105 may send digital video data and the timing control signal to the source PCB 120.

The cable 117 may electrically connect the source PCB 120 and the timing controller board 105. For example, the cable 117 may be a flexible flat cable (FFC). The cable 117 may penetrate the hole 331a. The hole 331a may be formed in a seating portion 379 or the first part 331. The cable 117 may be located between the display panel 10 and the second part 337.

The seating portion 379 may be formed in an outer circumference of the first part 331. The seating portion 379 may be formed by stepping a portion of the outer circumference of the first part 331. The seating portion 379 may form a space B. When the display unit 20 is wound around the roller 143, the source PCB 120 may be accommodated in the seating portion 379. Since the source PCB 120 is accommodated in the seating portion 379, the source PCB 120 may not be twisted or bent, and durability may be improved.

The cable 117 may electrically connect the timing controller board 105 and the source PCB 120.

Referring to FIG. 17, the roller 143 wound around with the display unit 20 may be installed in a first base 31. The first base 31 may be a bottom surface of the housing 30. The roller 143 may be extended along the longitudinal direction of the housing 30. The first base 31 may be connected to the side surface 30a of the housing 30.

Referring to FIGS. 18 and 19, the beam 31a may be formed in the first base 31. The beam 31a may improve the bending or torsional rigidity of the first base 31. Many components may be installed in the first base 31, and the first base 31 can receive a large load. Since the rigidity of the first base 31 is improved, sagging due to the load can be prevented. For example, the beam 31a may be formed by a pressing process.

The second base 32 may be spaced upward from the first base 31. The space S1 may be formed in the first base 31 and the second base 32. The roller 143 wound around with the display unit 20 may be accommodated in the space S1. The roller 143 may be located between the first base 31 and the second base 32.

The second base 32 may be connected to the side surface 30a of the housing 30. The bracket 33 may be fastened to the upper surface of the first base 31. The bracket 33 may be fastened to the side surface 30a of the housing 30.

The beam 32a may be formed in the second base 32. The beam 32a may improve the bending or torsional rigidity of the second base 32. For example, the beam 32a may be formed by a press process.

A third part 32d may be connected to the first part 32b and the second part 32c. A fourth part 32e may be connected to the first part 32b and the second part 32c. A space S2 may be formed between the third part 32d and the fourth part 32e. Accordingly, bending or torsional rigidity of the second base 32 may be improved. The third part 32d may be referred to as a reinforcing rib 32d or a rib 32d. The fourth part 32e may be referred to as a reinforcing rib 32e or a rib 32e.

Many components can be installed in the second base 32 and the second base 32 can receive a large load. As the rigidity of the second base 32 is improved, sagging due to the load can be prevented.

A first reinforcing plate 34 may be located between the first base 31 and the second base 32. The first reinforcing plate 34 and the second base 32 may be fastened by a screw. The first reinforcing plate 34 may support the second base 32. The first reinforcing plate 34 may prevent sagging of the second base 32. The first reinforcing plate 34 may be located in the central portion of the first base 31 or in the central portion of the second base 32. The first reinforcing plate 34 may include a curved portion 34a. The curved portion 34a may be formed along the roller 143. The curved portion 34a may not be in contact with the roller 143 or the display unit 20 wound around the roller 143. The curved portion 34a may maintain a certain distance from the roller 143 so as not to interfere with the rotation of the roller 143.

A second reinforcing plate 35 may be fastened to the first base 31 and the first reinforcing plate 34. The second reinforcing plate 35 may support the first reinforcing plate 34. The second reinforcing plate 35 may be located behind the first reinforcing plate 34. The second reinforcing plate 35 may be located behind the first base 31. The second reinforcing plate 35 may be located perpendicular to the first base 31. The second reinforcing plate 35 may be fastened to the beam 31a of the first base 31. The second base 32 may face the front surface or rear surface of the housing 30.

Referring to FIG. 20, the second base 32f may not form a space. When the load that the second base 32f receives is not large, the second base 32f may have sufficient rigidity by including the beam 32g. The first base 31' may include a beam 31a'.

Referring to FIGS. 21 and 22, a motor assembly 810 may be installed in the second base 32. Drive shaft of the motor assembly 810 may be formed in both sides. The right driving shaft and the left driving shaft of the motor assembly 810 may rotate in the same direction. Alternatively, the right driving shaft and the left driving shaft of the motor assembly 810 may rotate in opposite directions.

The motor assembly 810 may include a plurality of motors. The plurality of motors may be connected in series with each other. The motor assembly 810 may output a high torque by connecting a plurality of motors in series.

A lead screw 840 may be located in the left side and the right side of the motor assembly 810, respectively. The motor assembly 810 may be connected to the lead screw 840. A coupling 811 may connect the lead screw 840 and the drive shaft of the motor assembly 810.

The lead screw 840 may be threaded along the longitudinal direction. The direction of the threads formed in the right lead screw 840 and the direction of the threads formed in the left lead screw 840 may be opposite to each other. The direction of the threads formed in the right lead screw 840 and the direction of the threads formed in the left lead screw 840 may be the same. The pitches of the left lead screw 840 and the right lead screw 840 may be the same.

The bearing 830a, 830b may be installed in the second base 32. The bearing 830a, 830b may support both sides of the lead screw 840. The bearing 830a, 830b may include an inner bearing 830b located close to the motor assembly 810 and an outer bearing 830a located far from the motor assembly 810. The lead screw 840 may be stably rotated by the bearing 830a, 830b.

The slide 820 may be engaged with the lead screw 840. The slide 820 may move forward or rearward in the longitudinal direction of the lead screw 840 according to the rotation of the lead screw 840. The slide 820 may move between the outer bearing 830a and the inner bearing 830b. The slide 820 may be located in the left lead screw 840 and the right lead screw 840, respectively. The left slide 820 may be engaged with the left lead screw 840. The right slide 820 may be engaged with the right lead screw 840.

The left slide 820 and the right slide 820 may be located symmetrically with respect to the motor assembly 810. Due to the driving of the motor assembly 810, the left slide 820 and the right slide 820 may move far away or approach from each other by the same distance.

Referring to FIG. 23, the motor assembly 810 may include a plate 812. The plate 812 may be referred to as a mount plate 812 or a motor mount plate 812. A coupling portion 32h may be formed in an upper surface of second base 32. The plate 812 may be fastened to the coupling portion 32h through a screw S. The motor assembly 810 may be spaced apart from the top surface of the second base 32. A washer 813 may be located between the top surface of the plate 812 and the screw S. The washer 813 may include a rubber material. The washer 813 may reduce vibration generated in the motor assembly 810. The washer 813 may improve driving stability of the display device 100.

Referring to FIG. 24, a guide rail 860 may be installed in the second base 32. The guide rail 860 may be located in parallel with the lead screw 840. The slide 820 may be engaged with the guide rail 860. A first stopper 861b may be located in one side of the guide rail 860, and a second stopper 861a may be located in the other side of the guide rail 860. The range in which the slide 820 can move may be limited to between the first stopper 861b and the second stopper 861a.

A spring 850 may wrap the lead screw 840. The lead screw 840 may penetrate the spring 850. The spring 850 may be located between the inner bearing 830b and the slide 820. One side of the spring 850 may contact the inner bearing 830b, and the other side of the spring 850 may contact the slide 820. The spring 850 may provide an elastic force to the slide 820.

When the slide 820 is caught in the first stopper 861b, the spring 850 may be maximally compressed. When the slide 820 is caught in the first stopper 861b, the length of the spring 850 may be minimized. When the slide 820 is caught in the first stopper 861b, the distance between the slide 820 and the inner bearing 830b may be minimized.

Referring to FIG. 25, when the slide 820 is caught in the second stopper 861a, the spring 850 may be maximally tensioned. When the slide 820 is caught in the second stopper 861b, the length of the spring 850 may be maximized. When the slide 820 is caught in the second stopper 861a, the distance between the slide 820 and the inner bearing 830b may be maximized.

Referring to FIG. 26, the first part 820a may be engaged with the guide rail 860. The first part 820a may move along the guide rail 860. Movement of the first part 820a in the longitudinal direction of the guide rail 860 may be restricted. The second part 820b may be located above the first part 820a. The first part 820a and the second part 820b may be fastened through a screw. The second part 820b may be spaced apart from the guide rail 860. The lead screw 840 may penetrate the second part 820b. For example, the second part 820b may include a male thread that engages with a female thread of the lead screw 840. Accordingly, even if the lead screw 840 is rotated, the slide 820 can be stably moved forward or rearward along the guide rail 860 without rotating.

The third part 820c may be coupled to one side of the second part 820b. The third part 820c may contact the spring 850. The third part 820c may be provided with an elastic force from the spring 850.

Referring to FIGS. 27 and 28, a link mount 920 may be installed in the second base 32. One side of a second arm 912 may be pivotably connected to a link mount 920. The other side of the second arm 912 may be pivotably connected to a joint 913. The other side of the second arm 912 may be pivotably connected to a second axis 913b. One side of a rod 870 may be pivotably connected to the slide 820. The other side of the rod 870 may be pivotably connected to the second arm 912 or a third arm 915. One side of the third arm 915 may be pivotably connected to the link mount 920. The other side of the third arm 915 may be pivotably connected to the other side of the rod 870. The link mount 920 may include a shaft 921. The second arm 912 or the third arm 915 may be pivotably connected to the shaft 921.

A link bracket 951 may be referred to as a link cap 951. The link bracket 951 may be coupled to a top case 950. The top case 950 may be referred to as a case top 950, an upper bar 950, a top 950, or a bar 950. The top case 950 may be located in an upper end of the display unit 20. The display unit 20 may be fixed to the top case 950.

One side of a first arm 911 may be pivotably connected to the joint 913. One side of the first arm 911 may be pivotably connected to a first shaft 913a. The other side of the first arm 911 may be pivotably connected to the link bracket 951 or the top case 950.

A gear g1 may be formed in one side of the first arm 911. A gear g2 may be formed in the other side of the second arm 912. The gear g1 of the first arm 911 and the gear g2 of the second arm 912 may be engaged with each other.

When the slide 820 approaches the outer bearing 830a, the second arm 912 or the third arm 915 may stand up. At this time, the direction in which the second arm 912 or the third arm 915 stands may be referred to as a standing direction DRS.

The second arm 912 may include a protrusion 914 protruding in the standing direction DRS. The protrusion 914 may be referred to as a connection part 914. The third arm 915 may include a protrusion 916 protruding in the standing direction DRS. The protrusion 916 may be referred to as a connection part 916. The protrusion 914 of the second arm 912 and the protrusion 916 of the third arm 915 may face or contact each other. The other side of the rod 870 may be fastened to the protrusion 914 of the second arm 912 or the protrusion 916 of the third arm 915.

A link 910 may include a first arm 911, a second arm 912, a third arm 915, and/or a joint 913.

Referring to FIGS. 29 and 30, an angle formed by the second arm 912 or the third arm 915 with respect to the second base 32 may be referred to as theta S. When the rod 870 is connected to the upper side of the second part 820b, an angle between the rod 870 and the second base 32 may be referred to as theta A, and the minimum force for the rod 870 to stand the second arm 912 or the third arm 915 may be referred to as Fa. When the rod 870 is connected to the middle of the second part 820b, an angle between the rod 870 and the second base 32 may be referred to as theta B, and the minimum force for the rod 870 to stand the second arm 912 or the third arm 915 may be referred to as Fb. When the rod 870 is connected to the lower side of the second part 820b, an angle between the rod 870 and the second base 32 may be referred to as theta C, and the minimum force for the rod 870 to stand the second arm 912 or the third arm 915 may be referred to as Fc.

A relationship of theta A<theta B<theta C can be established for the same theta S. In addition, a relationship of Fc<Fb<Fa may be established for the same theta S. If an angle formed by the second arm 912 or the third arm 915 with respect to the second base 32 is the same, the force required to stand up the second arm 912 or the third arm 915 can become smaller as the angle formed by the rod 870 and the second base 32 increases. The rod 870 may be connected to the lower side of the second part 820b to reduce the load applied on the motor assembly 810.

Referring to FIG. 31, the rod 870' may not be connected to the protrusion of the second arm 912 or the protrusion of the third arm 915'. When the angle formed by the second arm 912' or the third arm 915' with respect to the second base 32 is theta S, the angle formed by the rod 870' and the second base 32 is referred to as theta 1, and the minimum force for the rod 870' to stand up the second arm 912' or the third arm 915' may be referred to as F1.

Referring to FIG. 32, the rod 870 may be connected to the protrusion 914 of the second arm 912 or the protrusion 916 of the third arm 915. When the angle formed by the second arm 912 or the third arm 915 with respect to the second base 32 is theta S, the angle formed by the rod 870 and the second base 32 may be referred to as theta 2, and the minimum force for the rod 870 to stand the second arm 912 or the third arm 915 may be referred to as F2.

Referring to FIG. 33, when theta S is the same, theta 2 may be greater than theta 1. If Theta S is the same, F1 can be greater than F2. If the angle formed by the second arm 912, 912' and the second base 32 is the same, the force required to stand up the second arm 912, 912' may become smaller as the angle formed by the rod 870, 870' and the second base 32 becomes larger. The rod 870 may be connected to the protrusion 914, 916 to stand up the second arm 912 with less force than a case where the rod 870' is not connected to the protrusion. The rod 870 may be connected to the 914, 916 to reduce the load applied on the motor assembly 810.

Referring to FIG. 34, the second arm 912 or the third arm 915 may have a central axis CR. When the rod 870 is fastened to the second arm 912 by a distance r away from the central axis CR, the angle formed by the rod 870 and the second base 32 may be referred to as theta 2, and the minimum force for the 870 to stand the second arm 912 or the third arm 915 may be referred to as F3. When the rod 870 is fastened to the second arm 912 by a distance r' away from the central axis CR, the angle formed by the rod 870 and the second base 32 may be referred to as theta 2', and the minimum force for the rod 870 to stand the second arm 912 or the third arm 915 may be referred to as F4. When the rod 870 is fastened to the second arm 912 by a distance r" away from the central axis CR, the angle formed by the rod 870 and the second base 32 may be referred to as theta 2", and the minimum force for the rod 870 to stand the second arm 912 or the third arm 915 may be referred to as F5.

Referring to FIG. 35, when theta S is the same, theta 2" may be greater than theta 2', and theta 2' may be greater than theta 2. When theta S is the same, F3 may be greater than F4, and F4 may be greater than F5. As the rod 870 is fastened away from the central axis CR, the force required to stand the second arm 912 may be smaller. Since the rod 870 is fastened away from the central axis CR, the load on the motor assembly 810 may be reduced.

Referring to FIG. 36, the first arm 911 and the second arm 912 may be in contact with or close to the rear surface of the display unit 20. Since the first arm 911 and the second arm 912 are in contact with or close to the rear surface of the display unit 20, the display unit 20 may be stably wound around or unwound from a roller. The link mount 920 may include a first part 922 and a second part 923. The first part 922 and the second part 923 may face each other. A space S4 may be formed between the first part 922 and the second part 923. The first part 922 may face the display unit 20. The first part 922 may be located closer to the display unit 20 than the second part 923. The second arm 912 may be pivotably connected to the front surface of the first part 922. A part of the third arm 915 may be accommodated in the space S4 and pivotably connected to the first part 922 or the second part 923.

Referring to FIG. 37, the rod 870 may include a first part 871 and a second part 872. The first part 871 may include a connection part 871a in one side thereof. The second part 872 of the slide 820 may form a space S5 therein. The connection part 871a may be inserted into the space S5. The connection part 871a may be pivotably connected to the second part 820b (see FIG. 36) of the slide 820. The other side of the first part 871 may be connected to one side of the second part 872. The other side of the second part 872 may be pivotably connected to the second arm 912 or the third arm 915. The first part 871 may form a space S3 therein. The first part 871 may include a hole 871b. The lead screw 840 may be accommodated in the hole 871b or the space S3.

The distance between the second part 872 and the display unit 20 may be D1. The second arm 912 may have a thickness W1. A portion of the third arm 915 accommodated in the space S4 may have a thickness W3. The thickness W3 may be equal to the distance between the first part 922 and the second part 923. A portion of the third arm 915 that is not accommodated in the space S4 may have a thickness W2. The first part 922 may have a thickness W4. The thickness W2 may be greater than the thickness W3. The thickness W2 may be equal to the sum of the thickness W3 and the thickness W4. D1 may be the sum of the thickness W1 and the thickness W2.

The second arm 912 may be located in contact with or close to the rear surface of the display unit 20, and the third arm 915 may be located between the second arm 912 and the second part 872. The second part 872 can stably transmit power for standing the second arm 912 due to the third arm 915. The second part 872 may be connected to the first part 871 by moving forward with respect to the axis of rotation of the lead screw 840, so as to stably stand the second arm 912 or the third arm 915. Thus, the play between the second arm 912 and the second part 872 may be minimized.

Referring to FIG. 38, a pusher 930 may be installed in the link mount 920. The pusher 930 may be referred to as a lifter 930. A second part 932 may be fastened to the first part 931. The second part 932 may be in contact with or separated from the link bracket 951. The second part 932 may be made of a material having high elasticity. The first part 931 may be made of a material having a lower elasticity than the second part 932. The first part 931 may be made of a material having a higher rigidity than the second part 932. The first part 931 and the second part 932 may be collectively referred to as a head 936. The head 936 may be located above the link mount 920.

A third part 933 may be connected to the first part 931. Alternatively, the third part 933 may be extended downward from the first part 931. The third part 933 may be referred to as a tail 933. A fourth part 934 may protrude from the third part 933. The link mount 920 may form a space S6, and the third part 933 may be accommodated in the space S6. The space S6 may be opened upward. The space S6 in which the third part 933 is accommodated may be adjacent to the space S4 (see FIG. 37) in which the third arm 915 is accommodated. The second part 932 of the link mount 920 may include a hole 924. The hole 924 may be a long hole formed in the vertical direction. The length of the hole 924 may be H1. The fourth part 934 may be inserted into the hole 924. The spring 935 may be accommodated in the space S6. The spring 935 may be located below the third part 933. The spring 935 may provide an elastic force in the direction perpendicular to the third part 933.

The head 936 may be larger than the diameter of the space S6. When the head 936 is caught in the upper end of the space S6, the height of the head 936 from the second base 32 may be minimized. The minimum height of the head 936 may be referred to as H2. When the height of the head 936 is minimized, the fourth part 934 may be caught in the lower end of the space S6. When the height of the head 936 is minimized, the spring 935 may be maximally compressed. When the height of the head 936 is minimized, the elastic force provided by the spring 935 may be maximized. When the height of the head 936 is minimized, the height of the top case 950 may be maximized.

The pusher 930 may provide elastic force to the link bracket 951, while being in contact with the link bracket 951. Thus, the load applied on the motor assembly 810 to stand up the link 910 may be reduced.

Referring to FIG. 39, when the link 910 stands up sufficiently, the pusher 930 may be separated from the link bracket 951. When the pusher 930 is separated from the link bracket 951, the height of the head 936 from the second base 32 may be maximized. The maximum height of the head 936 may be referred to as H3. When the height of the head 936 is maximized, the fourth part 934 may be caught in the upper end of the hole 924 (see FIG. 38). If the height of the head 936 is maximized, the spring 935 may be maximally tensioned. When the height of the head 936 is maximized, the elastic force provided by the spring 935 may be minimized. The maximum height H3 of the head 936 may be substantially equal to the sum of the minimum height H2 of the head 936 and the length H1 of the hole.

Referring to FIG. 40, the display unit 20 may be in a state of being maximally wound around the roller 143. The display device 100 may be symmetrical with respect to the motor assembly 810. The height of the top case 950 may be minimized. The slide 820 may be in a position closest to the inner bearing 830b. The slide 820 may be in a state of being caught in the first stopper 861b. The spring 850 may be in a maximally compressed state. The pusher 930 may be in contact with the link bracket 951. The height of the pusher 930 may be minimized.

Referring to FIG. 41, about half of the display unit 20 may be in a state of being wound around the roller 143. The display device 100 may be symmetrical with respect to the motor assembly 810. About half of the display unit 20 may be in a state of being unwound from the roller 143. The slide 820 may be located between the first stopper 861b and the second stopper 861a. The pusher 930 may be separated from the link bracket 951. The height of the pusher 930 may be maximized.

Referring to FIG. 42, the display unit 20 may be in a state of being maximally unwound from the roller 143. The display device 100 may be symmetrical with respect to the motor assembly 810. The height of the top case 950 may be maximized. The slide 820 may be in a position closest to the outer bearing 830a. The slide 820 may be in a state of being caught in the second stopper 861a. The spring 850 may be in a state of maximum tension. The pusher 930 may be separated from the link bracket 951. The height of the pusher 930 may be maximized.

Referring to FIGS. 43 to 46, a link mount 920a, 920b may be installed in the base 31. The link mount 920a, 920b may include a right link mount 920a spaced to the right from a first right bearing 830a and a left link mount 920b spaced to the left from a second left bearing 830d.

A link 910a, 910b may be connected to the link mount 920a, 920b. The link 910a, 910b may include a right link 910a connected to the right link mount 920a and a left link 910b connected to the left link mount 920b.

The right link 910a may be referred to as a first link. The left link 910b may be referred to as a second link. The right link mount 920a may be referred to as a first link mount 920a. The left link mount 920b may be referred to as a second link mount 920b.

The link 910a, 910b may include a first arm 911a, 911b, a second arm 912a, 912b, and an arm joint 913a, 913b. One side of the second arm 912a, 912b may be rotatably connected to the link mount 920a, 920b. The other side of the second arm 912a, 912b may be rotatably connected to the arm joint 913a, 913b. One side of the first arm 911a, 911b may be rotatably connected to the arm joint 913a, 913b. The other side of the first arm 911a, 911b may be rotatably connected to the link bracket 951a, 951b.

The link bracket 951a, 951b may include a right link bracket 951a connected to the first arm 911a of the right link 910a and a left link bracket 951b connected to the first arm 911b of the left link 910b. The link bracket 951a, 951b may be connected to the upper bar 950.

The upper bar 950 may connect the right link bracket 951a and the left link bracket 951b.

A rod 870a, 870b may connect a slider 860a, 860b to the link 910a, 910b. One side of the rod 870a, 870b may be rotatably connected to the slider 860a, 860b. The other side of the rod 870a, 870b may be rotatably connected to the second arm 912a, 912b. The rod 870a, 870b may include a right rod 870a connecting the right slider 860a and the second arm 912a of the right link 910a and a left rod 870b connecting the left slider 860b and the second arm 912b of the left link 910b. The right rod 870a may be referred to as a first rod 870a. The left rod 870b may be referred to as a second rod 870b.

Specifically, a structure formed by a right lead screw 840a, the right slider 860a, the right rod 870a, and the right link 910a will be described. The right slider 860a may include a body 861a and a rod mount 862a. The body 861a may have a thread SS formed on an inner circumferential surface thereof. The thread formed in the body 861a may be engaged with the thread RS of the right lead screw 840a. The right lead screw 840a may penetrate the body 861a.

The rod mount 862a may be formed in the right side of the body 861a. The rod mount 862a may be rotatably connected to one side of the right rod 870a. The rod mount 862a may include a first rod mount 862a1 and a second rod mount 862a2. The first rod mount 862a1 may be disposed in front of the right lead screw 840a. The second rod mount 862a2 may be disposed behind the right lead screw 840a. The first rod mount 862a1 and the second rod mount 862a2 may be spaced apart from each other. The second rod mount 862a2 may be spaced apart from the first rod mount 862a1 in the −z axis direction. The right lead screw 840a may be located between the first rod mount 862a1 and the second rod mount 862a2.

The rod mount 862*a* may be rotatably connected to one side of the rod 870*a* through a connecting member C1. The connecting member C1 may penetrate the rod mount 862*a* and the right rod 870*a*.

The right rod 870*a* may be rotatably connected to a second arm 912*a* through a connecting member C2. The connecting member C2 may penetrate the second arm 912*a* and the right rod 870*a*.

The right rod 870*a* may include a transmission part 871*a* connected to the second arm 912*a* of the right link 910*a* and a cover 872*a* connected to the rod mount 862*a* of the right slider 860*a*. The transmission part 871*a* may transmit a force, which is generated as the right slider 860*a* moves forward or rearward along the right lead screw 840*a*, to the right link 910*a*.

The cover 872*a* may include a first plate 873*a* disposed in front of the right lead screw 840*a*. The first plate 873*a* may be disposed perpendicular to the base 31. Alternatively, the first plate 873*a* may face the right lead screw 840*a*.

The cover 872*a* may include a second plate 874*a* disposed behind the right lead screw 840*a*. The second plate 874*a* may be disposed perpendicular to the base 31. Alternatively, the second plate 874*a* may face the right lead screw 840*a*. Alternatively, the second plate 874*a* may be spaced apart from the first plate 873*a*. The right lead screw 840*a* may be located between the first plate 873*a* and the second plate 874*a*.

The cover 872*a* may include a third plate 875*a* connecting the first plate 873*a* and the second plate 874*a*. The third plate 875*a* may be connected to the transmission part. The third plate 875*a* may be located above the right lead screw 840*a*.

The cover 872*a* may include a fourth plate 876*a* connecting the first plate 873*a* and the second plate 874*a*. The fourth plate 876*a* may be connected to the third plate 875*a*. The fourth plate 876*a* may be located above the right lead screw 840*a*.

One side of the first plate 873*a* may be connected to the first rod mount 862*a*1. The first plate 873*a* and the first rod mount 862*a*1 may be connected through the connecting member C1'. The other side of the first plate 873*a* may be connected to the third plate 875*a*.

One side of the second plate 874*a* may be connected to the second rod mount 862*a*2. The second plate 874*a* and the second rod mount 862*a*2 may be connected through the connecting member C1. The other side of the second plate 874*a* may be connected to the third plate 875*a*.

When the right slider 860*a* is moved closer to the motor assembly 810, the right lead screw 840*a* and the right rod 870*a* may be in contact with each other. When the right lead screw 840*a* and the right rod 870*a* contact each other, mutual interference may occur and the movement of the right slider 860*a* may be restricted.

The cover 872*a* may provide a space S1 therein. The first plate 873*a*, the second plate 874*a*, the third plate 875*a*, and the fourth plate 876*a* may form the space S1. When the right slider 860*a* is moved closer to the motor assembly 810, the right lead screw 840*a* may be accommodated or escaped into the space S1 provided by the cover 872*a*. The right slider 860*a* may move closer to the motor assembly 810 than a case of not having the cover 872*a*, due to the space S1 provided by the cover 872*a*. That is, the cover 872*a* may expand the movable range of the right slider 860*a* by providing the space S1 therein. In addition, since the right lead screw 840*a* is accommodated in the cover 872*a*, the size of the housing 30 (see FIG. 2) can be reduced.

In addition, the cover 872*a* may limit the minimum value of the angle theta S formed between the second arm 912*a* and the base 31. The third plate 875*a* of the cover 872*a* may contact the second arm 912*a* and may support the second arm 912*a*, when theta S is sufficiently small. By supporting the second arm 912*a*, the third plate 875*a* may limit the minimum value of theta S and prevent sagging of the second arm 912*a*. That is, the cover 872*a* may serve as a stopper for preventing sagging of the second arm 912*a*. In addition, the third plate 875*a* may reduce the initial load for standing the second arm 912*a* by limiting the minimum value of theta S.

The lead screw 840*a*, 840*b* may be driven by a single motor assembly 810. The lead screw 840*a*, 840*b* is driven by a single motor assembly 810, so that the second arm 912*a*, 912*b* can stand up in symmetry. However, when driving the lead screw 840*a*, 840*b* by a single motor assembly 810, the load on the motor assembly 810 to stand the second arm 912*a*, 912*b* may be excessively increased. At this time, the third plate 875*a* may reduce the load on the motor assembly 810 to stand the second arm 912*a*, 912*b*, by limiting the minimum value of theta S.

The structure formed by the left lead screw 840*b*, the left slider 860*b*, the left rod 870*b*, and the left link 910*b* may be symmetric with the structure formed by the right lead screw 840*a*, the right slider 860*a*, the right rod 870*a*, and the right link 910*a*. In this case, the axis of symmetry may be the axis of symmetry ys of the motor assembly 810.

Referring to FIG. 47, a guide 850*a*, 850*b*, 850*c*, 850*d* may be connected to the bearing 830*a*, 830*b*, 830*c*, and 830*d*. The guide 850*a*, 850*b*, 850*c*, 850*d* may include a right guide 850*a*, 850*b* disposed in the right side of the motor assembly 810 and a left guide 850*c*, 850*d* disposed in the left side of the motor assembly 810.

The right guide 850*a*, 850*b* may have one side connected to a first right bearing 830*a* and the other side connected to a second right bearing 830*b*. The right guide 850*a*, 850*b* may be located in parallel with the right lead screw 840*a*. Alternatively, the right guide 850*a*, 850*b* may be spaced apart from the right lead screw 840*a*.

The right guide 850*a*, 850*b* may include a first right guide 850*a* and a second right guide 850*b*. The first right guide 850*a* and the second right guide 850*b* may be spaced apart from each other. The right lead screw 840*a* may be located between the first right guide 850*a* and the second right guide 850*b*.

The right slider 860*a* may include a protrusion. Alternatively, the display device may include a protrusion formed in the right slider 860*a*. The protrusion may be formed in the body of the slider. The protrusion may include a front protrusion (not shown) protruded in the +z-axis direction from the body 861*a* of the right slider 860*a* and a rear protrusion 865*a* protruded in the −z-axis direction from the body of the slider.

The first right guide 850*a* may penetrate the rear protrusion 865*a*. Alternatively, it may include a first hole 863*a* formed in the rear protrusion, and the first right guide 850*a* may penetrate the first hole 863*a*. The first hole 863*a* may be formed in the x-axis direction. The first hole 863*a* may be referred to as a hole 863*a*.

The second right guide (not shown) may penetrate the front protrusion (not shown). Alternatively, it may include a second hole (not shown) formed in the front protrusion, and the second right guide may penetrate the second hole. The second hole may be formed in the x-axis direction.

The right guide 850*a*, 850*b* may guide the right slider 860*a* to move more stably when the right slider 860*a* moves forward or rearward along the right lead screw 840*a*. As the right guide 850*a*, 850*b* stably guides the right slider 860*a*, the right slider 860a can move forward or rearward along the right lead screw 840a while not rotating with respect to the right lead screw 840a.

The structure formed by the left guide 850c, 850d, the left bearing 830a, 830b, 830c, and 830d, the left slider 860b, and the left lead screw 840b may be symmetrical with the structure formed by the right guide 850a, 850b, the right bearing 830a, 830b, 830c, and 830d, the right slider 860a, and the right lead screw 840a. In this case, the axis of symmetry may be the axis of symmetry ys of the motor assembly 810.

Referring to FIG. 48, a first spring 841a, 841b may be inserted into the lead screw 840a, 840b. Alternatively, the lead screw 840a, 840b may penetrate the first spring 841a, 841b. The first spring 841a, 841b may include a first right spring 841a disposed in the right side of the motor assembly 810 and a first left spring 841b disposed in the left side of the motor assembly 810.

The first right spring 841a may be disposed between the right slider 860a and the second right bearing 830b. One end of the first right spring 841a may be in contact with or separated from the right slider 860a. The other end of the first right spring 841a may be in contact with or separated from the second right bearing 830b.

When the second arm 912a is fully laid with respect to the base 31, the distance between the right slider 860a and the second right bearing 830b may be a distance RD3. The first right spring 841a may have a length greater than the distance RD3 in the state of not being compressed or tensioned. Thus, when the second arm 912a is fully laid with respect to the base 31, the first right spring 841a may be compressed between the right slider 860a and the second right bearing 830b. Then, the first right spring 841a may provide a restoring force to the right slider 860a in the +x axis direction.

When the second arm 912a changes from a fully laid state to a standing state with respect to the base 31, the restoring force provided by the first right spring 841a may assist the second arm 912a to stand up. As the first right spring 841a assists the second arm 912a to stand up, the load on the motor assembly 810 may be reduced.

The lead screw 840a, 840b may be driven by a single motor assembly 810. As the lead screw 840a, 840b is driven by a single motor assembly 810, the second arm 912a, 912b can stand up in symmetry. However, when the lead screw 840a, 840b is driven by a single motor assembly 810, the load on the motor assembly 810 to stand the second arm 912a, 912b may be excessively increased. At this time, the first right spring 841a assists the second arm 912a to stand up, so that the load on the motor assembly 810 can be decreased, and the load on the motor assembly 810 to stand the second arm 912a can be reduced.

Alternatively, when the second arm 912a changes from the standing state to the fully laid state with respect to the base 31, the restoring force provided by the first right spring 841a can alleviate the shock that occurs when the second arm 912a is laid with respect to the base 31. That is, the first right spring 841a may serve as a damper when the second arm 912a is laid with respect to the base 31. As the first right spring 841a serves as a damper, the load of the motor assembly 810 may be reduced.

The structure formed by the first left spring 841b, the left bearing 830a, 830b, 830c, and 830d, the left slider 860b, the left lead screw 840b, and the second arm 912a may be symmetrical with the structure formed by the first right spring 841a, the right bearing 830a, 830b, 830c, and 830d, the right slider 860a, the right lead screw 840a, and the second arm 912a. In this case, the axis of symmetry may be the axis of symmetry ys of the motor assembly 810.

Referring to FIG. 49, the second spring 851a, 851b may be inserted into the guide 850a, 850b, 850c, 850d. Alternatively, the guide 850a, 850b, 850c, 850d may penetrate the second spring 851a, 851b. The second spring 851a, 851b may include a second right spring 851a disposed in the right side of the motor assembly 810 and a second left spring 851b disposed in the left side of the motor assembly 810.

A plurality of second right springs 851a may be formed. The second right spring 851a may include a spring 940a, 940b inserted into the first right guide 850a and a spring 940a, 940b inserted into the second right guide 850b. Alternatively, the second right spring 851a may include a spring 940a, 940b through which the first right guide 850a passes and a spring 940a, 940b through which the second right guide 850b passes.

The guide 850a, 850b, 850c, 850d may include a locking jaw 852a, 852b. The locking jaw 852a, 852b may include a right locking jaw 852a disposed in the right side of the motor assembly 810 and a left locking jaw 852b disposed in the left side of the motor assembly 810.

The right locking jaw 852a may be disposed between the right slider 860a and the second right bearing 830b. The second right spring 851a may be disposed between the right slider 860a and the second right bearing 830b. One end of the second right spring 851a may be in contact with or separated from the right slider 860a. The other end of the second right spring 851a may be in contact with or separated from the right locking jaw 852a.

When the second arm 912a is fully laid with respect to the base 31, the distance between the right slider 860a and the right locking jaw 852a may be a distance RD4. The second right spring 851a may have a length greater than the distance RD4 in the state of being not compressed or tensioned. Thus, when the second arm 912a is fully laid with respect to the base 31, the second right spring 851a may be compressed between the right slider 860a and the right locking jaw 852a. The second right spring 851a may provide a restoring force to the right slider 860a in the +x axis direction.

When the second arm 912a changes from the fully laid state to the standing state with respect to the base 31, the restoring force provided by the second right spring 851a may assist the second arm 912a to stand up. As the second right spring 851a assists the second arm 912a to stand, the load on the motor assembly 810 can be reduced.

The lead screw 840a, 840b may be driven by a single motor assembly 810. As the lead screw 840a, 840b is driven by a single motor assembly 810, the second arm 912a, 912b may stand up in symmetry. However, when the lead screw 840a, 840b is driven by a single motor assembly 810, the load on the motor assembly 810 to stand the second arm 912a, 912b may be excessively increased. At this time, the second right spring 851a may assist the second arm 912a to stand up so that the load on the motor assembly 810 can be decreased, thereby reducing the load on the motor assembly 810 to stand the second arm 912a.

Alternatively, when the second arm 912a changes from the standing state to the fully laid state with respect to the base 31, the restoring force provided by the second right spring 851a can alleviate the shock that occurs when the second arm 912a is laid with respect to the base 31. That is, the second right spring 851a may serve as a damper when the second arm 912a is laid with respect to the base 31. As the second right spring 851a serves as a damper, the load of the motor assembly 810 may be reduced.

The structure formed by the second left spring 851b, the left locking jaw 852b, the left slider 860b, the left guide 850c, 850d, and the second arm 912a may be symmetric with the structure formed by the above-described second right spring 851a, the right locking jaw 852a, the right slider 860a, the right guide 850a, 850b, and the second arm 912a. In this case, the axis of symmetry may be the axis of symmetry ys of the motor assembly 810.

Referring to FIGS. 50 to 52, the second arm 912a may stand up by receiving a restoring force from the first right spring 841a and the second right spring 851a.

An angle formed by the second arm 912a with respect to the base 31 may be referred to as an angle theta S. The angle formed by the right rod 870a with respect to the base 31 may be referred to as an angle theta T. The force applied by the motor assembly 810 for moving the right slider 860a in the +x-axis direction may be referred to as FA. The force exerted on the right slider 860a by the first right spring 841a may be referred to as FB. The force exerted on the right slider 860a by the second right spring 851a may be referred to as FC. The force transmitted by the right rod 870a to the second arm 912a may be referred to as FT.

When the second arm 912a is fully laid with respect to the base 31, the angle theta S and the angle theta T may have minimum values. When the second arm 912a changes from the fully laid state to the standing state with respect to the second base 31, the angle theta S and the angle theta T may be gradually increased.

When the second arm 912a is fully laid with respect to the base 31, the first right spring 841a may be compressed. The compressed first right spring 841a may provide restoring force FB to the right slider 860a. The restoring force FB may act in the +x direction. When the second arm 912a is fully laid with respect to the base 31, the compression displacement amount of the first right spring 841a may be maximized, and the magnitude of the restoring force FB may have a maximum value. When the second arm 912a changes from the fully laid state to the standing state with respect to the base 31, the compression displacement amount of the first right spring 841a may be gradually decreased, and the magnitude of the restoring force FB may be gradually decreased.

When the second arm 912a is fully laid with respect to the base 31, the second right spring 851a may be compressed. The compressed second right spring 851a may provide restoring force FC to the right slider 860a. The restoring force FC may act in the +x direction. When the second arm 912a is fully laid with respect to the base 31, the compression displacement amount of the second right spring 851a may be maximized, and the magnitude of the restoring force FC may have a maximum value. When the second arm 912a changes from the fully laid state to the standing state with respect to the base 31, the compression displacement amount of the second right spring 851a may be gradually decreased, and the magnitude of the restoring force FC may be gradually decreased.

The force FT that the right rod 870a transmits to the second arm 912a may be a summed force of the force FA applied by the motor assembly 810 for moving the right slider 860a in the +x-axis direction, the restoring force FB of the first right spring 841a, and the restoring force FC of the second right spring 851a.

When the second arm 912a starts to stand up in the state where the second arm 912a is fully laid with respect to the base 31, the load of the motor assembly 810 may be maximized. At this time, the magnitude of the restoring force FB provided by the first right spring 841a may be maximized. In addition, the magnitude of the restoring force FC provided by the second spring 851a, 851b may be maximized.

When the second arm 912a changes from the fully laid state to the standing state with respect to the base 31, the restoring force provided by the first right spring 841a and the second right spring 851a may assist to stand the second arm 912a. As the first right spring 841a and the second right spring 851a assist the second arm 912a to stand, the load of the motor assembly 810 can be reduced.

The first right spring 841a and the second right spring 851a may simultaneously provide the restoring force (the summed force of the restoring force FB and the restoring force FC) to the right slider 860a. The restoring force (the summed force of the restoring force FB and the restoring force FC) may be provided to the right slider 860a until the distance RD5 between the right slider 860a and the right locking jaw 852a becomes equal to the length of the second right spring 851a.

When the distance RD5 between the right slider 860a and the right locking jaw 852a is equal to the length of the second right spring 851a, the compression displacement amount of the second right spring 851a may become zero. When the compression displacement amount of the second right spring 851a is zero, the restoring force FC provided by the second right spring 851a to the right slider 860a may be zero.

When the distance RD5 between the right slider 860a and the right locking jaw 852a is greater than the length of the second right spring 851a, only the first right spring 841a may provide the restoring force FB to the right slider 860a. The restoring force FB may be provided to the right slider 860a until the distance RD6 between the right slider 860a and the second right bearing 830b becomes equal to the length of the first right spring 841a.

When the distance RD6 between the right slider 860a and the second right bearing 830b is equal to the length of the first right spring 841a, the compression displacement amount of the first right spring 841a may be zero. When the compression displacement amount of the first right spring 841a becomes zero, the restoring force FB provided by the first right spring 841a to the right slider 860a may be zero.

When the distance RD6 between the right slider 860a and the second right bearing 830b is greater than the length of the first right spring 841a, the motor assembly 810 may stand the second arm 912a without receiving the restoring force from the first right spring 841a or the second right spring 851a.

The structure formed by the first left spring 841b, the second left spring 851b, the left locking jaw 852b, the left slider 860b, the left guide 850c, 850d, the left lead screw 840b, the left rod 870b, and the second arm 912a may be symmetrical with the structure formed by the first right spring 841a, the second right spring 851a, the right locking jaw 852a, the right slider 860a, the right guide 850a, 850b, the right lead screw 840a, the right rod 870a, and the second arm 912a. In this case, the axis of symmetry may be the axis of symmetry ys of the motor assembly 810.

Referring to FIG. 53, the pusher 930a, 930b may be connected to the link mount 920a, 920b. The pusher 930a, 930b may include a right pusher 930a disposed in the right side of the motor assembly 810 and a left pusher 930b disposed in the left side of the motor assembly 810.

The link mount 920a, 920b may form an accommodation space A. The accommodation space A may accommodate the spring 940a, 940b and the pusher 930a, 930b. The spring 940a, 940b may include a right spring 940a disposed in the right side of the motor assembly 810 and a left spring 940b disposed in the left side of the motor assembly 810. The accommodation space A may be referred to as an internal space A.

The link mount 920a, 920b may include a first hole 922a connecting the accommodation space A and an external space (the first hole corresponding to 920b is not shown). The first hole 922a may be formed in the upper surface of the link mount 920a, 920b. The first hole 922a may be referred to as a hole 922a.

The pusher 930a, 930b may be located perpendicular to the base 31. Alternatively, the pusher 930a, 930b may be disposed parallel to the y axis. The spring 940a, 940b may be located perpendicular to the base 31. Alternatively, the spring 940a, 940b may be disposed parallel to the y axis.

The pusher 930a, 930b may include a first part 931a, 931b and a second part 932a, 932b. The second part 932a, 932b may be connected to the lower side of the first part 931a, 931b. The lower end of the second part 932a, 932b may be connected to the spring 940a, 940b. All or part of the second part 932a, 932b may be accommodated in the accommodation space A formed by the link mount 920a, 920b. The second part 932a, 932b may have a diameter equal to the diameter of the first hole 922a or may have a diameter smaller than the diameter of the first hole 922a. The second part 932a, 932b may penetrate the first hole 922a.

The first part 931a, 931b may be located outside the link mount 920a, 920b. Alternatively, the first part 931a, 931b may be located outside the accommodation space A of the link mount 920a, 920b. The first part 931a, 931b may have a diameter larger than the diameter of the first hole 922a.

The first part 931a, 931b may be in contact with or spaced apart from the link bracket 951a, 951b. For example, when the second arm 912a, 912b is fully laid with respect to the base 31, the first part 931a, 931b may be in contact with the link bracket 951a, 951b. Alternatively, when the second arm 912a, 912b fully stands up with respect to the base 31, the first part 931a, 931b may be spaced apart from the link bracket 951a, 951b.

When the first part 931a, 931b is in contact with the link bracket 951a, 951b, the pusher 930a, 930b may receive a force from the link bracket 951a, 951b. The force applied to the pusher 930a, 930b may be in a downward direction. Alternatively, the force applied to the pusher 930a, 930b may be in the −y axis direction. Alternatively, the link bracket 951a, 951b may press the pusher 930a, 930b. The direction in which the link bracket 951a, 951b presses the pusher 930a, 930b may be downward. Alternatively, the direction in which the link bracket 951a, 951b presses the pusher 930a, 930b may be in the −y axis direction.

When the first part 931a, 931b is applied with a force, the spring 940a, 940b may be compressed. The compressed spring 940a, 940b may provide restoring force to the pusher 930a, 930b. The direction of the restoring force may be opposite to the direction of the force applied to the first part 931a, 931b. Alternatively, the restoring force may act in the +y-axis direction.

The link mount 920a, 920b may include a second hole 921a (the second hole corresponding to 920b is not shown). The second hole 921a may connect the accommodation space A and the external space. All or part of the spring 940a, 940b may be exposed to the outside through the second hole 921a. All or part of the pusher 930a, 930b may be exposed to the outside through the second hole 921a. In the maintenance or repair of the display device, a service provider may check the operating state of the pusher 930a, 930b through the second hole 921a. The second hole 921a may provide a service provider with convenience of maintenance or repair.

Referring to FIGS. 54 to 56, the right link 910a may stand up by receiving the restoring force from the right pusher 930a. It will be described based on the right link 910a.

An angle formed by the second arm 912a with respect to the base 31 may be referred to as an angle theta S. The force transmitted by the right rod 870a to the second arm 912a may be referred to as FT. The force transmitted by the right pusher 930a to the right link bracket 951a may be referred to as FP.

Referring to FIG. 54, when the second arm 912a is fully laid with respect to the base 31, the angle theta S may have a minimum value. The right spring 940a connected to the right pusher 930a may be compressed maximally, and the magnitude of the restoring force FP may have a maximum value. The compressed right spring 940a may provide restoring force FP to the right pusher 930a. The right pusher 930a may transmit the restoring force FP to the right link bracket 951a. The restoring force FP can act in the +y-axis direction.

If the second arm 912a is fully laid with respect to the base 31, the distance HL from the base 31 to the upper end of the right pusher 930a may have a minimum value. The first part 931a of the right pusher 930a may protrude to the outside of the right link mount 920a, and the second part 932a of the right pusher 930a may be fully accommodated in the accommodation space 923a of the right link mount 920a.

Referring to FIG. 55, when the second arm 912a changes from the fully laid state to the standing state with respect to the base 31, the angle theta S may gradually increase. The compression displacement amount of the right spring 940a may gradually decrease, and the magnitude of the restoring force FP may gradually decrease.

As the angle theta S gradually increases, at least a part of the second part 932a of the right pusher 930a may protrude to the outside of the right link mount 920a. The length by which the second part 932a of the right pusher 930a protrudes to the outside of the right link mount 920a may be referred to as a length HP. The distance HL from the base 31 to the upper end of the right pusher 930a may increase by HP than a case where the second arm 912a is fully laid with respect to the base 31.

Referring to FIG. 56, when the second arm 912a stands up with respect to the base 31, the right pusher 930a and the right link bracket 951a may be separated from each other. The compression displacement amount of the right spring 940a may be zero. When the compression displacement amount of the right spring 940a becomes zero, the restoring force FP provided by the right pusher 930a to the right link bracket 951a may be zero.

In addition, the length HP by which the second part 932a of the right pusher 930a protrudes to the outside of the right link mount 920a may have a maximum value. The distance HL from the base 31 to the upper end of the right pusher 930a may have a maximum value.

That is, the right pusher 930a may assist the second arm 912a to stand and reduce the load of the motor assembly 810 by applying a restoring force to the right link bracket 951a, while the right pusher 930a and the right link bracket 951a are in contact with each other.

The lead screw 840a, 840b may be driven by a single motor assembly 810. As the lead screw 840a, 840b is driven by a single motor assembly 810, the second arm 912a, 912b can stand up in symmetry. However, when the lead screw 840a, 840b is driven by a single motor assembly 810, the load on the motor assembly 810 to stand the second arm 912a, 912b may be excessively increased. At this time, the right pusher 930a may apply the restoring force to the right link bracket 951a, thereby assisting the second arm 912a to stand up and reducing the load of the motor assembly 810.

Alternatively, when the second arm 912a changes from the standing state to the fully laid state with respect to the base 31, the restoring force that the right pusher 930a provides to the right link bracket 951a can alleviate the shock that occurs when the link 910a is laid with respect to the base 31. That is, the restoring force provided by the right pusher 930a to the right link bracket 951a may serve as a damper when the link 910a is laid with respect to the base 31. As the right pusher 930a serves as a damper, the load of the motor assembly 810 may be reduced.

The structure formed by the left pusher 930b, the left spring 940b, the left link bracket 951b, the left link mount 920b, and the left rod 870b may be symmetric with the structure formed by the right pusher 930a, the right spring 940a, the right link bracket 951a, the right link 910a mount, and the right rod 870a. In this case, the axis of symmetry may be the axis of symmetry of the motor assembly 810.

Referring to FIGS. 57 to 59, the panel roller 143 may be installed in the base 31. The panel roller 143 may be installed in front of the lead screw 840a, 840b. Alternatively, the panel roller 143 may be disposed in parallel with the length direction of the lead screw 840a, 840b. Alternatively, the panel roller 143 may be spaced apart from the lead screw 840a, 840b.

The display unit 20 may include a display panel 10 and a module cover 15. The lower side of the display unit 20 may be connected to the panel roller 143, and the upper side of the display unit 20 may be connected to the upper bar 75. The display unit 20 may be wound around or unwound from the panel roller 143.

The distance from the axis of symmetry ys of the motor assembly 810 to the right slider 860a may be referred to as a distance RD. The distance from the axis of symmetry ys of the motor assembly 810 to the left slider 860b may be referred to as a distance LD. The distance between the right slider 860a and the left slider 860b may be referred to as a distance SD. The distance SD may be the sum of the distance RD and the distance LD. The distance from the base 31 to the upper end of the display unit 20 may be referred to as a distance HD.

Referring to FIG. 57, when the second arm 912a, 912b is fully laid with respect to the base 31, the distance SD between the right slider 860a and the left slider 860b may have a minimum value. The distance RD from the axis of symmetry ys of the motor assembly 810 to the right slider 860a may be the same as the distance LD from the axis of symmetry ys of the motor assembly 810 to the left slider 860b.

When the second arm 912a, 912b is fully laid with respect to the base 31, the distance HD from the base 31 to the upper end of the display unit 20 may have a minimum value.

When the second arm 912a, 912b is fully laid with respect to the base 31, the first spring 841a, 841b may contact the slider 860a, 860b. In addition, the second spring 851a, 851b may contact the slider 860a, 860b. In addition, the pusher 930a, 930b may contact the link bracket 951a, 951b.

When the second arm 912a, 912b is fully laid with respect to the base 31, the amount of compression of the first spring 841a, 841b may have a maximum value, and the magnitude of the restoring force provided to the slider 860a, 860b by the first spring 841a, 841b may have a maximum value.

When the second arm 912a, 912b is fully laid with respect to the base 31, the amount of compression of the second spring 851a, 851b may have a maximum value, and the magnitude of the restoring force provided to the slider 860a, 860b by the second spring 851a, 851b may have a maximum value.

When the second arm 912a, 912b is fully laid with respect to the base 31, the amount of compression of the spring 940a, 940b may have a maximum value, and the magnitude of the restoring force provided to the pusher 930a, 930b by the spring 940a, 940b may have a maximum value.

When the second arm 912a, 912b start to stand with respect to the base 31, the second arm 912a, 912b may stand by receiving a restoring force from the first spring 841a, 841b, the second spring 851a, 851b, and the spring 940a, 940b. Thus, the load on the motor assembly 810 may be reduced.

Referring to FIG. 58, as the second arm 912a, 912b stands with respect to the base 31, the distance SD between the right slider 860a and the left slider 860b may gradually increase. Even if the distance SD increases, the distance LD and the distance RD may be equal to each other. That is, the right slider 860a and the left slider 860b may be symmetrically located with respect to the axis of symmetry ys of the motor assembly 810. In addition, the extent to which the second arm 912a, 912b of the right link 910a stands with respect to the base 31 and may be equal to the extent to which the second arm 912a, 912b of the left link 910b stands with respect to the base 31.

As the second arm 912a, 912b stands with respect to the base 31, the distance HD from the base 31 to the upper end of the display unit 20 may gradually increase. The display unit 20 may be unwound from the panel roller 143. Alternatively, the display unit 20 may be unfolded from the panel roller 143.

When the second arm 912a, 912b fully stands up with respect to the base 31, the first spring 841a, 841b may be separated from the slider 860a, 860b. In addition, when the second arm 912a, 912b fully stands up with respect to the base 31, the second spring 851a, 851b may be separated from the slider 860a, 860b. In addition, when the second arm 912a, 912b stands up with respect to the base 31, the pusher 930a, 930b may be separated from the link bracket 951a, 951b.

The separation of the first spring 841a, 841b from the slider 860a, 860b, the separation of the second spring 851a, 851b from the slider 860a, 860b, and the separation of the pusher 930a, 930b from the link bracket 951a, 951b may proceed independently of each other. That is, the order of the separation of the first spring 841a, 841b from the slider 860a, 860b, the separation of the second spring 851a, 851b from the slider 860a, 860b, and the separation of the pusher 930a, 930b from the link bracket 951a, 951b may be mutually variable.

The angle formed between the axis xs1 parallel to the base 31 and the second arm 912a may be referred to as theta R. The angle formed between the axis xs1 parallel to the base 31 and the first arm 911a may be referred to as theta R'. The axis xs1 and x-axis may be parallel.

When the second arm 912a is fully laid with respect to the base 31, or while the second arm 912a stands up with respect to the base 31, or when the standing of the second arm 912a with respect to the base 31 is completed, theta R and theta R' can be maintained to be the same.

The angle formed between the axis xs2 parallel to the base 31 and the second arm 912b may be referred to as theta L. The angle formed between the axis xs2 parallel to the base 31 and the first arm 911b may be referred to as theta L'. The axis xs2 and x-axis may be parallel.

When the second arm 912b is fully laid with respect to the base 31, or while the second arm 912b stands up with respect to the base 31, or when the standing of the second arm 912a with respect to the base 31 is completed, theta L and theta L' can be maintained to be the same.

The axis xs1 and the axis xs2 may be the same axis mutually.

Referring to FIG. 59, when the second arm 912a, 912b fully stands up with respect to the base 31, the distance SD between the right slider 860a and the left slider 860b may have a maximum value. Even when the distance SD is maximized, the distance LD and the distance RD may be equal to each other.

When the second arm 912a, 912b fully stands up with respect to the base 31, the distance HD from the base 31 to the upper end of the display unit 20 may have a maximum value.

Referring to FIGS. 60 and 61, a door assembly 40 may be adjacent to an upper plate of a housing 30 and installed inside a housing 30. A door 41 may cover an opening 30P on the upper plate of the housing 30. The opening 30P on the upper plate of the housing 30 may elongate in a longitudinal direction of the housing 30 on the upper plate of the housing 30. The door 41 may be a plate which elongates. The door 41 may move while sliding in a front and rear direction of the housing 30. A holder 42 may be coupled to the door 41. One side of the holder 42 may be fixed to a lower surface of the door 41. In this case, the holder 42 may be positioned adjacent to a right end in the longitudinal direction of the door 41. The holder 42 may be referred to as a door holder 42.

The holder 42 may be coupled to a slider 43. The other side of the holder 42 may be fixed to the slider 43. The slider 43 may move on a rail 44. The rail 44 may be fixed to a lower side of the upper plate of the housing 30. The rail 44 may include slots 44S extended in the front and rear direction of the housing 30. The slide 43 may be inserted into the slot 44S and may move in an extension direction of the slot 44S. A rack gear 43R may be formed on the lower surface of the slider 43.

A shaft gear 45 may include a first gear 45a and a second gear 45b. The first gear 45b may engage with the rear gear 43R and the second gear 45a may be fixed to the first gear 45b. For example, the first gear 45b and the second gear 45a may be integrally formed. A shaft 50 may be inserted into the first gear 45a and the second gear 45b. The shaft 50, and the gear 45a and the second gear 45b may rotate at the same time.

A motor 49 may provide rotational force. For example, the motor 49 may provide a torque of 4 kg·m. The motor 49 may be installed inside the housing 30. The motor 49 may be connected to a worm 48. When the motor 49 rotates, the worm 48 may rotate. A worm gear 47 may engaged with the worm 48 connected to the motor 49. The worm gear 47 may be connected to a torque limiter 46. For example, the torque limiter 46 may limit a torque of more than 2 kg·m. The torque limiter 46 may be connected to the shaft gear 45. For example, the torque limiter 46 may engage with the second gear 45a of the shaft gear 45.

When the motor 49 rotates, the worm 48 may provide power to the worm gear 47. The worm gear 47 may provide the power to the shaft gear 45 through the torque limiter 46. As a result, in a situation that interferes with the driving of the door 41, damage to a mechanism and an injury caused by hand jamming of a user may be prevented.

Referring to FIGS. 62 and 63, a first shaft gear 45 may be installed adjacent to the motor 49, and may receive driving force from the motor 49. The first shaft gear 45 is fixed to a first shaft 50a to provide the rotational force to the first shaft 50a. The first shaft 50a may be disposed lengthily in a left and right direction of the housing 30, and held by a first holder 60H.

A second shaft gear 45' may be installed on the other side which is an opposite side of one side of the housing 30 where the motor 49 is positioned, and fixed to the second shaft 50b. While the second shaft 50b rotates, the second shaft gear 45' may be rotated. The first shaft 50a may be connected or coupled by the second shaft 50b and a joint 60 (see FIGS. 65 to 67). FIG. 67 may illustrate a connection of the first shaft 50a and the second shaft 50b between FIGS. 69 and 70. The number of shafts 50 may be 2 or more. When the number of shafts 50 increases to n, the number of joints 60 may increase to n−1 in response thereto.

While the first shaft gear 45 moves the first slider 43 in the front and rear direction of the housing 30 and the second shaft gear 45' moves the second slider 43' in the front and rear direction of the housing 30, the door 41 may be opened/closed.

As a result, while the shafts 50 are caught in the holder 60H or rotates without causing noise and/or vibration, the door 41 may be opened/closed.

Referring to FIG. 64, an example in which the door 41 installed on the upper plate of the housing 30 is opened by the rotation of the shaft 50 may be seen. Referring to FIG. 65, an example in which the display unit 20 is raised between openings 30P of the upper plate, which are opened by movement of the door 41 may be seen.

Referring to FIG. 66, when the display panel 10 and the module cover 15 are positioned outside the housing 30 by passing through the opening 30P, one space may be partitioned into a first space SP1 and a second space SP2. Here, the first space SP1 may be a space overlapped with the opening 30P in an up and down direction in a space positioned in a rear of the module cover 15, and the second space SP2 may be a space overlapped with the opening 30P in the up and down direction in a space positioned in a front of the display panel 10.

A sensor 210 may be positioned adjacent to a sensing area SA formed in at least one of the first space SP1 and the second space SP2. The sensor 210 may sense whether there is an object (e.g., a thing or a part of a body such as a finger) which enters the sensing area SA.

A control unit 1000 may control whether an operation of the display panel 10 which is rolled on or unrolled from a roller 143 based on information acquired by the sensor 210, and will be described below in more detail.

A brush br may be installed on the upper plate of the housing 30 adjacent to the opening 30P or installed on a front end of the door 41. When the door 41 opens the opening 30P, the brush br may prevent a foreign substance such as dust from being introduced into the housing 30 through the opening 30P.

Referring to FIG. 67, a pair of sensor brackets 310 may be coupled to the housing 30 adjacent to the opening 30P, and may be spaced apart from each other in the longitudinal direction of the roller 143. For example, a pair of sensor brackets 310 may be adjacent to both ends of the opening 30P, respectively in the longitudinal direction of the opening 30P. In addition the sensor 210 may include a pair of sensors 211 coupled to a pair of sensor brackets 310, respectively. For example, any one 211a of a pair of sensor 211 may be coupled to a sensor bracket 310a adjacent to one end of the opening 30P and the other one 211b may be coupled to a sensor bracket 310b adjacent to the other end of the opening 30P.

For example, any one of a pair of sensors 211 may be a laser oscillating light and the other one may receive the laser. For example, any one 211a of a pair of sensors 211 may be a light emitting sensor emitting light in an infrared (IR) wavelength band and the other one 211b may be a light receiving sensor converging the light emitted by the light emitting sensor. In this case, based on a difference between an electric signal value sensed as the light is converged by the light receiving sensor, and a reference signal value, it may be judged whether there is the object between the light emitting sensor and the light receiving sensor. Here, the reference signal value may be an electric signal value sensed as the light emitted by the light emitting sensor is converged by the light receiving sensor when there is no object between the light emitting sensor and the light receiving sensor.

A sensing area SA1 may be formed between a pair of sensors 211. For example, when the opening 30P is opened, a pair of sensors 211 may be positioned in the rear of the module cover 15, and the sensing area SA1 may be positioned in the first space SP1. As a result, when the door 41 opens the opening 30P, a pair of sensors 211 may sense whether there is an object which enters the sensing area SA1 in the rear of the module cover 15.

Referring to FIGS. 68 and 69, a pair of sensor brackets 310 may be coupled to the rail 44 adjacent to an upper side of the rail 44. Each of a pair of sensor brackets 310 may include a body 311, a head 312, an elastic member 314, a pin 315, and a bearing 316.

One side of the body 311 may be rotatably coupled to the housing 30. For example, the body 311 may be rotatably coupled to the holder 441 of the rail 44 fixed to the housing 30. Here, the holder 441 may be coupled to a pin 315 (see FIG. 69) to be described below, and may cover a part of the body 311 in the longitudinal direction of the opening 30P.

The head 312 may be coupled to one end of the body 311, and any one of a pair of sensors 211 may be positioned therein. The head 312 may include a base 3121 in which the sensor 211 is installed and a cover 3122 which protrudes on the base 3121 and covers the sensor 211. The cover 3122 may be formed in a cylindrical shape as a whole, and may prevent light of the sensor 211 from being exposed to the outside through the opened opening 30P while interfering with light emitting or light receiving of the sensor 211 in the longitudinal direction of the opening 30P. Further, the cover 3122 may be formed in the cylindrical shape as a whole, but a portion which is not exposed to the outside through the opening 30P may be deleted and formed.

One end of the elastic member 314 may be fixed to the other end of the body 311 and the other end may be fixed to the housing 30. Specifically, one end of the elastic member 314 may be fixed to a latching portion 313 formed on the other end of the body 311, and the other end of the elastic member 314 may be fixed to a rod 36 coupled to the rail 44 adjacent to a lower side of the rail 44. When external force is applied to the elastic member 314, the elastic member 314 may be elastically transformed and when the external force is released, the elastic member 314 may be restored to an original state. For example, the elastic member 314 may be a spring.

The pin 315 may be inserted into one side of the body 311 and coupled to the holder 441. The pin 315 may provide a rotational center axis of the body 311. Here, the rotational center axis of the body 311 may correspond to a left and right direction axis in line with the longitudinal direction of the opening 30P.

The pin 315 is inserted into a bearing 316, which is positioned between the pin 315 and the body 311 and may support the pin 315. As a result, the body 311 may stably rotate around the pin 315 by the bearing 316.

Referring to FIGS. 70 and 71, the door 41 may move backward and open the opening 30P, and move forward and close the opening 30P. In addition, the sensor bracket 310 may rotate in response to the movement of the door 41.

Specifically, when the force is applied to the head 312 in contact with the door 41, one end of the elastic member 314 may move away from the other end and the elastic member 314 may be elastically transformed. In addition, when the head 312 departs from the door 41 and the force applied to the head 312 is released, one end of the elastic member 314 may be close to the other end and the elastic member 314 may be restored. Here, a location of the other end of the elastic member 314 may be fixed to a location fixed to the rod 36, and the location of one end of the elastic member 314 may be varied jointly with the latching portion 313.

That is, when the external force is applied to the head 312, the body 311 and the latching portion 313 may rotate in a first rotational direction Ra and elastically transform the elastic member 314. In addition, when the external force is applied to the head 312, the body 311 and the latching portion 313 may rotate in a second rotational direction Ra which is opposite to the first rotational direction Ra by restoration force of the elastic member 314.

The location of the head 312 may be varied in response to the rotation of the body 311. When the door 41 closes the opening 30P, the head 312 may be in contact with an inner surface of the door 41. In this case, the force may be applied to the head 312 in contact with the door 41, and the elastic member 314 may maintain an elastically transformed state. When the door 41 moves in a direction to open the opening 30P, the head 312 may slide on the inner surface of the door 41. Furthermore, when the head 312 departs from the inner surface of the door 41 in response to the movement of the door 41, the force applied to the head 312 in contact with the door 41 may be released and the elastic member 314 may be restored to the original state. In this case, the head 312 may be positioned to overlap with the door 41 in a movement direction of the door 41, i.e., the front and rear direction of the housing 30.

As a result, when the door 41 closes the opening 30P, the head 312 is positioned inside the door 41 and not exposed to the outside, but when the door 41 opens the opening 30P, the head 312 and the sensor coupled to the head 312 move upward to more quickly sense whether the object entering the opening 30P enters the opening 30P. Further, a user may easily confirm an operation or an operation standby state of the sensor 211 through a rotating operation of the sensor bracket 310 in response to the movement of the door 41, so the door 41 is user friendly.

Referring to FIG. 72, the sensor 210 may include an ultrasonic sensor 213 which is adjacent to an end of the opening 30P in the longitudinal direction of the opening 30P and installed inside the housing 30.

The ultrasound sensor 213 generates an ultrasonic pulse US in a direction crossing the longitudinal direction of the opening 30P to form a sensing area SA2. In this case, the ultrasonic sensor 213 may sense whether there is the object which enters the sensing area SA2 and a distance between the ultrasonic sensor 213 and the object based on ultrasonic information which is reflected on the object entering the sensing area SA2 and received.

For example, when the opening 30P is opened, the ultrasonic sensor 213 may be positioned in the rear of the module cover 15 and the sensing area SA2 may be positioned throughout the first space SP1. As a result, when the door 41 opens the opening 30P, the ultrasonic sensor 213 may sense whether there is the object which enters the sensing area SA1 in the rear of the module cover 15.

Referring to FIG. 73, the sensor 210 may include a first sensor 215 and a second sensor 216.

The first sensor 215 may be installed inside the housing 30 adjacent to the end of the opening 30P in the longitudinal direction of the opening 30P. For example, the first sensor 215 may be installed in a sensor bracket 929 coupled to a link mount 920 by neighboring to a pusher 930. In addition, the first sensor 215 may include a pair of first sensors 215a and 215b which are spaced apart from each other in the longitudinal direction of the opening 30P.

The second sensor 216 may be spaced apart from the first sensor 215 in the up and down direction of the housing 30, and coupled to the module cover 15 adjacent to an upper end of the display panel 10. For example, the second sensor 216 may be installed in a link bracket 951 coupled to atop case 950. In addition, the second sensor 216 may include a pair of second sensors 216a and 216b which are spaced apart from each other in the longitudinal direction of the opening 30P.

For example, any one of the first sensor 215 and the second 216 may be a laser oscillating light and the other one may receive the laser. For example, the first sensor 215 may be a light emitting sensor that emitting light in the infrared (IR) wavelength band and the other one 211b may be a light receiving sensor converging the light emitted by the light emitting sensor. In this case, based on a difference between an electric signal value sensed as the light is converged by the light receiving sensor, and a reference signal value, it may be judged whether there is the object between the light emitting sensor and the light receiving sensor. Here, the reference signal value may be an electric signal value sensed as the light emitted by the light emitting sensor is converged by the light receiving sensor when there is no object between the light emitting sensor and the light receiving sensor.

A sensing area SA3 (see FIGS. 75 and 76) may be formed between the first sensor 215 and the second sensor 216. The sensing area SA3 may be formed between each of a pair of first sensors 215a and 215b and each of a pair of second sensors 216a and 216b facing the first sensor in the up and down direction of the housing 30.

For example, when the opening 30P is opened, the first sensor 215 and the second sensor 216 may be positioned in the rear of the module cover 15 and the sensing area SA3 may be positioned in the first space SP1. As a result, when the door 41 opens the opening 30P, the first sensor 215 and the second sensor 216 may sense whether there is the object which enters the sensing area SA3 on a left side and/or a right side of the module cover 15.

Referring to FIGS. 74 to 76, a distance between the first sensor 215 and the second sensor 216 may be varied in response to a degree in which the display panel 10 is rolled on unrolled from the roller 143.

Referring to FIG. 74, the display panel 10 may be maximally rolled on the roller 143. In this case, a height of the link bracket 951 may be minimum and the pusher 930 may be in contact with the link bracket 951. In addition, the slide 820 may be positioned maximally close to the inner bearing 830b (see FIG. 40). In this case, the sensor bracket 929 is in contact with the link bracket 951, and the distance between the first sensor 215 and the second sensor 216 may be minimum or '0'.

Referring to FIG. 75, a half or a degree less than the half of the display panel 10 may be unrolled from the roller 143. In this case, the pusher 930 may be spaced apart from the link bracket 951. In addition, the slide 820 may move from the inner bearing 830b (see FIG. 41) to a location adjacent to the outer bearing 830a. In this case, the sensor bracket 929 is spaced apart from the link bracket 951, and the distance between the first sensor 215 and the second sensor 216 may be minimum or larger than '0'. As a result, the sensing area SA3 may be formed between the first sensor 215 and the second sensor 216.

Referring to FIG. 76, the display panel 10 may be maximally unrolled from the roller 143. In this case, the height of the link bracket 951 may be minimum and the distance between the pusher 930 and the link bracket 951 may also be maximum. In addition, the slide 820 may be positioned maximally close to the outer bearing 830a (see FIG. 42). In this case, the link bracket 951 may be maximally spaced apart from the sensor bracket 929, and the distance between the first sensor 215 and the second sensor 216 may be maximum. As a result, the sensing area SA3 having a maximum length may be formed between the first sensor 215 and the second sensor 216.

Referring to FIG. 77, the control unit 1000 may control operations of the display panel, the motor assembly 810 and the door assembly 40. The control unit 1000 may be referred to as the processor. The control unit 1000 may be installed inside the housing 30, and electrically connected to each component of the display device 100.

The control unit 1000 may control rotational amounts, rotational velocities, or rotational directions of the motor of the motor assembly 810 and the motor 49 of the door assembly 40. Here, the rotational amount may mean an angular displacement, and the rotational velocity may mean an angular velocity. For example, the motor of the motor assembly 810 and the motor 49 of the door assembly 40 may be step motors. In this case, the rotational amount may mean the number of rotational steps of the motor, and the rotational velocity may mean the number of rotational steps per unit time of the motor.

The control unit 1000 may control whether the operation of the display panel 10 which is rolled on or unrolled from the roller 143 by controlling the motor assembly 810 based on information acquired by the sensor 210, and will be described below in more detail.

An audio unit 38 may include audio devices including a speaker, a buzzer, etc. The audio unit 38 may output a sound corresponding to the voice signal delivered from the control unit 1000. For example, the audio unit 38 may be installed inside the housing 30.

The memory 1100 may store various data for the operation of the display device 100, such as a program for processing or controlling the control unit 1000. The memory may store multiple application programs driven by the display device 100.

The interface unit 1200 may be electrically connected to the component of the display device 100 and the external device by a wired or wireless scheme. That is, the control unit 1000 may receive information from each component of the display device 100 through the interface unit 1200, and control each component of the display device 100. Further, the control unit 1000 may receive information from the external device through the interface unit 1200, and transmit predetermined information to the external device. For example, the interface unit 1200 may deliver a signal (e.g., a display operation command signal of the user) input into an input unit (not illustrated) to the control unit 1000, and the control unit 1000 may control the operation of the display device 100 based on the received information.

A power supply unit 1300 may supply an external power source (EPS) delivered through a cable to each component of the display device 100.

Referring to FIGS. 78 and 80, when a deployment mode ON signal of deployment the display panel 10 from the roller 143 is input (Yes in S110), the control unit 1000 may operate the motor 49 so that the door 41 opens the opening 30P (S121). For example, the deployment mode ON signal may be a signal input by the user through an input unit (not illustrated).

After S121, the control unit 1000 turns on a power source of the sensor 210 (S213) to allow the sensor 210 to sense whether there is the object entering the sensing area SA. Here, the sensing area SA may be the sensing area SA1 (see FIG. 67) formed between a pair of sensors 211, the sensing area SA2 (see FIG. 72) formed by the ultrasonic sensor 213, or the sensing area SA3 (see FIGS. 75 and 76) formed between the first sensor 215 and the second sensor 216.

After S123 (or before or at the same time as S123), the control unit 1000 may control deployment in which the display panel 10 and the module cover 15 are unrolled from the roller 143 through the operation of the motor assembly 810 to be started (S124).

After S124, the control unit 1000 may judge whether the sensor 210 senses the object entering the sensing area SA based on the information acquired by the sensor 210 (S130).

When the control unit 1000 judges that the sensor 210 does not sense the object entering the sensing area SA in S130 (No in S130), the control unit 1000 may judge that the deployment of the display panel 10 is completed (S140).

When the control unit 1000 judges that the deployment of the display panel 10 is completed in S140 (Yes in S140), the operation of the motor assembly 810 may be stopped. For example, the control unit 1000 may judge whether the deployment of the display panel 10 is completed based on information on a location of the slide 820, the top case 950, etc. (see FIG. 42). When the control unit 1000 judges that the deployment of the display panel 10 is not completed in S140 (No in S140), the control unit 1000 may maintain the deployment of the display panel 10 by maintaining the operation of the motor assembly 810 (S142). After S142, S130 described above may be executed.

When the control unit 1000 judges that the sensor 210 senses the object entering the sensing area SA in S130 (Yes in S130), the control unit 810 may stop the deployment of the display panel 10 by stopping the operation of the motor assembly 810 (S131). After S131 (or before or at the same time as S131), the control unit 1000 may control the display panel 10 to output a warning message 11m (see FIG. 80) for announcing the entering of the object into the sensing area SA.

As a result, when the object enters the sensing area SA during the deployment (DP) operation of the display panel 10, it is possible to prevent each component of the motor assembly 810 including the rod 870 and the link 910 from being damaged by the object entering the sensing area SA or the object (e.g., a part of the body such as the finger) from being damaged due to the component by stopping the deployment of the display panel 10. Further, the warning message 11m is output to allow the user to announce the entering of the object into the sensing area SA to induce an appropriate action for taking the object out of the sensing area SA to be taken.

Meanwhile, when the object enters the sensing area SA, the control unit 1000 is also capable of controlling the audio unit 38 to output a voice message 11s for announcing the entering of the object into the sensing area SA.

Referring back to FIGS. 78 and 80, when a rolling mode ON signal of rolling the display panel 10 on the roller 143 is input (Yes in S150), the control unit 1000 turns on the power source of the sensor 210 (S163) to allow the sensor 210 to sense whether there is the object entering the sensing area SA. Here, the sensing area SA may be the sensing area SA1 (see FIG. 67) formed between a pair of sensors 211, the sensing area SA2 (see FIG. 72) formed by the ultrasonic sensor 213, or the sensing area SA3 (see FIGS. 75 and 76) formed between the first sensor 215 and the second sensor 216.

After S163 (or before or at the same time as S163), the control unit 1000 may control rolling in which the display panel 10 and the module cover 15 are rolled on the roller 143 through the operation of the motor assembly 810 to be started (S164).

After S164, the control unit 1000 may judge whether the sensor 210 senses the object entering the sensing area SA based on the information acquired by the sensor 210 (S170).

When the control unit 1000 judges that the sensor 210 does not sense the object entering the sensing area SA in S170 (No in S170), the control unit 1000 may judge that the rolling of the display panel 10 is completed (S180).

When the control unit 1000 judges that the rolling of the display panel 10 is completed in S180 (Yes in S180), the control unit 1000 may operate the motor 49 so that the operation of the motor assembly 810 is stopped and the door 41 closes the opening 30P (S181). For example, the control unit 1000 may judge whether the rolling of the display panel 10 is completed based on the information on the location of the slide 820, the top case 950, etc. (see FIG. 40). When the control unit 1000 judges that the rolling of the display panel 10 is not completed in S180 (No in S180), the control unit 1000 may maintain the rolling of the display panel 10 by maintaining the operation of the motor assembly 810 (S172). After S182, S170 described above may be executed.

When the control unit 1000 judges that the sensor 210 senses the object entering the sensing area SA in S170 (Yes in S170), the control unit 810 may stop the rolling of the display panel 10 by stopping the operation of the motor assembly 810 (S171). After S171 (or before or at the same time as S171), the control unit 1000 may control the display panel 10 to output the warning message 11m (see FIG. 80) for announcing the entering of the object into the sensing area SA.

As a result, when the object enters the sensing area SA during the rolling (RL) operation of the display panel 10, it is possible to prevent each component of the motor assembly 810 including the rod 870 and the link 910 from being damaged by the object entering the sensing area SA or the object (e.g., a part of the body such as the finger) from being damaged due to the component by stopping the rolling of the display panel 10. Further, the warning message 11m is output to allow the user to announce the entering of the object into the sensing area SA to induce the appropriate action for taking the object out of the sensing area SA to be taken.

Meanwhile, when the object enters the sensing area SA, the control unit 1000 is also capable of controlling the audio unit 38 to output the voice message 11s for announcing the entering of the object into the sensing area SA.

Referring to FIGS. 79 and 81, even when the deployment mode ON signal and the rolling mode ON signal are not input, the control unit 1000 may secure safety through a control corresponding to whether the object entering the sensing area SA.

Specifically, after No in S150 (see FIG. 78), the control unit 1000 may judge whether the door 41 opens the opening 30P (S190). For example, the control unit 1000 may judge whether the door 41 opens the opening 30P based on information regarding the rotational angle of the motor 49, etc.

When the control unit 1000 judges that the door 41 opens the door 30P in S190 (Yes in S190), the control unit 1000 turns on the power source of the sensor 210 (S191) to allow the sensor 210 to sense whether there is the object entering the sensing area SA. Here, the sensing area SA may be the sensing area SA1 (see FIG. 67) formed between a pair of sensors 211, the sensing area SA2 (see FIG. 72) formed by the ultrasonic sensor 213, or the sensing area SA3 (see FIGS. 75 and 76) formed between the first sensor 215 and the second sensor 216.

After S191, the control unit 1000 may judge whether the sensor 210 senses the object entering the sensing area SA based on the information acquired by the sensor 210 (S192).

When the control unit 1000 judges that the sensor 210 senses the object entering the sensing area SA in S192 (Yes in S192), the control unit 1000 may control the display panel 10 to output the warning message 11m (see FIG. 81) for announcing the entering of the object into the sensing area SA.

As a result, even in a static state in which the display panel 10 is no rolled on or unrolled from the roller 143, it is possible to prevent the object entering the sensing area SA from causing the damage of each component of the motor assembly 810, which includes the rod 870 and the link 910 during the deployment or rolling operation which may be performed afterward. Further, the warning message 11m is output to allow the user to announce the entering of the object into the sensing area SA to induce the appropriate action for taking the object out of the sensing area SA to be taken.

Meanwhile, when the object enters the sensing area SA, the control unit 1000 is also capable of controlling the audio unit 38 to output the voice message 11s for announcing the entering of the object into the sensing area SA.

Referring to FIG. 82, the control unit 1000 may set a deployment target length (S211) or set a rolling target length (S251), in response to the deployment mode ON signal or the rolling mode ON signal. Here, the deployment target length as a length of the display panel 10 which is unrolled from the roller 143 and deployed may be a length input by user through an input unit (not illustrated) or a setting length stored in the memory 1100. Further, the rolling target length as a length of the display panel 10 which is rolled on the roller 143 and rolled may be a length input by user through an input unit (not illustrated) or a setting length stored in the memory 1100.

For example, the length of the display panel 10 which is deployed or rolled may be measured as the distance between the first sensor 215 and the second sensor 216 (see FIGS. 74 to 76).

After S211 or S251 (or before or at the same time as S211 or S251), the control unit 1000 may set a deployment target velocity (S212) or set a rolling target velocity (S252). Here, the deployment target velocity as a velocity of the display panel 10 which is unrolled from the roller 143 and deployed may be a velocity input by user through an input unit (not illustrated) or a setting velocity stored in the memory 1100. Further, the rolling target velocity as a velocity of the display panel 10 which is rolled on the roller 143 and rolled may be a velocity input by user through an input unit (not illustrated) or a setting velocity stored in the memory 1100.

For example, the velocity of the display panel 10 which is deployed or rolled may be measured as a change amount of the distance between the first sensor 215 and the second sensor 216 per time (see FIGS. 74 to 76).

After S212 or S252, the control unit 1000 may transmit a development start signal to the first sensor 215, the second sensor 216, and the motor assembly 810 (S222), or transmit a rolling start signal (S262).

After S222 or S262, the motor assembly 810 may operate to deploy the display panel 10 (S224) or the motor assembly 810 may operate to roll the display panel 10 (S264). Further, after S222 or S262, the first sensor 215 and the second sensor 216 are turned on (S223 or S263) to sense whether the object enters the sensing area SA, and measure the deployment length of the display panel (S225) or measure the rolling length of the display panel 10 (S265) in response to the operation of the motor assembly 810. Here, the deployment length or rolling length of the display panel 10 may be measured as the distance between the first sensor 215 and the second sensor 216 (see FIGS. 74 to 76).

After S225 or S265, the first sensor 215 and the second sensor 216 may transmit information on the deployment length f the display panel 10 to the control unit 1000 (S226) or transmit information on the rolling length of the display panel 10 to the control unit 1000 (S266).

After S226 or S266, the control unit 1000 may compare the deployment length and the deployment target length of the display panel 10 (S230) or compare the rolling length and the rolling target length of the display panel 10 (S270).

After S230 or S270 (or before or at the same time as S230 or S70), the control unit 1000 may compare the deployment velocity and the deployment target velocity of the display panel 10 (S240) or compare the rolling velocity and the rolling target velocity of the display panel 10 (S280). Here, the velocity of the display panel 10 which is deployed or rolled may be measured as a change amount of the distance between the first sensor 215 and the second sensor 216 per time (see FIGS. 74 to 76).

After S240 or S280, the control unit 1000 may adjust the deployment by controlling the operation of the motor assembly 810 so that the deployment length and the deployment velocity of the display panel 10 reach the deployment target length and the deployment target velocity. Further, the control unit 1000 may adjust the rolling by controlling the operation of the motor assembly 810 so that the rolling length and the rolling velocity of the display panel 10 reach the rolling target length and the rolling target velocity.

Referring to FIGS. 83 and 84, when a deployment mode ON signal of unrolling the display panel 10 from the roller 143 is input (Yes in S210), the control unit 1000 may operate the motor 49 so that the door 41 opens the opening 30P (S221). For example, the deployment mode ON signal may be a signal input by the user through an input unit (not illustrated).

After S221, the control unit 1000 turns on the power source of the sensor 210 (S223) to allow the sensor 210 to sense a deployment length Ld of the display panel. Here, the deployment length Ld may be measured as the distance between the first sensor 215 and the second sensor 216 (see FIGS. 74 to 76).

After S223 (or before or at the same time as S223), the control unit 1000 may control deployment in which the display panel 10 and the module cover 15 are unrolled from the roller 143 through the operation of the motor assembly 810 to be started (S224).

After S224, the sensor 210 may continuously sense the deployment length Ld of the display panel 10 which is varied in response to the operation of the motor assembly 810 (S225).

After S225, the control unit 1000 may judge whether the deployment length Ld of the display panel 10 is equal to or more than a deployment target length Ld_target (S230). Here, the deployment target length Ld_target as a length of the display panel 10 which is unrolled from the roller 143 and deployed may be a length input by user through an input unit (not illustrated) or a setting length stored in the memory 1100.

When the control unit 1000 judges that the deployment length Ld is less than the deployment target length Ld_target in S230, the control unit 1000 may maintain the deployment of the display panel 10 by maintaining the operation of the motor assembly 810 (S232). After S232, S225 described above may be executed.

When the control unit 1000 judges that the deployment length Ld is equal to or more than the deployment target length Ld_target in S230, the control unit 1000 may stop the deployment of the display panel 10 by stopping the operation of the motor assembly 810 (S231).

As a result, the control unit 1000 may precisely adjust the deployment degree of the display panel 10 based on the information on the deployment length Ld acquired by the sensor 210.

Referring to FIGS. 83 and 85, when the rolling mode ON signal of rolling the display panel 10 on the roller 143 is input (Yes in S250), the control unit 1000 turns on the power source of the sensor 210 (S263) to allow the sensor 210 to sense a rolling length Lr of the display panel 10. Here, the rolling length Lr may be measured as the distance between the first sensor 215 and the second sensor 216 (see FIGS. 74 to 76).

After S263 (or before or at the same time as S263), the control unit 1000 may control rolling in which the display panel 10 and the module cover 15 are rolled on the roller 143 through the operation of the motor assembly 810 to be started (S264).

After S264, the sensor 210 may continuously sense the rolling length Lr of the display panel 10 which is varied in response to the operation of the motor assembly 810 (S265).

After S265, the control unit 1000 may judge whether the rolling length Lr of the display panel 10 is equal to or more than a rolling target length Lr_target (S270). Here, the rolling target length Lr_target as a length of the display panel 10 which is rolled on the roller 143 and rolled may be a length input by user through an input unit (not illustrated) or a setting length stored in the memory 1100.

When the control unit 1000 judges that the rolling length Lr is less than the deployment rolling length Ld_target, the control unit 1000 may maintain the rolling of the display panel 10 by maintaining the operation of the motor assembly 810 (S273). After S273, S265 described above may be executed.

When the control unit 1000 judges that the rolling length Lr is equal to or more than the rolling target length Lr_target, the control unit 1000 may stop the rolling of the display panel 10 by stopping the operation of the motor assembly 810 (S271). After S271, the control unit 1000 may operate the motor 49 so that the door 41 closes the opening 30P (S272).

As a result, the control unit 1000 may precisely adjust the rolling degree of the display panel 10 based on the information on the rolling length Lr acquired by the sensor 210.

Referring to FIG. 86, the sensor 210 may include a third sensor 218 and a fourth sensor 219. Here, the third sensor 218 may include a pair of third sensors 218a and 218b which are positioned symmetric to each other in the left and right direction based on the motor of the motor assembly 810. Further, the fourth sensor 219 may include a pair of fourth sensors 219a and 219b which are positioned symmetric to each other in the left and right direction based on the motor of the motor assembly 810.

The third sensor 218 may be coupled to one side of the slide 820 which engages with a lead screw 840 and moves forward and backward in the left and right direction which is the longitudinal direction of a lead screw 840 by rotation of the lead screw 840. Here, as described above, the lead screw 840 may rotate by receiving the power from the motor. For example, the third sensor 218 may be installed on a surface facing the inner bearing 830b among lateral surfaces of the slide 820.

The fourth sensor 219 is coupled to one side of the inner bearing 830b and a location of the fourth sensor 219 may be fixed. For example, the fourth sensor 219 may be installed on a surface facing the slide 820 among lateral surfaces of the inner bearing 830b.

For example, any one of the third sensor 218 and the fourth sensor 219 may be a laser oscillating light and the other one may receive the laser. For example, the third sensor 218 may be a light emitting sensor that emitting light in the infrared (IR) wavelength band and the fourth sensor 219 may be a light receiving sensor converging the light emitted by the light emitting sensor. In this case, based on a difference between a time when the light emitted by the light emitting sensor is converged on the light receiving sensor and a reference time, a distance between the third sensor 218 and the fourth sensor 219 may be sensed. Here, the reference time may be a time measured at a location where the slide 820 is positioned maximally close to the inner bearing 830b.

While the display panel 10 is maximally rolled on the roller 143, the slide 820 may be positioned maximally close to the inner bearing 830b. In this case, the distance between the third sensor 218 and the fourth sensor 219 may become a first distance Ldd_1, and information on the distance may be delivered to the control unit 1000, and utilized as control information as described below.

Referring to FIG. 87, while a half or a degree less than the half of the display panel 10 is unrolled from the roller 143, the slide 820 may move from the inner bearing 830b to the outer bearing 830a. In this case, the distance between the third sensor 218 and the fourth sensor 219 may become a second distance Ldd_2, and information on the distance may be delivered to the control unit 1000, and utilized as the control information as described below. Here, the second distance Ldd_2 may be larger than the first distance Ldd_1.

Referring to FIG. 88, while the display panel 10 is maximally unrolled from the roller 143, the slide 820 may be positioned maximally close to the outer bearing 830a. In this case, the distance between the third sensor 218 and the fourth sensor 219 may become a third distance Ldd_3, and information on the distance may be delivered to the control unit 1000, and utilized as the control information as described below. Here, the third distance Ldd_3 may be larger than the second distance Ldd_2.

Referring to FIG. 89, when the deployment mode ON signal of unrolling the display panel 10 from the roller 143 is input (Yes in S310), the control unit 1000 may operate the motor 49 so that the door 41 opens the opening 30P (S321). For example, the deployment mode ON signal may be a signal input by the user through an input unit (not illustrated).

After S321, the control unit 1000 turns on the power source of the sensor 210 (S323) to allow the sensor 210 to sense a deployment length Ldd of the display panel. Here, the deployment length Ldd may be measured as the distance between the third sensor 218 and the fourth sensor 219 or by converting the distance into the length of the display panel 10 unrolled from the roller 143 (see FIGS. 86 to 88).

After S323 (or before or at the same time as S323), the control unit 1000 may control deployment in which the display panel 10 and the module cover 15 are unrolled from the roller 143 through the operation of the motor assembly 810 to be started (S324).

After S324, the sensor 210 may continuously sense the deployment length Ldd of the display panel 10 which is varied in response to the operation of the motor assembly 810 (S325).

After S325, the control unit 1000 may judge whether the deployment length Ldd of the display panel 10 is equal to or more than a deployment target length Ldd_target (S330). Here, the deployment target length Ldd_target as a length of the display panel 10 which is unrolled from the roller 143 and deployed may be a length input by user through an input unit (not illustrated) or a setting length stored in the memory 1100.

When the control unit 1000 judges that the deployment length Ldd is less than the deployment target length Ldd_target in S330, the control unit 1000 may maintain the deployment of the display panel 10 by maintaining the operation of the motor assembly 810 (S332). After S332, S325 described above may be executed.

When the control unit 1000 judges that the deployment length Ldd is equal to or more than the deployment target length Ldd_target in S330, the control unit 1000 may stop the deployment of the display panel 10 by stopping the operation of the motor assembly 810 (S331).

As a result, the control unit 1000 may precisely adjust the deployment degree of the display panel 10 based on the information on the deployment length Ldd acquired by the sensor 210.

Referring back to FIG. 89, when the rolling mode ON signal of rolling the display panel 10 on the roller 143 is input (Yes in S350), the control unit 1000 turns on the power source of the sensor 210 (S363) to allow the sensor 210 to sense a rolling length Lrr of the display panel 10. Here, the rolling length Lrr may be measured as the distance between the third sensor 218 and the fourth sensor 219 or by converting the distance into the length of the display panel 10 rolled on the roller 143 (see FIGS. 86 to 88).

After S363 (or before or at the same time as S363), the control unit 1000 may control rolling in which the display panel 10 and the module cover 15 are rolled on the roller 143 through the operation of the motor assembly 810 to be started (S364).

After S364, the sensor 210 may continuously sense the rolling length Lrr of the display panel 10 which is varied in response to the operation of the motor assembly 810 (S365).

After S365, the control unit 1000 may judge whether the rolling length Lrr of the display panel 10 is equal to or more than a rolling target length Lrr target (S370). Here, the rolling target length Lrr target as a length of the display panel 10 which is rolled on the roller 143 and rolled may be a length input by user through an input unit (not illustrated) or a setting length stored in the memory 1100.

When the control unit 1000 judges that the rolling length Lrr is less than the rolling target length Lrr target in S370, the control unit 1000 may maintain the rolling of the display panel 10 by maintaining the operation of the motor assembly 810 (S373). After S373, S365 described above may be executed.

When the control unit 1000 judges that the rolling length Lrr is equal to or more than the rolling target length Lrr target, the control unit 1000 may stop the rolling of the display panel 10 by stopping the operation of the motor assembly 810 (S371). After S371, the control unit 1000 may operate the motor 49 so that the door 41 closes the opening 30P (S372).

As a result, the control unit 1000 may precisely adjust the rolling degree of the display panel 10 based on the information on the rolling length Lrr acquired by the sensor 210.

According to one aspect of the present disclosure, provided is a display device including: a housing having an opening; a roller elongated and positioned inside the housing; a display panel which is rolled on or unrolled from the roller, the display panel partitioning one space into a first space and a second space when being positioned outside the housing by passing through the opening; a sensor adjacent to a sensing area formed in at least one of the first space and the second space and sensing whether there is an object entering the sensing area; and a control unit controlling whether there is an operation of the display panel which is rolled on or unrolled from the roller based on information acquired by the sensor.

Further, according to another aspect of the present disclosure, the display device may further include a pair of sensor brackets adjacent to the opening and coupled to the housing, and spaced apart from each other in a longitudinal direction of the roller, and the sensor may further include a pair of sensors coupled to the pair of sensor brackets, respectively, and the sensing area may be formed between the pair of sensors.

Further, according to another aspect of the present disclosure, the display device may further include a door adjacent to the opening and coupled to the housing, and opening/closing the opening, and each of the pair of sensor brackets may further include a body of which one side is rotatably coupled to the housing, a head coupled to one end of the body, and at which any one of the pair of sensors is positioned, and an elastic member of which one end is fixed to the other end of the body and the other end is fixed to the housing.

Further, according to another aspect of the present disclosure, when force is applied to the head in contact with the door, one end of the elastic member moves away from the other end of the elastic member and the elastic member may be elastically transformed.

Further, according to another aspect of the present disclosure, the door may move in a front and rear direction of the housing, and the head may be in contact with an inner surface of the door when the door closes the opening and positioned to overlap with the door in a movement direction of the door when the door opens the door.

Further, according to another aspect of the present disclosure, each of the pair of sensor brackets may further include a pin inserted into one side of the body, and a bearing inserted with the pin and positioned between the pin and the body.

Further, according to another aspect of the present disclosure, the opening may elongate in the longitudinal direction of the roller, the sensor may further include an ultrasonic sensor adjacent to an end of the opening in the longitudinal direction of the opening and installed inside the housing, and the ultrasonic sensor may generate an ultrasonic pulse in a direction crossing the longitudinal direction of the opening to form the sensing area.

Further, according to another aspect of the present disclosure, the display device may further include a module cover positioned in a rear of the display panel, and the opening may elongate in the longitudinal direction of the roller, the sensor may further include a first sensor adjacent to the end of the opening in the longitudinal direction of the opening and installed inside the housing, and a second sensor spaced apart from the first sensor in an up and down direction of the housing, and adjacent to an upper end of the display panel and coupled to the module cover, and the sensing area may be formed between the first sensor and the second sensor.

Further, according to another aspect of the present disclosure, the first sensor may further include a pair of first sensors spaced apart from each other in the longitudinal direction of the opening, and the second sensor may further include a pair of second sensors spaced apart from each other in the longitudinal direction of the opening.

Further, according to another aspect of the present disclosure, a distance between the first sensor and the second sensor may be varied in response to a degree in which the display panel is rolled on or unrolled from the roller, and the control unit may control whether there is an operation of the display panel rolled on or unrolled from the roller or a velocity of the operation, based on the distance between the first sensor and the second sensor.

Further, according to another aspect of the present disclosure, the control unit may control a motion of the display panel so as to unroll the display panel from the roller when a deployment mode signal of unrolling the display panel from the roller is input, and stop the motion of the display panel when the distance between the first sensor and the second sensor reaches a deployment target distance of the display panel.

Further, according to another aspect of the present disclosure, the control unit may control the motion of the display panel so as to roll the display panel on the roller when a rolling mode signal of rolling the display panel on the roller is input, and stop the motion of the display panel when the distance between the first sensor and the second sensor reaches a rolling target distance of the display panel.

Further, according to another aspect of the present disclosure, the control unit may control the motion of the display panel so as to unroll the display panel from the roller or controls the motion of the display panel so as to roll the display panel on the roller when the deployment mode signal of unrolling the display panel from the roller is input or when the rolling mode signal of rolling the display panel on the roller is input, and stop the motion of the display panel when the sensor senses that the object enters the sensing area.

Further, according to another aspect of the present disclosure, the control unit may control the display panel to output a warning message for announcing entering of the object into the sensing area when the sensor senses that the object enters the sensing area.

Further, according to another aspect of the present disclosure, the display device may further include: a module cover positioned in the rear of the display panel; a foldable link positioned in the rear of the module cover, and of which one side is pivotably connected to the module cover; a lead screw which is rotatably installed inside the housing, and elongates in the longitudinal direction of the roller; a slide which is pivotably connected to the other side of the foldable link, and engages with the lead screw and moves forward and backward in the longitudinal direction of the lead screw by the rotation of the lead screw; a motor coupled to one side of the lead screw and rotating the lead screw; and a bearing positioned between the slide and the motor, and supporting the lead screw, and the sensor may further include a third sensor coupled to the slide and movable jointly with the slide, and a fourth sensor which is coupled to the bearing and of which location is fixed, and faces the third sensor.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A display device comprising:
a housing having an opening;
a roller positioned inside the housing and configured to elongate;
a display panel configured to roll or unroll from the roller, the display panel partitioning one space into a first space and a second space upon being positioned outside the housing by passing through the opening;
a sensor adjacent to a sensing area formed in at least one of the first space and the second space, the sensor sensing whether there is an object entering the sensing area; and
a control unit controlling whether there is an operation of the display panel which is rolled on or unrolled from the roller based on information acquired by the sensor.
2. The display device of claim 1, further comprising:
a pair of sensor brackets adjacent to the opening and coupled to the housing, and spaced apart from each other in a longitudinal direction of the roller,
wherein the sensor further includes a pair of sensors coupled to the pair of sensor brackets, respectively, and
wherein the sensing area is formed between the pair of sensors.
3. The display device of claim 2, further comprising:
a door adjacent to the opening and coupled to the housing, the door opening or closing the opening, wherein each sensor bracket of the pair of sensor brackets further includes:
a body of which one side is rotatably coupled to the housing;
a head coupled to one end of the body, and at which any one of the pair of sensors is positioned; and
an elastic member of which one end is fixed to the other end of the body and the other end is fixed to the housing.

4. The display device of claim 3, wherein based on a force being applied to the head in contact with the door, one end of the elastic member moves away from the other end of the elastic member and the elastic member is elastically transformed.

5. The display device of claim 4, wherein the door moves in a front and rear direction of the housing, and
wherein the head is in contact with an inner surface of the door based on the door closing the opening and positioned to overlap with the door in a movement direction of the door based on the door opening the opening.

6. The display device of claim 3, wherein each of the pair of sensor brackets further includes:
a pin inserted into one side of the body; and
a bearing inserted with the pin and positioned between the pin and the body.

7. The display device of claim 1, wherein the opening elongates in the longitudinal direction of the roller,
wherein the sensor further includes an ultrasonic sensor adjacent to an end of the opening in the longitudinal direction of the opening and installed inside the housing, and
wherein the ultrasonic sensor generates an ultrasonic pulse in a direction crossing the longitudinal direction of the opening to form the sensing area.

8. The display device of claim 1, further comprising:
a module cover positioned in a rear of the display panel,
wherein the opening elongates in the longitudinal direction of the roller,
wherein the sensor further includes:
a first sensor adjacent to the end of the opening in the longitudinal direction of the opening and installed inside the housing; and
a second sensor spaced apart from the first sensor in an up and down direction of the housing, and adjacent to an upper end of the display panel and coupled to the module cover, and
wherein the sensing area is formed between the first sensor and the second sensor.

9. The display device of claim 8, wherein the first sensor further includes a pair of first sensors spaced apart from each other in the longitudinal direction of the opening, and
wherein the second sensor further includes a pair of second sensors spaced apart from each other in the longitudinal direction of the opening.

10. The display device of claim 8, wherein a distance between the first sensor and the second sensor is varied in response to a degree in which the display panel is rolled on or unrolled from the roller, and
wherein the control unit controls whether there is an operation of the display panel rolled on or unrolled from the roller or a velocity of the operation, based on the distance between the first sensor and the second sensor.

11. The display device of claim 10, wherein the control unit
controls a motion of the display panel so as to unroll the display panel from the roller based on a deployment mode signal of unrolling the display panel from the roller is being input, and
stops the motion of the display panel based on the distance between the first sensor and the second sensor reaching a deployment target distance of the display panel.

12. The display device of claim 10, wherein the control unit
controls the motion of the display panel so as to roll the display panel on the roller based on a rolling mode signal of rolling the display panel on the roller being input, and
stops the motion of the display panel based on the distance between the first sensor and the second sensor reaching a rolling target distance of the display panel.

13. The display device of claim 1, wherein the control unit controls the motion of the display panel so as to unroll the display panel from the roller or controls the motion of the display panel so as to roll the display panel on the roller based on the deployment mode signal of unrolling the display panel from the roller being input or based on the rolling mode signal of rolling the display panel on the roller is input, and
stops the motion of the display panel based on the sensor sensing that the object enters the sensing area.

14. The display device of claim 1, wherein the control unit controls the display panel to output a warning message for announcing entering of the object into the sensing area based on the sensor sensing that the object enters the sensing area.

15. The display device of claim 1, further comprising:
a module cover positioned in the rear of the display panel;
a foldable link positioned in the rear of the module cover, and of which one side is pivotably connected to the module cover;
a lead screw which is rotatably installed inside the housing, and elongates in the longitudinal direction of the roller;
a slide which is pivotably connected to the other side of the foldable link, and engages with the lead screw and moves forward and backward in the longitudinal direction of the lead screw by the rotation of the lead screw;
a motor coupled to one side of the lead screw and rotating the lead screw; and
a bearing positioned between the slide and the motor, and supporting the lead screw,
wherein the sensor further includes:
a third sensor coupled to the slide and movable jointly with the slide; and
a fourth sensor which is coupled to the bearing and of which location is fixed, and faces the third sensor.

* * * * *